(12) United States Patent
Takeuchi et al.

(10) Patent No.: US 11,703,651 B2
(45) Date of Patent: Jul. 18, 2023

(54) CABLE TERMINATION ASSEMBLY WITH DISENGAGEMENT PREVENTION STRUCTURES

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Haiguang Lu, Los Altos, CA (US); Patrick Anderson, Woodstock, MD (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 17/290,962

(22) PCT Filed: Nov. 4, 2019

(86) PCT No.: PCT/US2019/000063
§ 371 (c)(1),
(2) Date: May 3, 2021

(87) PCT Pub. No.: WO2020/091823
PCT Pub. Date: May 7, 2020

(65) Prior Publication Data
US 2022/0120989 A1 Apr. 21, 2022

Related U.S. Application Data

(60) Provisional application No. 62/855,470, filed on May 31, 2019, provisional application No. 62/813,475, (Continued)

(51) Int. Cl.
*G02B 6/44* (2006.01)
(52) U.S. Cl.
CPC ................... *G02B 6/4471* (2013.01)

(58) Field of Classification Search
CPC ........ G02B 6/28; G02B 6/3897; G02B 6/445; G02B 6/4452; G02B 6/4471; H04B 10/801
See application file for complete search history.

(56) References Cited

U.S. PATENT DOCUMENTS

| 413,245 A | 10/1889 | Richmond |
| 732,450 A | 6/1903 | Schiermeyer |

(Continued)

FOREIGN PATENT DOCUMENTS

| EP | 2677357 A1 | 12/2013 |
| WO | 2015189384 A1 | 12/2015 |

(Continued)

OTHER PUBLICATIONS

International Search Report with Written Opinion for Application No. PCT/US2019/00063 dated Mar. 10, 2020, 26 pages.

(Continued)

*Primary Examiner* — Andrew Jordan

(57) ABSTRACT

An optical fiber termination system includes a housing, a cable, and a catch. The housing defines a portion of a passageway and a surface surrounding the passageway. The passageway defines a central axis and the surface defines an interior of the housing. The cable is receivable through the portion of the passageway. The cable includes an optical fiber and defines a longitudinal axis. The catch is receivable in the housing and attachable to and extendable from the cable in a direction transverse to the longitudinal axis such that the catch limits movement of the cable in a direction away from the interior of the housing when the catch is received in the housing and the cable is received through the portion of the first passageway.

19 Claims, 45 Drawing Sheets

Related U.S. Application Data filed on Mar. 4, 2019, provisional application No. 62/754,978, filed on Nov. 2, 2018.

(56) References Cited

U.S. PATENT DOCUMENTS

| | | |
|---|---|---|
| 983,647 A | 2/1911 | Romines |
| 3,252,746 A | 5/1966 | Kafferlin et al. |
| 4,061,371 A | 12/1977 | Prather et al. |
| 4,254,865 A | 3/1981 | Pacey et al. |
| 4,549,038 A | 10/1985 | Masheris et al. |
| 4,789,217 A | 12/1988 | Mitch |
| 4,805,979 A | 2/1989 | Bossard et al. |
| 4,808,115 A * | 2/1989 | Norton ............... G02B 6/3897 439/271 |
| 4,900,118 A | 2/1990 | Yanagawa et al. |
| 4,965,414 A | 10/1990 | Sobotka, Jr. et al. |
| 4,986,762 A * | 1/1991 | Keith ............... G02B 6/3825 439/534 |
| 5,005,942 A | 4/1991 | Barlow et al. |
| 5,189,717 A | 2/1993 | Larson et al. |
| 5,239,129 A | 8/1993 | Ehrenfels |
| 5,286,935 A | 2/1994 | Mina et al. |
| 5,403,976 A | 4/1995 | Maurice |
| 5,613,021 A * | 3/1997 | Saito ............... G02B 6/3897 385/16 |
| 6,116,793 A | 9/2000 | Finzel et al. |
| 6,300,569 B1 | 10/2001 | Mullen, Jr. |
| 6,301,424 B1 * | 10/2001 | Hwang ............... G02B 6/4452 385/137 |
| 6,360,050 B1 * | 3/2002 | Moua ............... G02B 6/3897 385/136 |
| 6,424,781 B1 | 7/2002 | Puetz et al. |
| 6,527,353 B1 | 3/2003 | Bradfish et al. |
| 6,621,951 B1 | 9/2003 | Zhao et al. |
| 6,935,661 B1 | 8/2005 | Farnsworth et al. |
| 7,291,032 B1 | 11/2007 | Carver et al. |
| 7,595,455 B2 | 9/2009 | Robinson |
| 7,965,186 B2 | 6/2011 | Downie et al. |
| 8,313,250 B2 | 11/2012 | Drouard |
| 8,380,036 B2 | 2/2013 | Smith |
| 8,550,722 B2 | 10/2013 | Ringgenberg et al. |
| 8,556,356 B2 | 10/2013 | Anderson et al. |
| 8,596,882 B2 | 12/2013 | Smrha et al. |
| 8,672,428 B2 | 3/2014 | Takeuchi et al. |
| 8,920,050 B2 | 12/2014 | Takeuchi et al. |
| 8,939,792 B2 * | 1/2015 | Takeuchi ............... H04Q 1/13 439/571 |
| 9,008,484 B2 | 4/2015 | Takeuchi et al. |
| 9,285,552 B2 | 3/2016 | Marcouiller et al. |
| 9,323,020 B2 | 4/2016 | Cao et al. |
| 9,525,483 B2 | 12/2016 | Johnson, IV et al. |
| RE46,780 E | 4/2018 | Anderson et al. |
| 10,048,452 B1 | 8/2018 | Hangebrauck et al. |
| 10,281,670 B2 | 5/2019 | Vaughn et al. |
| 10,656,361 B2 | 5/2020 | Takeuchi et al. |
| 11,228,819 B1 * | 1/2022 | Takeuchi ............... H04Q 1/133 |
| 2003/0103750 A1 | 6/2003 | Laporte et al. |
| 2003/0236549 A1 * | 12/2003 | Bonadio ............... A61B 17/29 606/205 |
| 2004/0211774 A1 | 10/2004 | Daoud et al. |
| 2004/0251220 A1 * | 12/2004 | Mertesdorf ......... G02B 6/4455 211/26 |
| 2006/0008230 A1 * | 1/2006 | Giordano ............. G02B 6/4447 385/100 |
| 2006/0067637 A1 | 3/2006 | Carpenter et al. |
| 2006/0093303 A1 | 5/2006 | Reagan et al. |
| 2007/0189692 A1 | 8/2007 | Zimmel et al. |
| 2008/0002937 A1 * | 1/2008 | Spisany ............... H05K 7/186 385/76 |
| 2008/0226250 A1 | 9/2008 | Gonzales et al. |
| 2009/0060439 A1 | 3/2009 | Cox et al. |
| 2009/0166404 A1 | 7/2009 | German et al. |
| 2010/0038130 A1 | 2/2010 | Zhong et al. |
| 2010/0054685 A1 * | 3/2010 | Cooke .................. G02B 6/4455 385/135 |
| 2010/0109892 A1 | 5/2010 | Fariello et al. |
| 2010/0183276 A1 | 7/2010 | Smith |
| 2010/0310225 A1 * | 12/2010 | Anderson ............... H04Q 1/06 385/135 |
| 2010/0322580 A1 | 12/2010 | Beamon et al. |
| 2011/0217017 A1 | 9/2011 | Drouard et al. |
| 2012/0022335 A1 * | 1/2012 | Assaker ............. A61B 17/0206 600/225 |
| 2012/0037416 A1 | 2/2012 | Chiou |
| 2012/0051707 A1 | 3/2012 | Barnes et al. |
| 2012/0211447 A1 * | 8/2012 | Anderson ............... H04Q 1/13 29/525.01 |
| 2012/0224823 A1 | 9/2012 | Cox et al. |
| 2012/0281509 A1 | 11/2012 | Liang et al. |
| 2012/0328251 A1 | 12/2012 | Takeuchi et al. |
| 2013/0004136 A1 | 1/2013 | Brower et al. |
| 2013/0008594 A1 | 1/2013 | Takeuchi et al. |
| 2013/0022324 A1 | 1/2013 | Takeuchi et al. |
| 2013/0064506 A1 | 3/2013 | Eberle, Jr. et al. |
| 2013/0101262 A1 | 4/2013 | Wei et al. |
| 2013/0196538 A1 | 8/2013 | Takeuchi et al. |
| 2014/0038462 A1 | 2/2014 | Coffey et al. |
| 2015/0048776 A1 * | 2/2015 | Davoren ............. H01L 31/0547 320/101 |
| 2015/0155696 A1 | 6/2015 | Coenegracht et al. |
| 2015/0234132 A1 | 8/2015 | Guo et al. |
| 2016/0178859 A1 | 6/2016 | Thompson et al. |
| 2017/0003459 A1 | 1/2017 | Takeuchi et al. |
| 2017/0097471 A1 | 4/2017 | Fletcher |
| 2017/0195051 A1 | 7/2017 | Yamamoto et al. |
| 2017/0235067 A1 | 8/2017 | Holmberg et al. |
| 2017/0235076 A1 | 8/2017 | Solheid et al. |
| 2018/0027703 A1 | 1/2018 | Adiletta et al. |
| 2018/0081139 A1 | 3/2018 | Geens et al. |
| 2018/0136410 A1 | 5/2018 | Takeuchi et al. |
| 2019/0260175 A1 | 8/2019 | Peng et al. |
| 2022/0120989 A1 * | 4/2022 | Takeuchi ............. G02B 6/4471 |

FOREIGN PATENT DOCUMENTS

| | | |
|---|---|---|
| WO | 2018204864 A1 | 11/2018 |
| WO | 2020091823 A1 | 5/2020 |

OTHER PUBLICATIONS

Corrected International Search Report with Written Opinion for Application No. PCT/US2019/00063 dated Apr. 7, 2020, 22 pages.
International Search Report for PCT/US18/31219 dated Aug. 1, 2018.
Excerpt of ISE Magazine, vol. 36, Issue 2 (Feb. 2018).
"YOURx-Aerial Terminal—Patch and Splice", Clearfield, Aug. 31, 2018, 4 pages.
"FieldShield YOURx-Terminal: Installation Manual", Clearfield, Jul. 2017, 33 pages.
"YOURx-Aerial Terminal: Installation Manual", Clearfield, Sep. 2018, 29 pages.
"YOURx-Terminal", Clearfield, Oct. 29, 2018, 7 pages.
"Guide to Fiber Optics & Premises Cabling", The Fiber Optic Association, Inc., http://www.thefoa.org/tech/ref/OSP/term.html, 2015, 27 pages.
International Search Report with Written Opinion for Application No. PCT/US2019/063749 dated Mar. 24, 2020, 17 pages.
Wellbrock GA, Xia TJ, Huang MF, Chen Y, Salemi M, Huang YK, Ji P, Ip E, Wang T. First field trial of sensing vehicle speed, density, and road conditions by using fiber carrying high speed data. In2019 Optical Fiber Communications Conference and Exhibition (OFC) Mar. 7, 2019 (pp. 1-3). IEEE.
"S918A Temporary Fiber Aligner," <http://www.fitel.k2international.net/Fitel_S612_Fixture_files/S612%20Ribbon%20Forming%20Fixture.pdf>, dated Sep. 10, 2008.
Extended European Search Report issued in Appln. No. 19889245.7 dated Aug. 29, 2022 (13 pages).

(56) References Cited

OTHER PUBLICATIONS

Extended European Search Report issued in Appln. No. 19879838.1 dated Jun. 9, 2022 (9 pages).

* cited by examiner

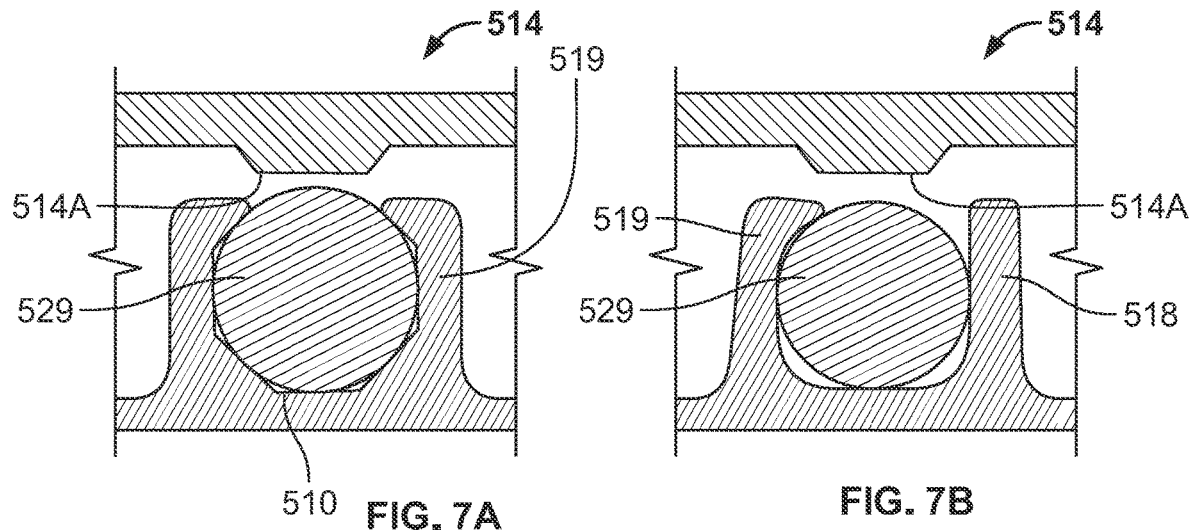
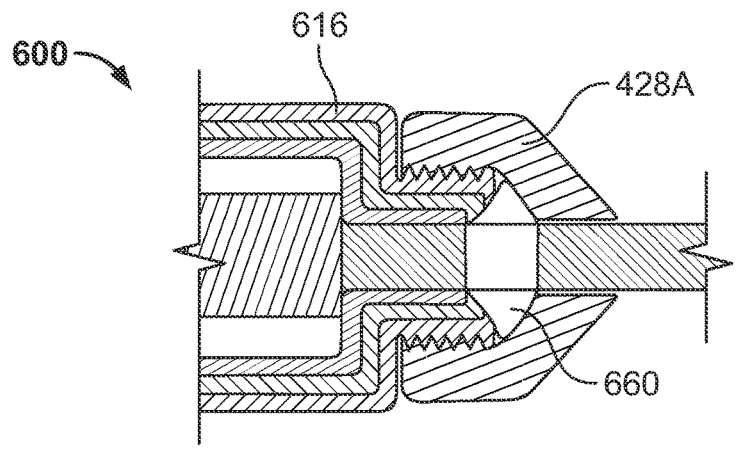
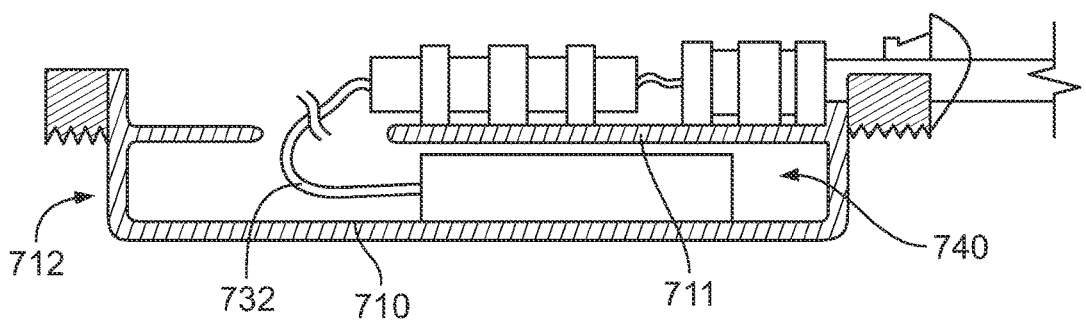

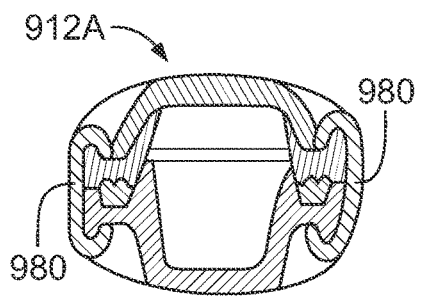 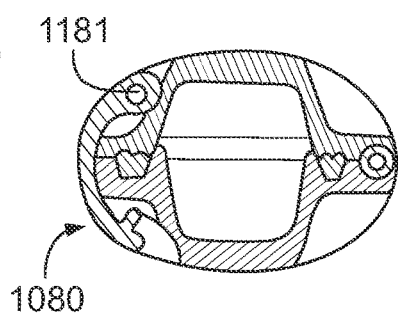 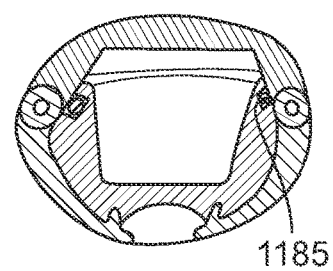
FIG. 13A    FIG. 13B    FIG. 13C
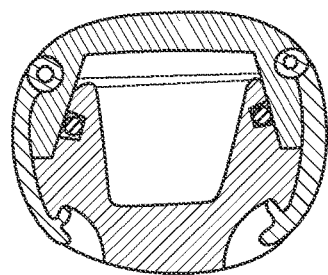 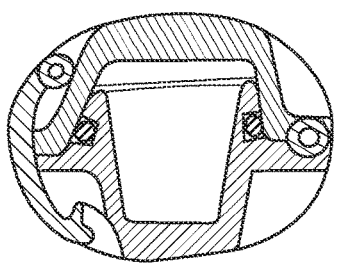 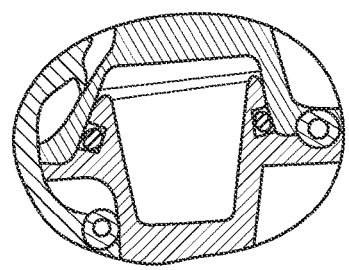
FIG. 13D    FIG. 13E    FIG. 13F
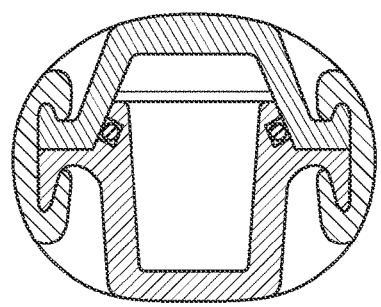 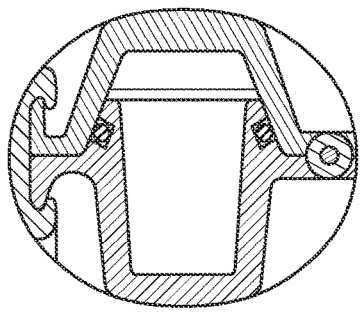
FIG. 13G    FIG. 13H

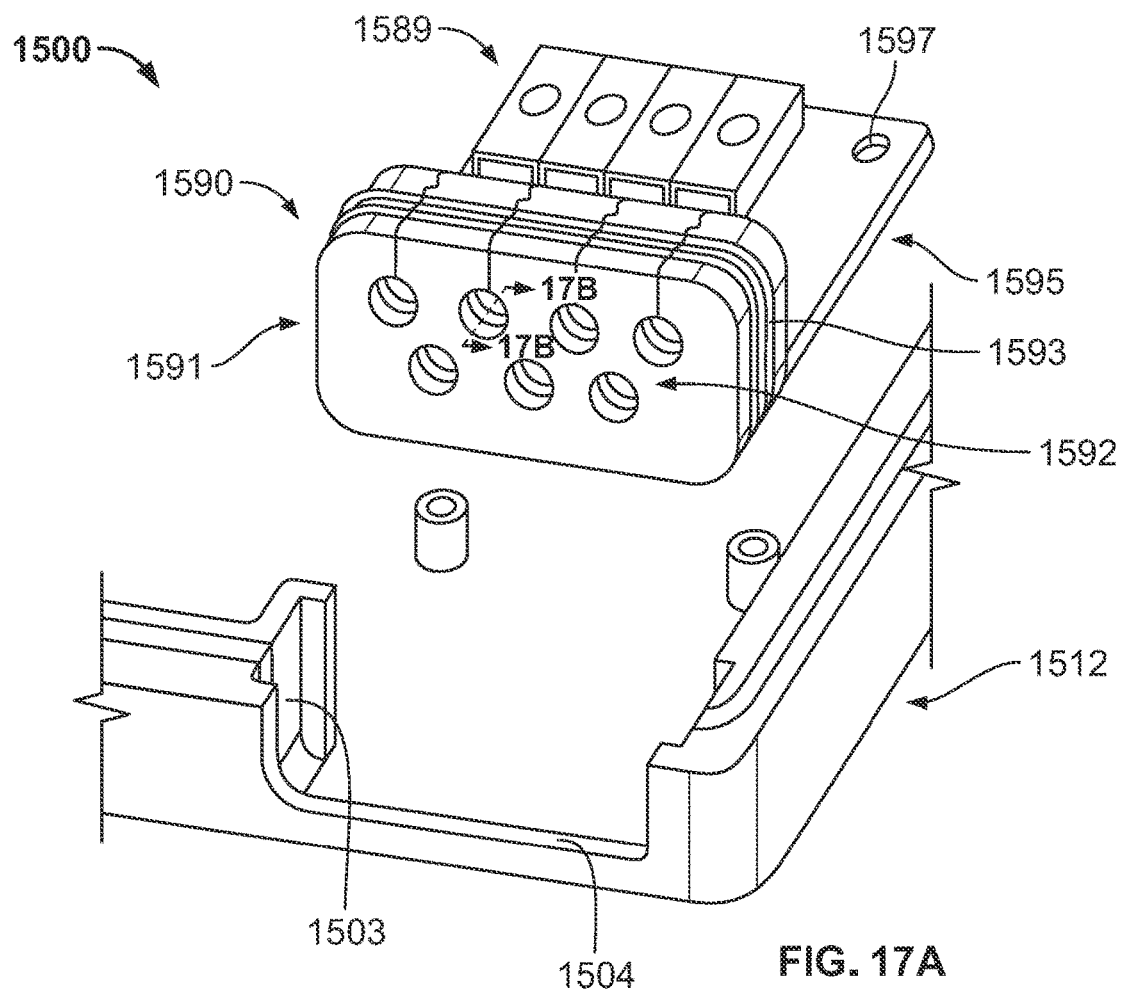
FIG. 17A
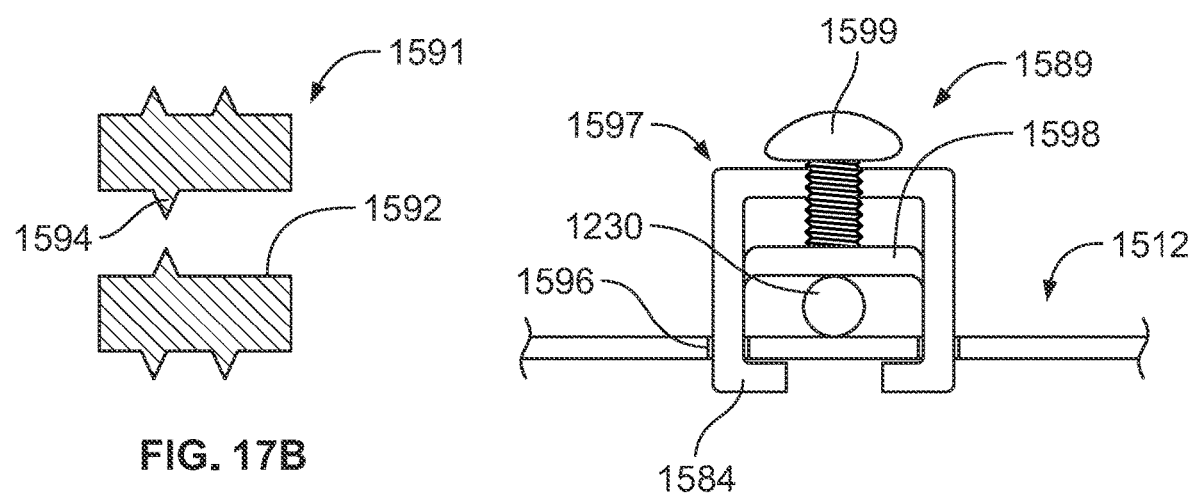
FIG. 17B
FIG. 17C

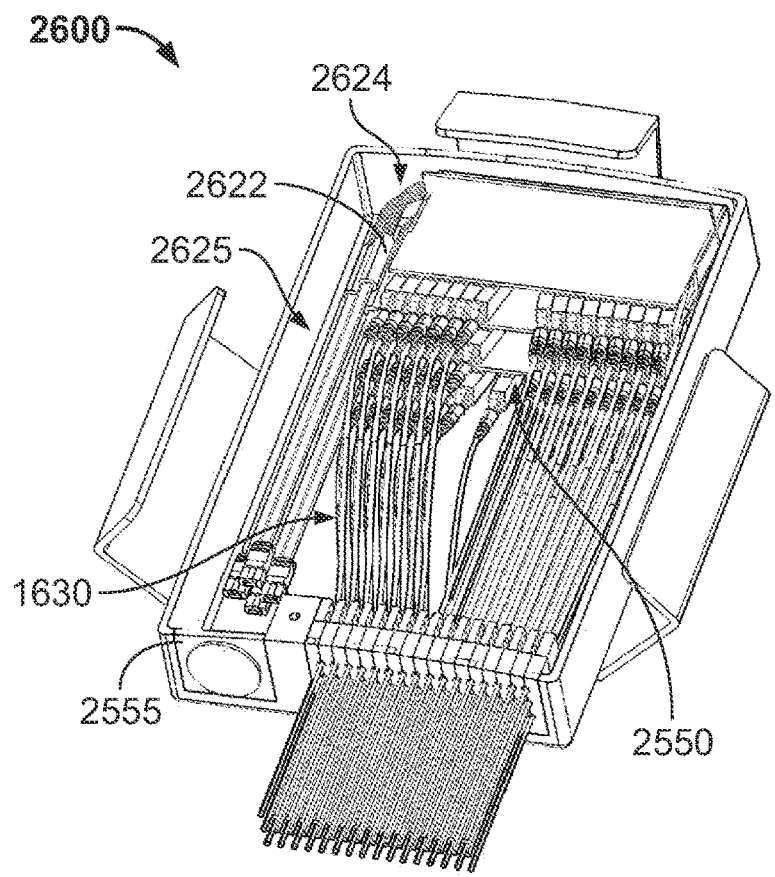
FIG. 24A
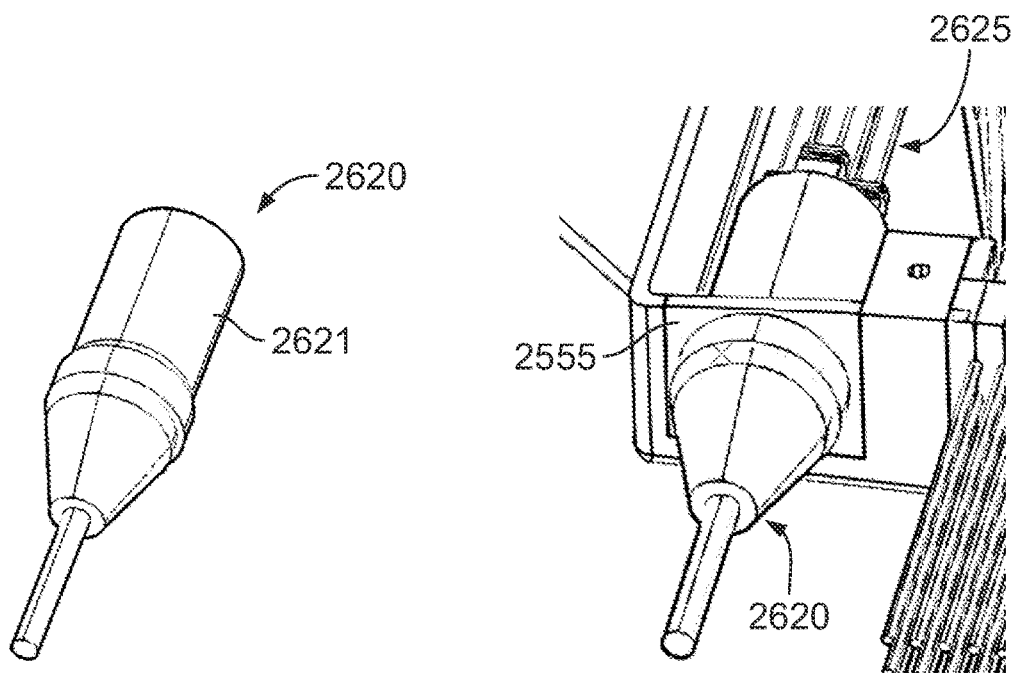
FIG. 24B
FIG. 24C

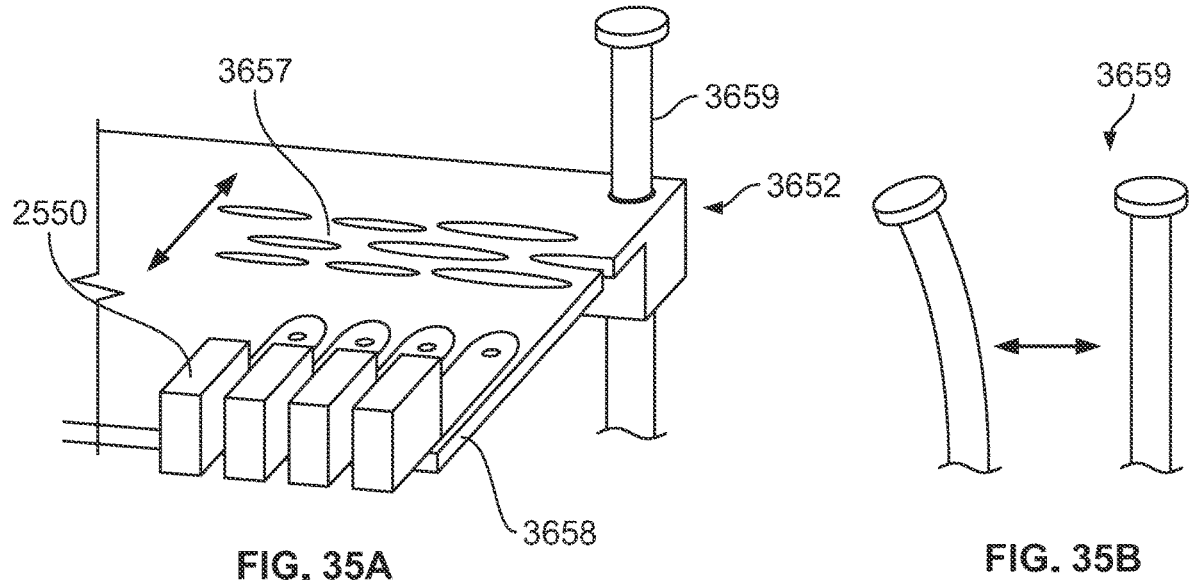
FIG. 35A
FIG. 35B
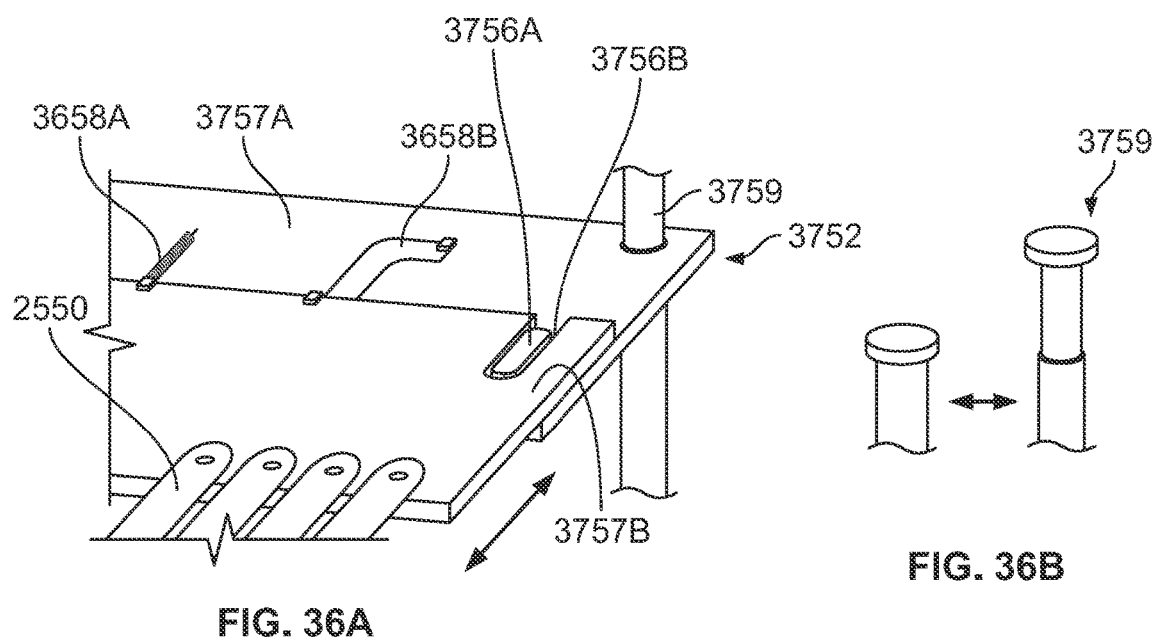
FIG. 36A
FIG. 36B

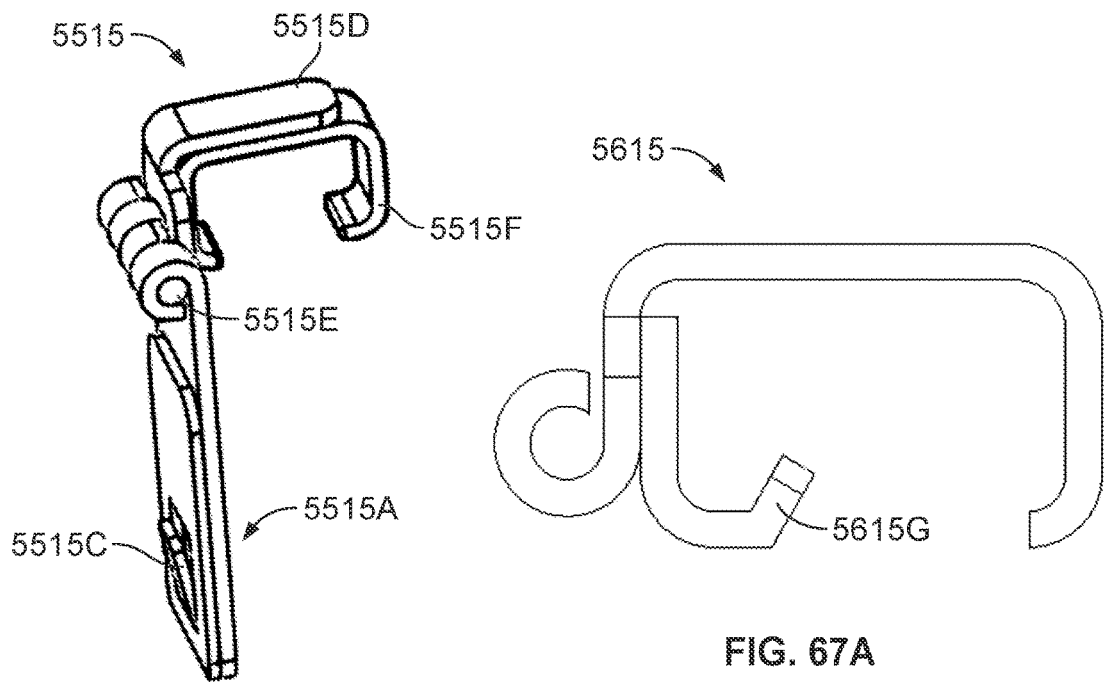
FIG. 66
FIG. 67A
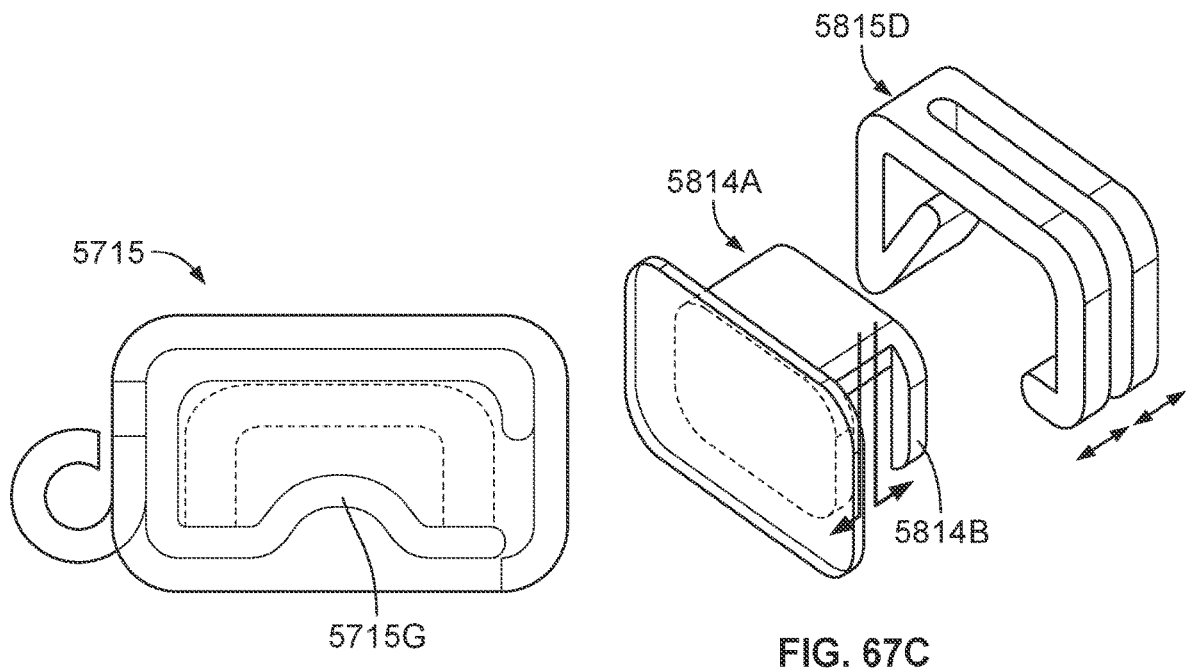
FIG. 67B
FIG. 67C

CABLE TERMINATION ASSEMBLY WITH DISENGAGEMENT PREVENTION STRUCTURES

CROSS-REFERENCE TO RELATED APPLICATIONS

The present application is a national phase entry under 35 U.S.C. § 371 of International Application No. PCT/US2019/000063, filed Nov. 4, 2019, and now published as WO 2020/091823 A9, which claims the benefit of the filing date of U.S. Provisional Patent Application No. 62/855,470, filed May 31, 2019, the benefit of the filing date of U.S. Provisional Patent Application No. 62/813,475, filed Mar. 4, 2019, and the benefit of the filing date of U.S. Provisional Patent Application No. 62/754,978, filed Nov. 2, 2018, and is related to International Application No. PCT/US2018/031219, filed May 4, 2018, and U.S. Provisional Patent Application No. 62/501,639, filed May 4, 2017, the disclosures of all of which are hereby incorporated herein by reference.

FIELD

The present disclosure relates generally to optical systems and assemblies and, in particular, to the storage and environmental protection of such devices.

BACKGROUND

Outside plant (OSP) enclosures contain and provide protection for antenna units, kiosk terminals, and associated electronics equipment and wiring from harsh environmental factors such as sunlight, heat, wind, and rain. In hybrid arrangements, OSP enclosures further provide desired fiber optic distribution functionality by containing therein a plurality of optical fibers, splitters, multiplexers, patch panels, and the like interconnected with one another in a desired manner, adding complexity to the enclosures with limited available space and thus adding assembly costs. Further, the complexity and limited space in hybrid arrangements make maintenance and repairs on the OSPs more cumbersome. Hybrid arrangement OSPs also may be replaced prematurely when only a portion of such OSPs requires replacement, adding unnecessary costs.

Electronics engineers designing the antenna units and kiosk terminals generally are unaware of constraints imposed by having such components interconnected with the fiber optic distribution equipment to be contained within an enclosure, such as an OSP enclosure, and the components are not configured appropriately for such configuration. As such, the configuration of hybrid arrangements is not optimized for the limited space provided, leading to poor sealing of the componentry and the inducement of bending stresses on components such as cables leading to premature component or even system failures.

Accordingly, a better system is needed to accommodate and protect the components of hybrid arrangements of OSP enclosures and of optical fiber termination systems within other similar enclosures.

SUMMARY

In accordance with an aspect of the technology, an optical fiber cable and termination unit assembly may include a housing, a patch panel terminal, an input optical fiber, a plurality of output optical fibers, and a seal assembly. The housing may have an interior surface. The patch panel terminal may be coupled to the interior surface of the housing. The input optical fiber may extend into the housing. The plurality of output optical fibers may extend out of the housing from the patch panel terminal. In this manner, a light beam emitted from the input optical fiber may be divided into a plurality of light beams that are received by the patch panel terminal. The seal assembly may be at either one or both of between the input optical fiber and the housing and between the housing and the plurality of output optical fibers.

In some arrangements, the assembly may include an output coupling element that may extend from the housing and may define a first longitudinal axis extending in directions towards and away from the housing. In such arrangements, the plurality of output optical fibers may extend through the output coupling element.

In some arrangements, the output coupling element may be substantially uniform in shape and size along a length of the output coupling element along the first longitudinal axis.

In some arrangements, the output coupling element may be tapered along a length of the output coupling element along the first longitudinal axis.

In some arrangements, the housing may define an output hole through which the plurality of output optical fibers may extend. In such arrangements, the output coupling element may contact the housing around an entire perimeter of the output hole to form a watertight seal at an interface of the output coupling element and the housing.

In some arrangements, the output coupling element may include a first flange, which may be an output coupling flange, extending from an end of the output coupling element in a direction transverse to the first longitudinal axis, and wherein an entire perimeter of the first flange is adhered to the interior surface of the housing to form the watertight seal.

In some arrangements, the output coupling element may be molded onto the housing around an entire perimeter of the output hole such that the output coupling element is inseparable from the housing without fracture of either one or both of the output coupling element and the housing.

In some arrangements, the plurality of output optical fibers may extend through an outer sheath. In such arrangements, the outer sheath may extend through the output coupling element.

In some arrangements, the output coupling element may include a neck that may be at a location spaced from the housing and that may have a smaller inner perimeter than other sections of the output coupling element. In this manner, the neck may conform to a perimeter of the outer sheath to form the watertight seal.

In some arrangements, the output coupling element may abut an exterior surface of the housing opposite the interior surface of the housing. In this manner, the output coupling element may be completely exterior to the housing, and the abutment of the output coupling element may form the watertight seal.

In some arrangements, the output coupling element may extend into the first hole defined by the housing.

In some arrangements, the output coupling element may define an output coupling groove, or simply "output groove," around an entire perimeter of the output coupling element. In such arrangements, the housing may extend into the output coupling groove at the output hole in an interference fit to form the watertight seal. In some such arrangements, a wall of the housing may have a housing wall thickness and may extend around the entire perimeter of the output coupling element. In such arrangements, a width of the output coupling groove in a direction a longitudinal axis of the output coupling element extends may be less than or equal to the housing wall thickness.

In some arrangements, the output coupling element may be made of rubber or plastic.

In some arrangements, the plurality of output optical fibers may extend through an outer sheath. In such arrangements, the outer sheath may extend through the output coupling element. In some such arrangements, the output coupling element may include an outer boot, an inner boot, an inner lock, and an outer lock ring. The outer boot may be in abutment against an exterior surface opposite the interior surface of the housing. The inner boot may be adjacent to the interior surface of the housing. The outer lock ring may be attached to the housing and may form a threaded connection with the inner lock ring. In this manner, upon threading the inner lock ring in a direction towards the housing, the inner boot may be compressed by the inner lock ring against the outer sheath of the output coupling element to form the watertight seal.

In some arrangements, the optical fiber cable and termination unit assembly may include an input coupling element that may extend from the housing and may define a second longitudinal axis extending in directions towards and away from the housing. In such arrangements, the input optical fiber may extend through the input coupling element.

In some arrangements, the housing may define an input hole through which the input optical fiber cable may extend. In such arrangements, the input coupling element may contact the housing around an entire perimeter of the input hole to form a watertight seal.

In some arrangements, the input coupling element may include a second flange, which may be an input coupling flange, extending from an end of the input coupling element in a direction transverse to the second longitudinal axis. In such arrangements, an entire perimeter of the second flange may be adhered to the interior surface of the housing to form the watertight seal.

In some arrangements, the input coupling element may be molded onto the housing around the entire perimeter of the input hole such that the input coupling element may be inseparable from the housing without fracture of either one or both of the input coupling element and the housing.

In some arrangements, the input coupling element may extend into the second hole defined by the housing.

In some arrangements, the input coupling element may define an input coupling groove, or simply "input groove," around an entire perimeter of the input coupling element. In such arrangements, the housing may extend into the input coupling groove at the input hole in an interference fit to form the watertight seal. In some such arrangements, a wall of the housing may have a housing wall thickness and may extend around the entire perimeter of the input coupling element. In such arrangements, a width of the input coupling groove in a direction a longitudinal axis of the input coupling element extends may be less than or equal to the housing wall thickness.

In some arrangements, the input coupling element may abut an exterior surface of the housing opposite the interior surface of the housing such that the input coupling element may be completely exterior to the housing, and the abutment of the input coupling element may form the watertight seal.

In some arrangements, the input optical fiber may extend through an outer sheath. In such arrangements, the outer sheath may extend through the input coupling element. In some such arrangements, the input coupling element may include an outer boot, an inner boot, an inner lock ring, and an outer lock ring. The outer boot may be in abutment against an exterior surface opposite the interior surface of the housing. The inner boot may be adjacent to the interior surface of the housing. The outer lock ring may be attached to the housing and may form a threaded connection with the inner lock ring. In this manner, upon threading the inner lock ring in a direction towards the housing, the inner boot may be compressed by the inner lock ring against the outer sheath of the input coupling element to form the watertight seal.

In some arrangements, the input coupling element may be made of rubber or plastic.

In some arrangements, the optical signal assembly may include an optical splitter or an optical wavelength division multiplexer.

In some arrangements, a plurality of intermediate optical fibers may be connected to the patch panel terminal and the optical signal assembly. In such arrangements, the plurality of light beams received by the patch panel terminal may travel along respective ones of the plurality of intermediate optical fibers.

In some arrangements, the cable and termination unit assembly may be an outside plant (OSP) cable assembly.

In accordance with another aspect of the technology, an optical fiber termination system may include an enclosure, a plurality of electronic or optical devices within the enclosure, and an optical fiber cable and termination unit assembly that may include a housing, a patch panel terminal, an optical signal assembly, an input optical fiber, and a plurality of output optical fibers. The enclosure may be separate from, i.e., adjacent to or spaced from, the housing of the optical fiber cable and termination unit assembly. The housing may have an interior surface. The patch panel terminal may be coupled to the interior surface of the housing. The input optical fiber may extend into the housing to the optical signal assembly. The plurality of output optical fibers may extend out of the housing from the patch panel terminal. In this manner, the optical signal assembly may divide a light beam emitted from the optical signal assembly into a plurality of light beams that are received by the patch panel terminal. The plurality of output optical fibers may be configured to convey respective light beams to any one or any combination of the plurality of electronic or optical devices in the enclosure.

In some arrangements, the plurality of electronic or optical devices may include any one or any combination of an antenna, a kiosk terminal, and an optical switch.

In some arrangements, the optical fiber cable and termination unit assembly may further include an output coupling element and an input coupling element that may both extend from the housing. In such arrangements, the plurality of output optical fibers may extend through the output coupling element, and the input optical fiber may extend through the input coupling element.

In some arrangements, the enclosure may include an enclosure hole. In such arrangements, the output coupling element may contact the enclosure around an entire perimeter of the enclosure hole to form a watertight seal at an interface of the output coupling element and the enclosure.

In some arrangements, the plurality of output optical fibers may extend through an outer sheath and a cable connector. In such arrangements, the outer sheath may extend through the output coupling element to the cable connector which may be attached to the enclosure.

In some arrangements, the output coupling element may include a neck at a location spaced from the housing and may have a smaller inner perimeter than other sections of the output coupling element. In this manner, the neck may conform to a perimeter of the outer sheath to form the watertight seal.

In accordance with another aspect of the technology, an optical fiber termination system may be assembled through a process. In this process, output optical fibers extending through an output optical fiber coupling may be attached to terminals within an enclosure. In such arrangements, the output optical fibers may be connected to a patch panel terminal within a housing outside the enclosure and may be optically connected to an input optical fiber extending into the housing. In the process, the output optical fiber coupling may be joined to the enclosure to form a watertight seal. Preferably, the output optical fiber coupling may be so joined subsequent to the attachment of the output optical fibers to the terminals within the enclosure.

In accordance with another aspect of the technology, an optical fiber termination system may include a housing, a first cable, and a catch. The housing may define at least a first portion of a first passageway and an inner surface surrounding the first portion of the first passageway. The first passageway may define a central axis. The inner surface may define an interior of the housing. The first cable may be receivable through the first portion of the first passageway. The first cable may include a first optical fiber and may define a cable longitudinal axis. The catch may be receivable in the housing and may be attachable to and extendable from the first cable in a direction transverse to the cable longitudinal axis such that the catch limits movement of the first cable in a direction away from the interior of the housing when the catch is received in the housing and the first cable is received through the first portion of the first passageway.

In some arrangements, the inner surface may surround an end of the first passageway.

In some arrangements, the interior of the housing may include a channel configured for receiving the catch.

In some arrangements, the channel may be defined at least in part by opposing walls configured for contacting opposite sides of the catch.

In some arrangements, at least one of the walls may include at least one hook allowing the catch to be snapped into the channel.

In some arrangements, the channel may be defined at least in part by rounds or chamfers. In some such arrangements, the rounds or chamfers may approximate the shape of the catch. In some arrangements, the channel is an open channel. In such arrangements, the channel may further include a lid configured for covering a portion of the housing. The lid may include a flange that may be configured to extend partially into the open channel to limit movement of the first cable in a direction towards the lid when the first cable is received in the open channel.

In some arrangements, the catch may include or may be in the form of a tube. In some arrangements, the tube may be adhered to the first cable. In some arrangements, the tube may include barbs that may be configured to extend into the outer surface of the first cable such that the tube remains fixed in position relative to the outer surface of the first cable when the barbs extend into the outer surface of the first cable.

In some arrangements, the tube may include a plurality of partial tubes that may be attached to each other by one or more hinges.

In some arrangements, the tube may include a first section and a second section extending from the first section. At least a portion of the second section of the tube may have a greater outside diameter than the first section to define a step. The step may limit the movement of the first cable in the direction away from the interior of the housing when the catch is received in the housing and the first cable is received through the first passageway.

In some arrangements, the optical fiber termination system may include a coupling tube and a retention ring that may each define portions of the first passageway. A first portion of the coupling tube may be configured for positioning between the retention ring and the housing, and a second portion of the coupling tube may be configured to extend through the housing. The retention ring may be movable along the first cable to compress the first portion of the coupling tube, and the second portion of the coupling tube may be configured for contacting the housing such that the coupling tube compresses the first cable to approximately align the central axis and the cable longitudinal axis.

In some arrangements, the retention ring may be a lock ring configured to be threaded onto the housing.

In some arrangements, the coupling tube may include a slit along a length of the coupling tube such that the first cable is receivable in the coupling tube through the slit.

In some arrangements, the coupling tube may include a flange receivable in the interior of the housing. In such arrangements, a portion of the housing may be configured to extend between the second portion of the coupling tube and the flange to prevent axial movement of the coupling tube relative to the housing.

In some arrangements, the optical fiber termination system may further include an adapter and a second cable. In such arrangements, inner ends of the first cable and the second cable may be configured for insertion into the adapter such that the first and the second cables may be aligned so as either one or both of route an optical signal from the first cable to the second cable or route an optical signal from the second cable to the first cable.

In some such arrangements, the housing may include a platform. In such arrangements, the optical fiber termination system may further include an optical device configured for attachment to the second cable such that the optical device and the inner end of the first cable are on opposite sides of the platform.

In some arrangements, the optical fiber termination system may further include an additional cable, the additional cable including an additional optical fiber and defining an additional cable longitudinal axis, wherein the housing includes a plurality of housing tubes extending from an exterior of the housing opposite the interior of the housing, the plurality of housing tubes defining respective portions of passageways including a portion of the first passageway, and wherein the first cable and the additional cable are receivable through respective ones of the plurality of housing tubes.

In some such arrangements, the optical fiber termination system further includes a lid and a plurality of lock rings. The lid may be configured for covering at least the interior of the housing. The plurality of lock rings may be configured for threading onto respective ones of the plurality of the housing tubes. The plurality of lock rings may be removable when the lid is covering the interior of the housing.

In some such arrangements, the plurality of the housing tubes may define respective housing tube central axes. In such arrangements, the optical fiber termination system may further include a plurality of coupling tubes configured for surrounding and for coupling to respective ones of the plurality of the housing tubes. The plurality of the lock rings may define portions of passageways including a portion of the first passageway. A first portion of each of the coupling tubes may be configured for positioning between respective ones of the plurality of the housing tubes and the plurality of the lock rings. A second portion of each of the coupling tubes may be configured to extend partially through the housing. The lock rings may be movable along the respective cables to compress the first portions of the respective coupling tubes. The second portions of the respective coupling tubes may be configured for contacting the housing such that the respective coupling tubes compress the respective cables to approximately align each of the respective housing tube central axes and the cable longitudinal axes.

In some arrangements, the optical fiber termination system may further include a lid configured for covering at least the interior of the housing. The lid may include respective portions of the plurality of the housing tubes. The lid and the housing together may form entireties of the plurality of the housing tubes when the lid covers the interior of the housing.

In some arrangements, the optical fiber termination system may further include an adhesive applied to the housing and the catch to limit the movement of the first cable in a direction away from the interior of the housing when the catch is received in the housing and the cable is received through the first portion of the first passageway.

In some arrangements, the housing may include a base and a lid configured for covering at least an interior of the base. In such arrangements, the optical fiber termination assembly may include a latch that may be slideable over corresponding closure portions of the base and the lid. In a first position of the latch, the latch may overlie the closure portion of the lid when the lid is covering the interior of the base such that the lid is unable to be opened, and in a second position of the latch, the latch is offset from the closure portion of the lid when the lid is covering the interior of the base such that the lid is able to be opened.

In some arrangements, the housing may include a base and a lid configured for covering at least an interior of the base. In such arrangements, the optical fiber termination system may include a latch attached to either the base or the lid. The latch may latch the lid to the base in a closed position of the latch when the lid is covering the interior of the base such that the lid is not able to be opened. The lid may be able to be opened when the lid is covering the interior of the base in an open position of the latch.

In some arrangements, the catch may be an adjustable clamp attached to or attachable to the housing. In such arrangements, the catch may be configured for receiving at least the first optical fiber of the first cable. The clamp, when tightened, may limit the movement of the first cable in the direction away from the interior of the housing when the catch is received in the housing and the first cable is received through the first portion of the first passageway. The clamp, when loosened, may allow the first cable to be separated from the clamp.

In some such arrangements, the adjustable clamp may be a screw.

In some arrangements, the optical fiber and termination assembly may include an adapter and a second cable. The adapter may be attached to or attachable to the housing. The second cable may include a second optical fiber. The first cable and the second cable may be attachable to the adapter such that ends of the first optical fiber and the second optical fiber may confront and may be aligned with each other.

In some such arrangements, the first cable and the second cable may include respective first and second connectors that may attach the first and the second cables to the adapter to align the respective first and second optical fibers with each other.

In some arrangements, the housing may include a housing wall that may divide the housing into separate compartments. The adapter may be receivable into and may extend into the housing wall.

In some arrangements, the optical fiber termination assembly may further include a stabilizer attached to or attachable to the inner surface of the housing. The stabilizer may be spaced from the adapter. The stabilizer may be configured to support at least the first optical fiber.

In some such arrangements, at least the first optical fiber of the first cable may extend through the stabilizer. In such arrangements, the stabilizer may include a slot in which at least the first optical fiber extends within and across the slot of the stabilizer.

In some arrangements, the optical fiber termination assembly may include a routing projection that may extend from or may be extendable from the housing such that a portion of the first optical fiber of the first cable extending between the adjustable clamp and the stabilizer wraps at least partially around the routing projection.

In some such arrangements, the first cable may form an approximately 90 degree angle when the first cable is attached to the adapter and wraps at least partially around the routing projection.

In some arrangements, the optical fiber termination assembly may further include a coupling tube and a plug. The coupling tube may extend from and around the first cable. The coupling tube may include opposing ends separated by a thickness. Either one or both of the opposing ends of the coupling tube may be chamfered. The plug may be insertable into the housing. The plug may compress the coupling tube in a first position relative to the housing thereby may result in compression of a first portion of the first cable to maintain the position of the first portion of the first cable relative to the plug. The first portion of the first cable may be movable relative to the plug when the plug is in a second position relative to the housing.

In some arrangements, either one or both of the coupling tube and the plug may include a slit through which the first cable may be insertable.

In some arrangements, the optical fiber termination assembly may further include a wall and a first lid. The wall may define a plurality of compartments. The first lid may cover at least one compartment of the plurality of compartments.

In some such arrangements, the optical fiber termination assembly may include a second lid in which the first and the second lid may share a hinge.

In some arrangements, the optical fiber termination assembly may further include a second lid that may cover the first lid and the plurality of compartments.

In some arrangements, the housing may include a slot. In such arrangements, the catch may be an insert assembly that may include a flexible insert insertable into the slot. The flexible insert may include a plurality of insert holes, which may form portions of passageways including the first passageway, and which may be configured for receiving a plurality of cables. The plurality of insert holes may include the first insert hole and the plurality of cables may include the first cable.

In some arrangements, the first insert hole may include ribbing that may be configured to provide an interference fit when the first cable is received in the first insert hole.

In some arrangements, the flexible insert assembly may include an adjustable clamp that may be configured to receive at least the first optical fiber of the first cable. The clamp, when tightened, may limit the movement of the first cable in the direction away from the interior of the housing when the insert assembly is received in the housing and the first cable is received through the first insert hole and the first portion of the first passageway. The clamp, when loosened, may allow the first cable to be separated from the clamp.

In some such arrangements, the adjustable clamp may be a screw.

In some arrangements, the insert assembly may further include a plate that may be attached to or attachable to the insert and may be configured to extend into the interior of the housing. In such arrangements, the clamp may be attached to or attachable to the plate.

In some arrangements, the insert further may include a slit along a length of the first insert hole such that the first cable may be receivable in the first passageway through the slit.

In some arrangements, the housing may include a first slot. In some such arrangements, the catch may include a first set of stacked layers that may be receivable into the first slot. A combination of stacked layers of the first set of stacked layers may define a plurality of insert holes that may be configured for receiving a plurality of cables, respectively, including the first cable.

In some arrangements, the first set of stacked layers may include a first layer that may define a plurality of first grooves and a second layer adjacent to the first layer that may define a plurality of second grooves. A combination of corresponding first and second grooves of the first and the second layers may define the plurality of insert holes.

In some arrangements, either one or both of the plurality of first grooves and the plurality of second grooves may have a cross-section in a saw-tooth pattern. In some arrangements, either one or both of the first grooves and the second grooves may have a cross-section in a v-pattern. In some arrangements, either one or both of the first grooves and the second grooves may have a cross-section that may define an arc. In some arrangements, the plurality of insert holes may define a cross-section in the form of a circle.

In some such arrangements, the catch further may include a fastener that may extend through the first and the second layers and that may be configured for attachment to the housing. In such arrangements, the fastener may clamp the first and the second layers together and thereby may clamp the first cable in one of the plurality of insert holes when the fastener is attached to the housing and the first cable is received in one of the plurality of insert holes.

In some arrangements, the housing may include a first slot. In some such arrangements, the catch may include a plurality of sets of stacked layers that may be receivable into the first slot. A combination of stacked layers of each of the sets of stacked layers may define a plurality of insert holes that may be configured for receiving a plurality of cables, respectively, including the first cable.

In some arrangements, each of the sets of stacked layers may include a flexible first layer that may define a plurality of first grooves and a flexible second layer adjacent to the first layer that may define a plurality of second grooves. A combination of corresponding first and second grooves of the pluralities of the first and the second grooves of each of the respective first and second layers may define the plurality of insert holes. In some arrangements, the first and the second layers of each of the stacked layers may be made of a flexible plastic or rubber. In some arrangements, the catch further may include a rigid middle layer between each of the sets of stacked layers. In some such arrangements, the rigid middle layer may be attached to a second layer of one of the sets of stacked layers and to a first layer of another one of the sets of stacked layers. In some arrangements, the catch further may include a rigid outer layer that may define an outer end of the catch. In some such arrangements, the rigid outer layer may be attached to the first layer of one of the sets of stacked layers. In some arrangements, the second layer of one of the sets of stacked layers may be attached to the housing such that the housing may define an inner end of the catch opposite the outer end. In some arrangements, the catch further may include a rigid inner layer that may oppose the outer layer and that may be attached to the housing. In such arrangements, the inner layer may define an inner end of the catch.

In some arrangements, the housing may include a base and a lid configured for attachment with the base or rotatably attached to the base. In such arrangements, an entirety of the first slot may extend in the base such that an entirety of the catch may be receivable in the first slot.

In some arrangements, the catch further may include at least a first fastener that may extend through at least first and second sets of stacked layers of the plurality of stacked layers and at least a second fastener that may extend through only the second set of stacked layers of the plurality of stacked layers. Each of the first and the second fasteners may be configured for attachment to the housing. The first fastener may clamp the first and the second layers of each of the first and the second sets of stacked layers together to thereby clamp the first cable in one of the plurality of insert holes when the first fastener is attached to the housing and the first cable is received in one of the plurality of insert holes. The second fastener may clamp the first and the second layers of the second set of stacked layers together without clamping the first and the second layers of the first set of stacked layers together. In this manner, the second fastener may clamp the first cable in one of the plurality of insert holes defined by the second set of stacked layers when the second fastener is attached to the housing and the first cable is received in one of the plurality of insert holes defined by the second set of stacked layers.

In some arrangements, the optical fiber termination system further may include a plurality of stacked panels and a plurality of first cables. The plurality of stacked panels may be coupled to an inner surface of the housing. Each of the panels may include an array of adapters in which each of the adapters may be movable relative to the inner surface of the housing. The plurality of first cables each may have ends receivable into first ports of the plurality of adapters such that the first cables, when received into the first ports, may be moveable towards and away from one or more other first cables of the plurality of first cables.

In some arrangements, the stacked panels may be in the form of a patch panel assembly. In some arrangements, the ends of each of the plurality of first cables may be defined by optical connectors.

In some arrangements, each panel of the plurality of stacked panels further may include a panel base fixed to the housing and to the array of adapters of the respective panel. In such arrangements, at least a portion of the panel base may be rotatable in directions towards and from the inner surface of the housing. In some arrangements, the adapters of at least one of the panels may be movable relative to the panel base. In some arrangements, the adapters of at least one of the panels may be rotatable within a plane defined by the panel that includes the adapters. In some arrangements, the adapters of at least one of the panels may be articulable relative to the panel base. In some arrangements, the adapters of at least one of the panels may be slidable relative to the panel base.

In some arrangements, each panel of the plurality of stacked panels further may include a panel base fixed to the housing and to the array of adapters of the respective panel. In such arrangements, at least a portion of the panel base may be slideable in directions parallel to the inner surface of the housing.

In some arrangements, the optical fiber termination system, further may include a plurality of second cables each including a second optical fiber. Each of the second cables may have ends that may be receivable into or that may extend from a second port of a respective one of the plurality of adapters. The end of one of the second cables may be aligned with an end of one of the first cables when the end of the one of the first cables is received in the first port of the respective one of the plurality of adapters and the end of the one of the second cables is received in or extends from respective one of the plurality of adapters.

In some arrangements, the plurality of second cables may extend through the housing. In some arrangements, the ends of each of the plurality of second cables may be defined by optical connectors.

In some arrangements, the housing may include a second slot that may be spaced from the first slot and configured for receiving the plurality of second cables. In some such arrangements, the optical fiber termination assembly further may include a sleeve that may surround the second cables such that the second cables may be bunched together by the sleeve. In some such arrangements, the sleeve may be rigid and the second cables may be flexible.

In some arrangements, the optical fiber termination system further may include a second slot insert assembly that may be receivable into the second slot. In some such arrangements, the sleeve may be rigid and the second cables may be flexible.

In some arrangements, the housing may include a base and a lid configured for attachment with the base or rotatably attached to the base. In such arrangements, an entirety of the second slot may extend in the base such that an entirety of the second slot insert assembly may be receivable in the first slot.

In some arrangements, the housing may include a base and a lid configured for attachment with the base or rotatably attached to the base. In such arrangements, the edge of the base or an edge of the lid may overlap the other one of the edge of the base and the edge of the lid.

In some arrangements, the housing may include a base and a lid rotatably attachable to the base. In such arrangements, the lid may be detachable from the base at a range of angles of rotation relative to the base.

In some arrangements, the housing may include a first slot. In such arrangements, the catch may include a plurality of stacked layers that may be receivable into the first slot. Each of the stacked layers may define a plurality of insert holes configured for receiving a plurality of cables, respectively, including the first cable.

In some arrangements, at least some of the stacked layers receivable into the first slot may be separated by rigid plates. In some arrangements, the catch further may include a fastener that may extend through the plurality of stacked layers and that may be configured for attachment to the housing. In such arrangements, the fastener may clamp the plurality of stacked layers together and thereby may clamp the first cable in one of the plurality of insert holes when the fastener is attached to the housing and the first cable is received in one of the plurality of insert holes.

In accordance with another aspect of the technology, an optical fiber termination system may include a housing and a plurality of stacked panels. The housing may include a housing base, housing walls extending from the housing base. The combination of the housing base and the housing walls may define an inner surface of the housing. The plurality of stacked panels may be coupled to the inner surface of the housing. Each of the panels may include an array of adapters. Each of the adapters may have ends that may be movable in opposing first and second directions towards and away from the inner surface of the housing and that may be movable in opposing third and fourth directions towards and away from one or more adjacent adapters.

In some arrangements, the optical fiber termination system further may include a plurality of first cables each including a first optical fiber. Each of the first cables may have ends that may be receivable into or that may extend from a first port of a respective one of the plurality of adapters.

In some arrangements, the optical fiber termination system further may include a plurality of second cables each including a second optical fiber and having ends receivable into second ports of the plurality of adapters such that the second cables, when received into the second ports, may be moveable with the respective ends of the adapters into which the second cables are received. An end of one of the second cables may be aligned with an end of one of the first cables when the end of the one of the second cables is received in the second port of the respective one of the plurality of adapters and the end of the one of the first cables is received in or extends from respective one of the plurality of adapters. In some such arrangements, at least some of the first and the second cables may extend through the housing.

In accordance with another aspect of the technology, an enclosure may include a base, a lid, a first clamp mechanism, and a second clamp mechanism. The base may have opposing base side walls and opposing base end walls extending between the base side walls. Each of the opposing base side walls may have a base rim surface that may have a portion that defines a convex first arc. The lid may be configured for covering the base and may have opposing lid side walls and opposing lid end walls extending between the lid side walls. Each of the opposing lid walls may have a lid rim surface having a portion that defines a concave second arc. The first clamp mechanism may be located on a first side of the enclosure attached to or attachable to both (i) the base at a location not along the portion of the base rim surface defining the convex first arc and (ii) the lid at a location not along the portion of the lid rim surface defining the concave second arc. The second clamp mechanism may be located on a second side of the enclosure opposite the first side of the enclosure. The second clamp mechanism may be attached to or attachable to both (i) the base at a location not along the portion of the base rim surface defining the convex first arc and (ii) the lid at a location not along the portion of the lid rim surface defining the concave second arc. The first portions of the respective lid rim surfaces may be spaced further from corresponding first portions of the base rim surfaces than second portions of the respective lid rim surfaces along the second arcs are spaced from corresponding second portions of the respective base rim surfaces when the lid is covering the base. In such arrangements, the second portions of the lid rim surfaces and the second portions of the base rim surfaces may be along the second arcs. The lid rim surfaces may be configured to extend along the base rim surfaces, respectively, when the lid is covering the base and the first and the second clamp mechanisms are attached to both the base and the lid. In some such arrangements, the enclosure may be a housing for an optical fiber termination system.

In some arrangements, the first clamp mechanism may be attached to one of the base end walls or the lid end wall corresponding to the one base end wall, and the second clamp mechanism may be attached to the other one of the base end walls or the other one of the lid end walls. In some arrangements, either one or both of the first clamp mechanism may be a hinge, a latch, a hook and flange configured to receive the hook in which the hook is attached to the base or the lid and the flange is attached to the other one of the base or the lid, a fastener such as screw or rivet, and a snap in which a first snap portion of the snap is part of the base and a second snap portion of the snap is part of the lid and the first and the second snap portions snap together.

In some arrangements, the first portions of the respective lid rim surfaces may be ends of the second arcs defined by the lid rim surfaces. In such arrangements, the first portions of the respective base rim surfaces may be ends of the first arcs defined by the base rim surfaces, the second portions of the respective lid rim surfaces are centrally located along the second arcs, and the second portions of the respective base rim surfaces are centrally located along the first arcs.

In some arrangements, the first arcs may be shorter than the respective second arcs. In some arrangements, the first arcs and the second arcs may have the same length and may be separated by a seal when the lid is covering the base and the first and the second clamp mechanisms are attached to both the base and the lid. In some arrangements, the lid rim surfaces may be configured to seal against the base rim surfaces, respectively, when the lid is covering the base and the first and the second clamp mechanisms are attached to both the base and the lid.

In accordance with another aspect of the technology, an optical fiber system may include a cable and a tube. The cable may include an optical fiber. The tube may be configured to surround an end of the cable. The tube may include barbs that may be configured to extend into the outer surface of the cable such that the tube does not slide along the cable when the barbs extend into the outer surface of the cable.

In some arrangements, the tube may include a plurality of partial tubes attached to each other by one or more hinges.

In accordance with another aspect of the technology, an optical fiber termination system may include a housing, a first cable, and a catch. The housing may define at least a first portion of a first passageway and an inner surface surrounding the first portion of the first passageway. The inner surface may define an interior of the housing. The first cable may be receivable through the first portion of the first passageway. The first cable may include an optical fiber and may define a cable longitudinal axis. The catch may be receivable in the housing and may be attachable to and extendable from the first cable in a direction transverse to the cable longitudinal axis such that movement of the catch in a direction away from the interior of the housing may be limited by the inner surface of the housing when the catch is received in the housing and the cable is received through the first portion of the first passageway. Such movement of the catch may thereby limit movement of the first cable in the direction away from the interior of the housing.

In some arrangements, the inner surface may define a step and the movement of the catch in a direction away from the interior of the housing may be limited by the step when the catch is received in the housing and the cable is received through the first portion of the first passageway.

In accordance with another aspect of the technology, an optical fiber cable in a housing for connection with an optical fiber component may be received and maintained by a process. In this process, the optical fiber cable may be received through a first passageway of the housing. The housing may define an inner surface that defines an interior of the housing. In this process, a catch may be attached to a portion of the optical fiber cable such that movement of the catch in a direction away from the interior of the housing may be limitable by the inner surface of the housing.

In some arrangements of this process, a step of the inner surface of the housing may be contacted, such as by the catch, when applying a force on the optical fiber cable in the direction away from the interior of the housing along a central axis defined by the first passageway.

In some arrangements of this process, the optical fiber cable may include a first optical fiber. In such arrangements of this process, the first optical fiber may be attached to an adapter configured for aligning the first optical fiber with a second optical fiber. In such arrangements, the second optical fiber may be configured to either one or both of route an optical signal to the first optical fiber or receive an optical signal routed from the first optical fiber.

In some arrangements of this process, movement of the first cable may be limited in the direction away from the interior of the housing.

In some arrangements of this process, the catch may be attached to the optical fiber cable prior to the optical fiber cable being received through the first passageway of the housing.

In accordance with another aspect of the technology, a housing for an optical fiber termination system may include opposing ports, an inner surface, and opposing sets of dividers. The optical fiber termination system for which the housing is configured may include a plurality of cable cables and a plurality of catches assembled onto and extending from the cables. The plurality of cable catches and at least a portion of the plurality of cables may be insertable into the housing. Each of the opposing ports may be configured to receive a cable through the ports. The inner surface may surround the opposing ports. The opposing sets of dividers may extend from the inner surface. Each of the opposing sets of dividers may be configured to at least partially surround a cable catch such that the cable catch, when fully inserted into the housing, may be maintained in position relative to the housing. The inner surface or the opposing sets of dividers may be configured to contact the cable catch to prevent the removal of the cable assembled to the cable catch.

In some arrangements, the housing may include an adapter configured for connection to the respective cables received through the opposing ports when the cables are inserted into the housing.

In accordance with an aspect of the technology, an optical fiber termination system may include a first panel and a second panel. The first panel may include a first array of first connector assemblies. The second panel may be attached to and may overlie the first panel. The second panel may include a second array of second connector assemblies. The second connector assemblies may be movable to expose one of the first connector assemblies.

In some arrangements, the second connector assemblies may be arranged to lie within a first plane and may be movable within the first plane to expose the one first connector assembly.

In some arrangements, the first array of first connector assemblies may be arranged to lie within in a second plane parallel to the first plane.

In some arrangements, the first connector assemblies and the second connector assemblies may have the same shape and dimensions.

In some arrangements, the first panel further may include a first base, and the first array of the first connector assemblies may extend from the first base. In some such arrangements, the second panel may further include a second base and the second array of the second connector assemblies may extend from the second base.

In some arrangements, the first connector assemblies and the second connector assemblies each may include a first connector and an adapter attachable to a second connector such that the first connector and the second connector may be in optical communication.

In some arrangements, the optical fiber termination system may further include an enclosure. In such arrangements, the enclosure may include a base, a lid, and a flange. The lid may be attachable to the base. The flange may be hingedly attached to a bottom of the base or to a top of the lid. The flange may be rotatable to a closed position in which a portion of the flange may extend over the top of the lid when the flange is attached to the bottom of the base and may extend over the top of the lid when the flange is attached to the bottom of the base.

In accordance with an aspect of the technology, an optical connector assembly may include an adapter, an optical fiber, a rear cover, and a central cover. The adapter may have opposing inner and outer ends. The optical fiber may be insertable into the inner end of the adapter. The rear cover may surround a portion of the optical fiber. The central cover may surround a portion of the adapter and may be attachable to the rear cover.

In some arrangements, the optical fiber may include a connector that may be inserted into the inner end of the adapter.

In some arrangements, the optical connector assembly may further include a cap attachable to the central cover to cover the outer end of the adapter.

In some arrangements, the central cover may be attached to the rear cover by threads on a first end of the central cover and may be attached to the cap by threads on a second end of the central cover opposite the first end of the central cover.

In some arrangements, the optical connector assembly may further include a bushing, which may act as an adapter holder and that may be located between and may contact the adapter and the central cover such that the bushing aligns the adapter.

BRIEF DESCRIPTION OF THE DRAWINGS

By way of description only, embodiments of the present disclosure are described herein with reference to the accompanying figures, in which:

FIG. 7A is a cross-sectional elevation view of a cable tube and a portion of a housing of the optical fiber termination system shown in FIG. 6 taken in part along lines 7A-7A;

FIG. 7B is a cross-sectional elevation view of a cable tube and a portion of a housing of an optical fiber termination system in accordance with another embodiment;

FIG. 8 is a cross-sectional plan view of a portion of an optical fiber termination system in accordance with another embodiment;

FIG. 9 is a partial cross-sectional elevation view of a portion of an optical fiber termination system in accordance with another embodiment;

FIGS. 13A-13H are cross-sectional elevation views of housing in accordance with further embodiments;

FIG. 17A is a perspective view of a portion of a termination unit assembly in accordance with another embodiment;

FIG. 17B is a cross-sectional elevation view of a portion of an insert of the termination unit assembly shown in FIG. 18A taken along lines 17B-17B;

FIG. 17C is a cross-sectional elevation view of a clamp of the termination unit assembly shown in FIG. 17A;

FIG. 24A is a perspective view of a portion of a termination unit assembly in accordance with another embodiment;

FIG. 24B is a perspective view of supply side cable for use with the termination unit assembly shown in FIG. 24A;

FIG. 24C is a perspective view of a portion of the termination unit assembly of FIG. 24A;

FIG. 35A is a perspective view of a portion of a patch panel assembly in accordance with another embodiment;

FIG. 35B shows perspective views of a panel post of the patch panel assembly of FIG. 35A;

FIG. 36A is a perspective view of a portion of a patch panel assembly in accordance with another embodiment;

FIG. 36B shows perspective views of a panel post of the patch panel assembly of FIG. 36A;

FIG. 66 is a perspective view of a clip hinge in accordance with a further embodiment;

FIGS. 67A and 67B are cross-sectional elevation views of portions of clip hinges in accordance with further embodiments; and FIG. 67C is a perspective view of a clip hinge and portion of a housing base in accordance with a further embodiment.

DETAILED DESCRIPTION

Figure 1A:
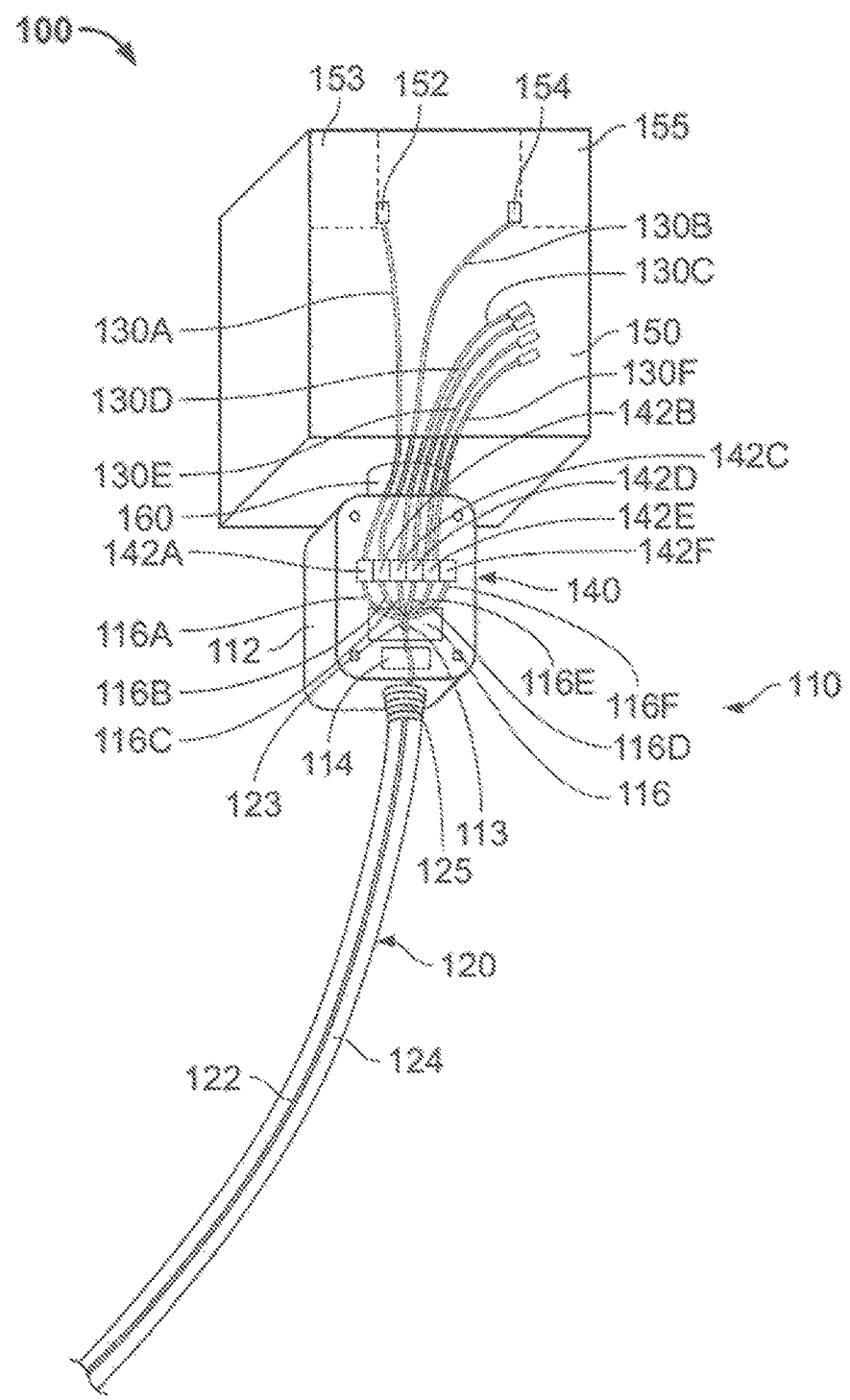
FIG. 1A is a perspective view of an optical fiber termination system in accordance with an embodiment.
Figure 1B:
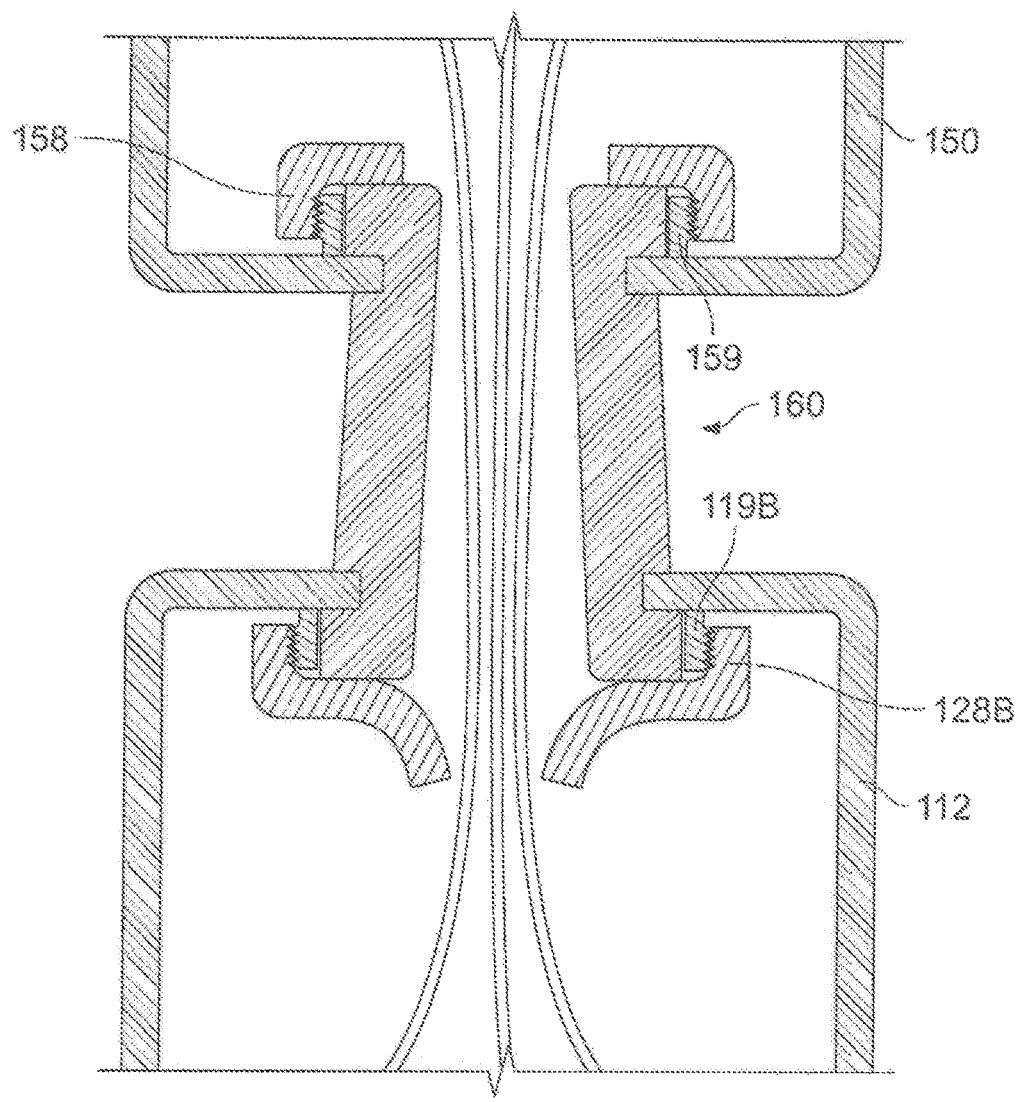
FIG. 1B is a partial cross-sectional view of a portion of the optical fiber termination system of FIG. 1A.

Referring now to FIGS. 1A and 1B, optical fiber termination system 100 includes optical fiber cable and termination unit assembly 110 and enclosure 150. Assembly 110 generally includes housing 112, a plurality of optical devices enclosed by the housing, input optical fiber cable 120, and a plurality of output optical fibers 130A-130F. In the example shown, the plurality of optical devices includes optical splitter 116, which may be but is not limited to being a Fused Biconical Taper (FBT) splitter, a Planar Lightwave Circuit (PLC) splitter, a multiplexer, or other like function optical function device, and patch panel terminal 140. In one embodiment, the housing 112 may further include optical, optical/electronic or electronic devices coupled to the splitter 116, for performing optical and electronic signal processing based on signals obtained from an input optical signal from the cable 120.

Figure 3:
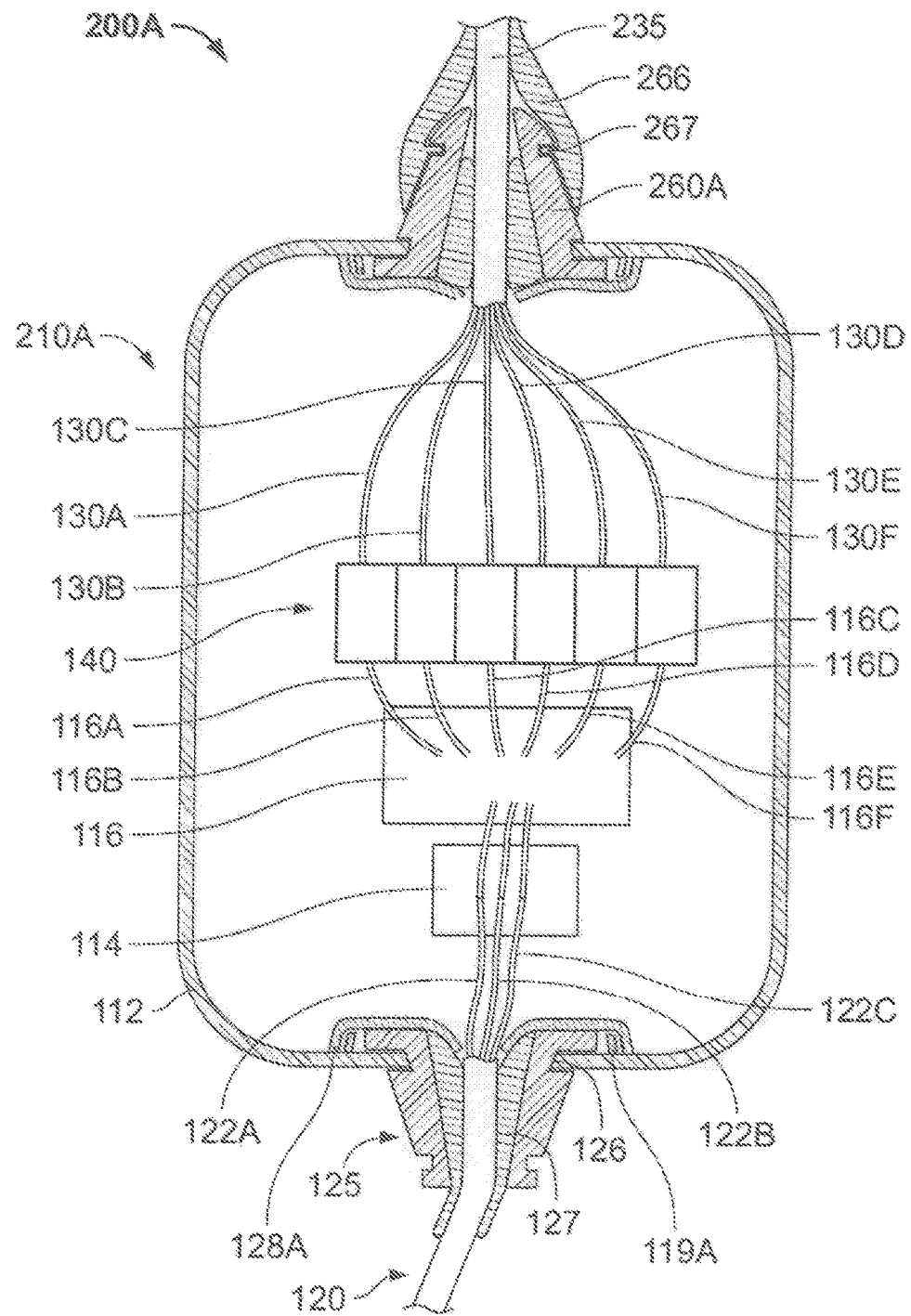
FIG. 3 is a partial cross-sectional view of an optical fiber termination system in accordance with another embodiment.

Input optical fiber cable 120 includes input optical fiber 122 and input outer sheath 124 surrounding a majority of the length of the input optical fiber. As in this example, input optical fiber cable 120 may be an outside plant (OSP) cable. As shown, input optical fiber 122 extends into housing 112 where it is mated to another optical fiber 123, which may be pre-installed in housing 112, at junction 113 by input mating device 114 such as by mechanical or fusion splicing when the input mating device is a splicer or by a mating connection through an adapter or other terminal connection when the input mating device is a terminal. As shown, optical fiber 123 may be connected to optical splitter 116. In some arrangements, input optical fiber 122 may be a plurality of input optical fibers (e.g., plurality of input optical fibers 122A-122C as shown in FIG. 3) which may be spliced or otherwise form a mating connection as just described to corresponding optical fibers that are connected to optical splitter 116. In such arrangements (not shown), an additional optical splitter may be used between mating device 114 and optical splitter 116 such that the plurality of fibers to which input optical fibers 122A-122C are directly connected are connected to a single optical fiber connected to optical splitter 116.

Optical splitter 116, which may be an N×M power splitter or wavelength (de) multiplexer, is a passive optical device that divides a light beam supplied from input optical fiber 122 (or alternatively, input mating device 114) into a plurality of divided beams on optical fibers 116A-116F. Terminals 142A-142F of patch panel terminal 140 may be oriented to receive respective optical fibers 116A-116F from optical splitter 116 (or in alternative arrangements divided beams in free space) and, in response to receiving the respective beams, may be configured to provide respective optical signals to the respective terminals. As further shown, the plurality of output optical fibers 130A-130F are connected between respective terminals 142A-142F of patch panel terminal 140 and fiber optic terminals (only fiber optic terminals 152, 154 are shown) in communication with respective electronic devices or equipment (only electronic devices 153, 155 are illustrated, in broken lines). Such electronic devices or equipment may be but are not limited to being an antenna unit or a kiosk terminal.

As shown in FIG. 3, input coupling tube or element 125 may act as a boot that covers a portion of input optical fiber cable 120, and in some instances input outer sheath 124, adjacent to the location at which input optical fiber 122 (or, in alternative arrangements as described previously herein, a plurality of input optical fibers 122A-122C) enters housing 112 through an input hole in the housing. Input coupling tube 125 may abut or nearly abut housing 112 in forming a watertight seal against the housing. As used in this application, a "watertight seal" may be one that is compliant with IP68, corresponding to IEC Standard 60529. Input coupling tube 125, may be made of rubber, soft plastic such as an elastomeric material, and hard plastic, or a combination thereof. Input coupling tube 125 may be adhered, such as by epoxy, in one arrangement or may be molded in another arrangement about an entire perimeter of the input hole in the housing through which input optical fiber 122 enters. In such arrangements or another alternative arrangement as shown in FIG. 3, input coupling tube 125 may define a groove 126 on its end adjacent to the housing into which the portion of the housing defining the input hole may be seated. Groove 126 of input coupling tube 125 may have a width along a longitudinal axis of input coupling tube 125 that is less than or equal to a wall thickness at the portion of the housing defining the input hole such that an interference fit is created upon receipt of the housing in the groove of the input coupling tube to form the watertight seal. Other arrangements of forming a watertight seal known to those of ordinary skill in the art are also contemplated. Input coupling tube 125 may have a stiffness sufficient to prevent bending to preserve a minimum bending radius or twisting of input optical fiber 122. As further shown in FIG. 3, inner seal 127 extends between input coupling tube 125 and optical fiber cable 120. Inner seal 127 is preferably made of a rubber material and is more elastic than input coupling tube 125 to provide a watertight seal between inner seal 127 and optical fiber cable 120 and between inner seal 127 and input coupling tube 125. Flange 119A of housing 112 extends in a direction towards the interior of the housing and is threaded. Lock ring 128A is threaded onto flange 119A of housing 112 such that the lock ring compresses input coupling tube 125 against housing 112 and inner seal 127 against input coupling tube 125 as shown to provide an additional sealing configuration.

Output coupling tube or element 160 may act as a boot that covers a portion of the plurality of output optical fibers 130A-130F. Output coupling tube 160 may include multiple components which may be made of rubber, soft plastic such as an elastomeric material, and hard plastic, or a combination thereof. As in the example shown, output coupling tube 160 may be generally larger than input coupling tube 125 to accommodate the passage of the plurality of optical fibers 130A-130F as compared to the single input optical fiber 122 that passes through the input coupling tube. Output coupling tube 160 may interface with housing 112 in the same or substantially the same manner as input coupling tube 125. In this manner, output coupling tube 160 may abut or nearly abut housing 112 in forming a watertight seal against the housing about an entire perimeter of an output hole through the housing through which the plurality of output optical fibers 130A-130F extend. Additionally, output coupling tube 160 may interface with enclosure 150 in the same or substantially the same manner as it interfaces with housing 112. In this manner, output coupling tube 160 may abut or nearly abut enclosure 150 to form a watertight seal against the enclosure about an entire perimeter of an enclosure hole through the enclosure through which the plurality of output optical fibers 130A-130F further extend.

As shown in FIG. 1B, output coupling tube 160 is configured and attaches to housing 112 as well as enclosure 150 in the same manner as input coupling tube 125 attaches to housing 112 with the exception that no inner seal such as inner seal 127 is used with output coupling tube 160 due to its connection between enclosure 150 and housing 112. In this manner, lock ring 128B attached to flange 119B only compresses output coupling tube 160 against housing 112 and lock ring 158 attached to flange 159 only compresses output coupling tube 160 against enclosure 150.

Figure 2:
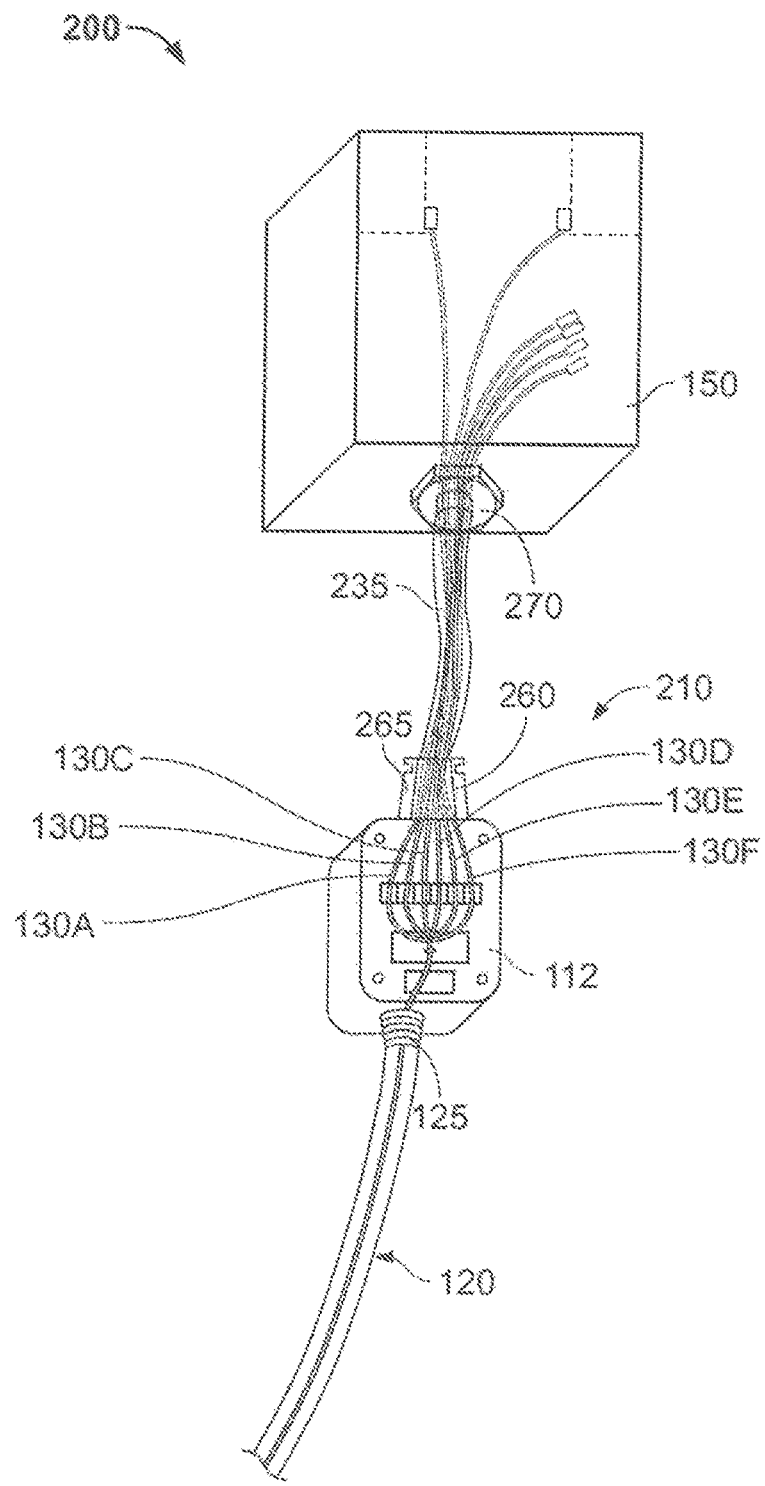
FIG. 2 is a perspective view of an optical fiber termination system in accordance with another embodiment.

Referring now to FIG. 2, optical fiber termination system 200 may include optical fiber cable and termination unit assembly 210 and enclosure 150. Assembly 210 is the same as optical fiber cable and termination unit assembly 110 with the notable exception that output coupling tube 160 is replaced by output outer sheath 235, cable connector 270, output inner coupling tube or element 260, and output outer coupling tube or element 265. As shown, in this example, the plurality of output optical fibers 130A-130F extend from housing 112 through output outer sheath 235 and cable connector 270 which may be attached to enclosure 150 via a screw connection or other modes of attachment known to those of ordinary skill in the art.

Output inner coupling tube 260, which is substantially similar to input coupling tube 125 may interface with housing 112 in the same or substantially the same manner as input coupling tube 125 and output coupling tube 160 of input optical fiber cable 120 described previously herein. In this manner, output inner coupling tube 260 may abut or nearly abut housing 112 in forming a watertight seal against the housing about an entire perimeter of the output hole through the housing through which the plurality of output optical fibers 130A-130F extend. Output outer coupling tube 265 may act as a boot that covers a portion of output inner coupling tube 260 adjacent to the location at which the plurality of output optical fibers 130A-130F extend from housing 112. Output outer coupling tube 265 may include a neck at a location spaced from housing 112 that may have a smaller perimeter than other sections of the outer coupling tube along its length. In this manner, the neck of outer coupling tube 265 may conform to a perimeter of output outer sheath 235 or a perimeter of output inner coupling tube 260, or both, to form a watertight seal.

Referring now to FIG. 3, optical fiber termination system 200A may include optical fiber cable and termination unit assembly 210A and enclosure 150. Assembly 210A is the same as optical fiber cable and termination unit assembly 210 with the notable exception that, output inner coupling tube or element 260 is replaced by output inner coupling tube 260A, and output outer coupling tube or element 265 is replaced by output outer coupling tube 266. Output inner coupling tube 260A is the same as or substantially the same as output inner coupling tube 260 with the exception that output inner coupling tube 260A includes groove 262. Output outer coupling tube 266 is shaped such that, when placed properly against housing 112, an end of output outer coupling tube furthest from the housing has a smaller inner diameter than the opposite end of the output outer coupling tube. Output outer coupling tube 266 includes flange 267 that corresponds to groove 262 of output inner coupling tube 260A such that when the output outer coupling tube and the output inner coupling tube are properly seated, flange 267 of the output outer coupling tube is seated in groove 262, as shown in FIG. 3. In this manner, a watertight seal is formed between inner output coupling tube 260A and output outer coupling tube 266.

In use, as to any of the arrangements described previously herein, when a light beam exits from input optical fiber 120, the light beam is split into divided beams by optical splitter 116 which routes the divided beams along respective optical fibers 116A-116F to respective terminals 142A-142F of patch panel terminal 140. Respective terminals 142A-142F then route respective light beams from optical fibers 116A-116F along output optical fibers 130A-130F to fiber optic terminals, such as fiber optic terminals 152, 154, within enclosure 150. The respective light beams from optical fibers 116A-116F may undergo optical signal processing, and also electrical signal processing if converted to respective electric signals, which may include routing through switches, or other electrical or optical pathways, which control routing of the optical and/or electrical signals.

Figure 4B:
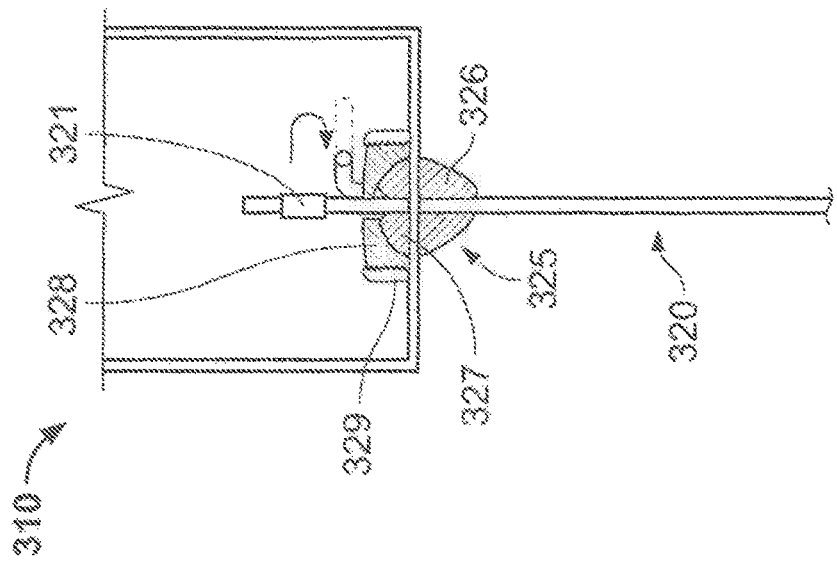
FIGS. 4A and 4B are cross-sectional views of a portion of an optical fiber cable and termination unit assembly in accordance with another embodiment, prior to and after insertion of an optical fiber cable, respectively.
Figure 4A:
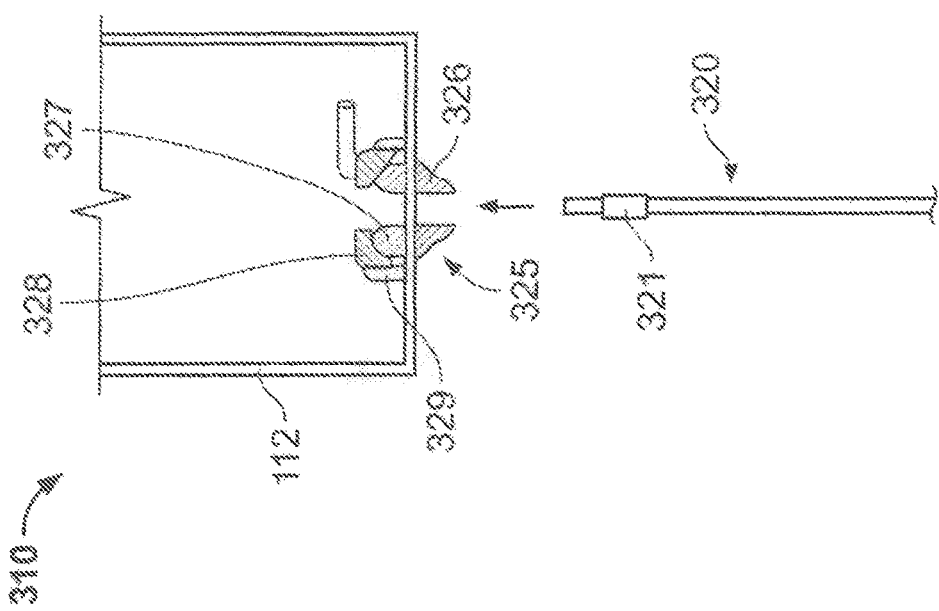

Referring now to the example of FIGS. 4A and 4B, optical fiber cable and termination unit assembly 310, which along with enclosure 150 may form part of an optical fiber termination system, may have the configuration of either optical fiber cable and termination unit assembly 110 or optical fiber cable and termination unit assembly 110 with the exception that assembly 310 includes input coupling element 325. Input coupling element 325 includes outer boot 326, inner boot 327, inner lock ring 328 which may be tapered, and outer lock ring 329 attached to housing 112. Inner boot 327 may be an o-ring as in the example shown or may be integral with outer boot 326 such that the inner and outer boots are inseparable without fracture of either one or both of the inner and outer boots. As shown, inner lock ring 328 and outer lock ring 329 may be attached by a threaded connection. Inner boot 327 may be situated between the taper of the inner lock ring 328 and housing 112 about the input hole of the housing through which input optical fiber cable 320, which may be a "pushable" cable, including connector 321 may extend. In use, a portion of input optical fiber cable 320 may be inserted into input coupling element 325, as shown in FIG. 4A, and then connector 321 of the input optical fiber cable may be inserted into splitter 116 (see FIGS. 1-3). Subsequently, inner lock ring 328 may be rotated to cause the inner lock ring to travel towards an interior surface of housing 112. In this manner, inner lock ring 328, which may be rigid, may compress inner boot 327 causing the inner boot to form a watertight seal around a portion of input optical fiber cable 120, as shown in FIG. 4B. Similarly, the configuration of input coupling element 325 could also be applied to an alternative arrangement of an output coupling element and its interface with housing 112 as well as its interface, or an interface with a separate coupling element having the same configuration, with enclosure 150. In this instance, multiple connectors of respective multiple optical fiber cables like that of input optical fiber cable 320 may be inserted directly into respective terminals of patch panel terminal 140.

In assembling optical fiber termination system 100, 200, an operator, such as but not limited to an optoelectronic technician or an electrician, may connect the plurality of output optical fibers 130A-130F to respective terminals within enclosure 150. The operator may then attach output coupling tube 160 of optical fiber cable and termination unit assembly 110 to enclosure 150, as in the example of optical fiber termination system 100, or attach cable connector 270 of either of optical fiber cable and termination unit assemblies 210, 210A to enclosure 150, as in the example of optical fiber termination systems 200, 210A, respectively.

In some alternative arrangements, optical fiber cable and termination unit assemblies, such as assemblies 110, 210, 210A, 310, may not include input mating device 114 and instead the patch panel terminal of any such assembly may include an additional port through which input optical fiber 122 may be connected to an additional optical fiber, or in similar arrangements with the plurality of input optical fibers 122A-122C, an additional set of ports into which such plurality of input optical fibers may be connected to corresponding additional optical fibers. In such arrangements, the additional optical fiber to which input optical fiber 122 is connected or the additional optical fibers to which the plurality of input optical fibers 122A-122C may be connected to optical splitter 116 operating in the same manner as described previously herein.

In alternative arrangements, the output optical fiber cables may be replaced with electrically conductive wires. In such arrangements, the electrically conductive wires may be electrically connected to the patch panel terminal within the housing of the cable and termination unit assembly and the electronic devices or equipment within the enclosure. In this manner, the patch panel terminal may route or transmit electrical signals or an optical-to-electrical converter (which in some instances may be integrated with the patch panel terminal) optically connected to the patch panel terminal by shortened output optical fibers may route or transmit electrical signals, and in some arrangements electrical power, to respective electronic devices or equipment in the enclosure.

In some alternative arrangements, the input optical fiber cable or the plurality of output optical fibers may be replaced with "pushable" cables as described previously herein with respect to the example of FIGS. 4A, 4B. In such arrangements, the input optical fiber may be inserted directly into the splitter and the plurality of output optical fiber cables may be inserted into respective terminals of the patch panel terminal.

Figure 5:
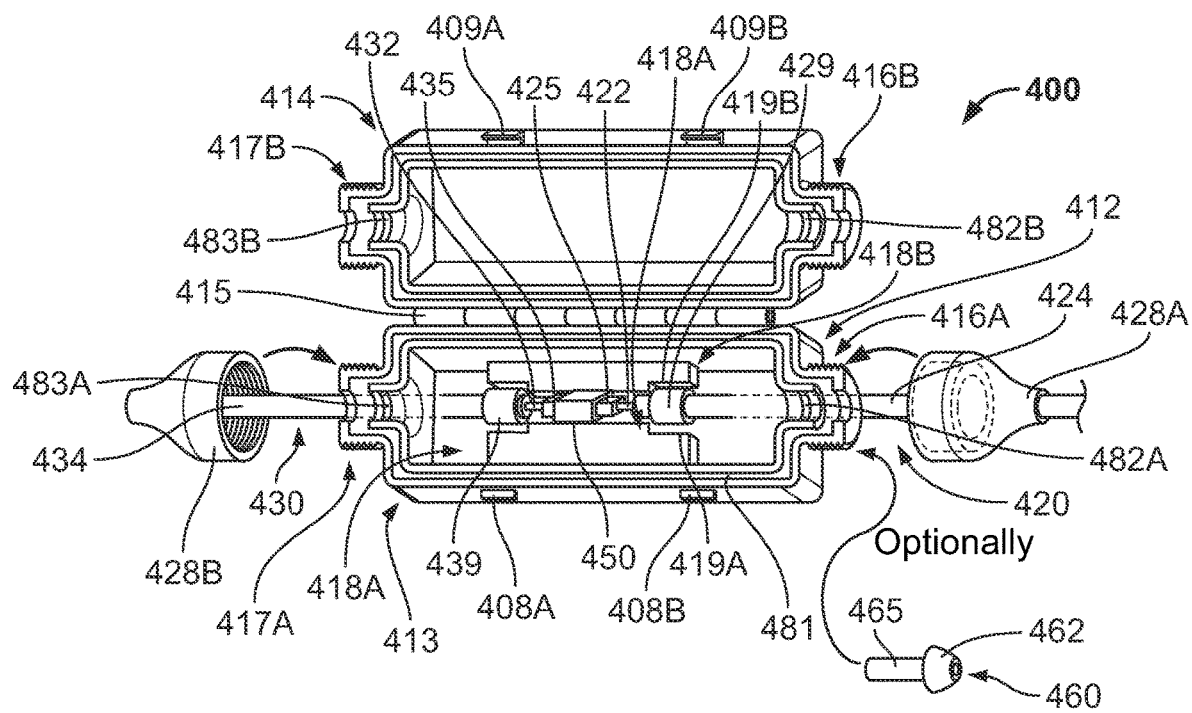
FIG. 5 is a perspective view of an optical fiber termination system in accordance with another embodiment.

Referring now to FIG. 5, optical fiber termination system 400 includes housing 412, input cable 420, output cable 430, adapter 450 attached to the housing, and input and output retention rings 428A, 428B. Housing 412 includes base 413 and lid 414 attached to the base by hinge 415 such that the lid is rotatable relative to the base. As shown, an exterior of base 413 includes closure flanges 408A, 408B and an exterior of lid 414 includes closure hooks 409A, 409B complementary to the closure flanges. In this manner, lid 414 may be latched closed to base 413. In alternative arrangements, at least one of the closure flanges may be reversed with its complementary closure hook such that one or more of the closure flanges extend from the exterior surface of the lid and a respective one or more of the closure hooks extend from the base.

Base 413 of housing 412 includes input first partial housing tube 416A opposite output first partial housing tube 417A, and likewise, lid 414 of housing 412 includes input second partial housing tube 416B opposite output second partial housing tube 417B. As in the example shown, each of input first and input second partial housing tubes 416A, 416B and output first and output second partial housing tubes 417A, 417B may include partial threading. In this manner, input first and input second partial housing tubes 416A, 416B may be aligned with each other and output first and output second partial housing tubes 417A, 417B may be aligned with each other such that upon closing lid 414 onto base 413, input first and input second partial housing tubes 416A, 416B may form a complete input housing tube having a full set of threads, and output first and output second partial housing tubes 417A, 417B may form a complete output housing tube having a full set of threads.

As further shown, opposing cable guides 418A, 418B may be attached to an inner surface of base 413 of housing 412. Guides 418A, 418B may be symmetrical as shown and each may include opposing notches 419A, 419B configured to prevent overinsertion of respective input and output cables 420, 430. As in the example shown, main housing seal 481 may be inserted into a groove along a mating surface of base 413 of housing 412 such that upon closure of lid 414, a waterproof seal is formed between the main housing seal and the lid. In alternative arrangements, the main housing seal may be inserted into a similar groove in the lid to form a seal between such a main housing seal and the base. As in the example shown, partial input housing tube seals 482A, 482B may be inserted into circumferential grooves along respective inner surfaces of input first and input second partial housing tubes 416A, 416B and, likewise, partial output housing tube seals 483A, 483B may be inserted into circumferential grooves along respective inner surfaces of output first and output second partial housing tubes 417A, 417B. In this manner, when lid 414 is closed, partial input housing tube seals 482A, 482B may be aligned to form a complete seal and partial output housing tube seals 483A, 483B may be aligned to form a complete seal.

As in the preferred arrangement shown, the threads on partial housing tubes 416A, 416B, 417A, 417B may be external threads, and the threads on the corresponding retention rings 428A, 428B may be internal threads, as shown in the example of FIG. 8. In alternative arrangements, the threads on the partial housing tubes may be internal threads, and the threads on the corresponding retention rings may be external threads in which the inner diameters defined by the partial housing tubes and the corresponding retention rings may be altered accordingly to accommodate the respective input and output cables.

Again referring to FIG. 5, in the example shown, input cable 420 includes input optical fiber 422 and input outer sheath 424 surrounding a majority of the length of the input optical fiber in which input connector 425 defines an end of the input cable insertable into a first end of adapter 450. Similarly, output cable 430 includes output optical fiber 432 and output outer sheath 434 surrounding a majority of the length of the output optical fiber in which output connector 435 defines an end of the input cable insertable into a second end opposite the first end of adapter 450. When connectors 425, 435 are inserted into adapter 450, the adapter aligns the input connector with the output connector such that a light beam conveyed by the input connector is received by the output connector. Input cable 420 further includes input cable tube 429 surrounding and attached to input outer sheath 424, and output cable 430 further includes output cable tube 439 surrounding and attached to output outer sheath 434.

In using optical fiber termination system 400, input and output cables 420, 430 may be inserted into housing 412 such that input cable tube 429 abuts notch 419A of cable guide 418A and notch 419B of cable guide 418B and such that output cable tube 439 abuts notch 419A of cable guide 418B and notch 419B of cable guide 418A. When connectors 425, 435 of respective input and output cables 420, 430 are inserted into opposing sides of adapter 450, input cable tube 429 and output cable tube 439 are received in the interior of housing 412. Prior to or upon closure of lid 414, input cable 420 may be inserted through input retention ring 428A, and upon closure of the lid, the input retention ring may be threaded onto the combination of input housing tubes 416A, 416B. Similarly, prior to or upon closure of lid 414, output cable 430 may be inserted through output retention ring 428B, and upon closure of the lid, the output retention ring may be threaded onto the combination of output housing tubes 417A, 417B. In this manner, each of input cable tube 429 and output cable tube 439 may act as a catch preventing disengagement of the respective input cable 420 and output cable 430 from housing 412.

More particularly, as in the example shown, input cable tube 429 and output cable tube 439 may have larger outer diameters than the smallest inner diameters of the corresponding input and output retention rings 428A, 428B through which the respective input and output cables 420, 430 pass. In this manner, when input and output connectors 425, 435 are disconnected from adapter 450 and respective input and output cables 420, 430 are pulled towards the passageways through which they extend in a direction away from the interior of housing 412, input and output cable tubes 429, 439 may abut their corresponding retention rings preventing removal of the cable tubes from the housing and thereby preventing disengagement from the housing of the portion of the input cable extending from the input cable tube to the connector end of the input cable and of the portion of the output cable extending from the output cable tube to the connector end of the output cable, respectively. In certain alternative arrangements, input cable tube 429 and output cable tube 439 may have larger outer diameters than the corresponding passageways defined by partial housing tubes 416A, 416B and separately by partial housing tubes 417A, 417B, respectively, when lid 414 is in the closed position. In this manner, when input and output connectors 425, 435 are disconnected from adapter 450 and respective input and output cables 420, 430 are pulled towards the passageways through which they extend in a direction away from the interior of housing 412, input and output cable tubes 429, 439 may abut the inner surface of housing 412 surrounding the combination of partial housing tubes 416A, 416B and the combination of partial housing tubes 417A, 417B, respectively, acting as a catch preventing removal of the cable tubes from the housing and thereby preventing disengagement from the housing of the portion of the input cable extending from the input cable tube to the connector end of the input cable and of the portion of the output cable extending from the output cable tube to the connector end of the output cable, respectively. A substantially similar arrangement to such alternative arrangements is shown in the example of FIG. 6.

Optionally, as indicated in FIG. 5, optical fiber termination system 400 may include coupling tube 460, which includes tapered flange 462 extending from central core 465, that may be placed between input retention ring 428A and housing 412, as in the example shown, or between output retention ring 428B and housing 412, or may include two coupling tubes may be placed in both such locations. In use, cables 420, 430 may be inserted through coupling tube 460 along a longitudinal axis defined by the coupling tube or, in arrangements in which the coupling tube includes a slit as in the example of FIG. 5, cables 420, 430 may be inserted into the coupling tube through the slit. In this arrangement, when coupled to the respective partial housing tubes 416A, 416B, 417A, 417B, retention rings 428A, 428B may have a taper as shown corresponding to the taper of tapered flange 462 of coupling tube 460 that compresses the tapered flange against the corresponding partial housing tubes. The compression of flange 462 of tube 460 may result in compression of a portion of input or output cables 420, 430, as the case may be, to provide both sealing and mechanical clamping of such portion of the cables relative to the flange and thus relative to housing 412 and thereby provide additional structure to prevent disengagement of the cables from the housing. Moreover, when flange 462 of tube 460 is so compressed, the interface between the flange and cables 420, 430 may form a watertight seal.

Figure 6:
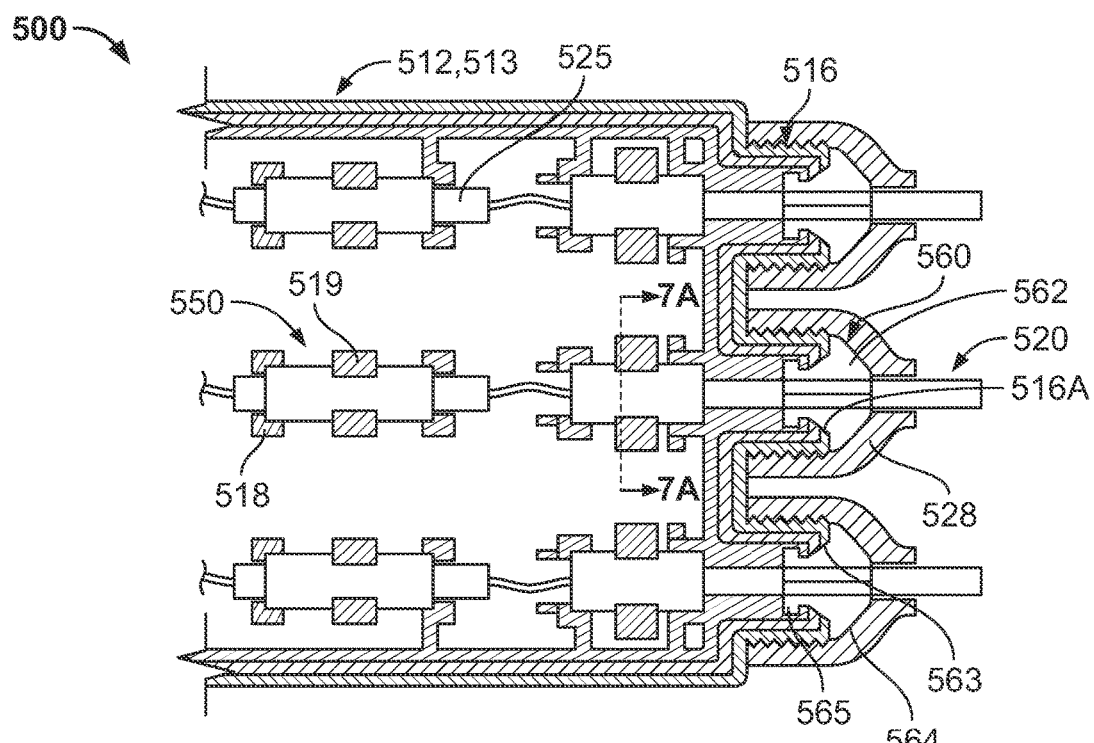
FIG. 6 is a partial cross-sectional plan view of a portion of an optical fiber termination system in accordance with another embodiment.

Referring now to FIG. 6, optical fiber termination system 500 includes housing 512, a plurality of cables 520, a plurality of adapters 550, a plurality of threaded retention rings 528, and a plurality of coupling tubes 560. Although only a portion of optical fiber termination system 500 is shown, it is to be understood that the system may be symmetrical such that, for example, the system may include retention rings that are the same as retention rings 528 on an opposite side of housing 512 to that shown in FIG. 6. As in the example shown, retention rings 528 may be identical to retention rings 428A, 428B. As shown, housing 512 may be at least substantially similar to housing 412 with certain notable exceptions. One such exception is that housing 512 may include a plurality of combinations of partial housing tubes 516 (only partial housing tubes of base 513 of housing 512 being shown) that form complete housing tubes upon closure of a lid of housing 512 on each side of the housing instead of only a single combination of partial housing tubes that forms a complete housing tube on each side of the housing as with housing 412. Another such exception is that housing 512 includes dividers 518 and hooks 519 for maintaining a fixed position of componentry within the housing, such as for example adapters 550 and cable tubes 529 of cables 520 as shown.

Cables 520 may be at least substantially similar to either one or, where at substantially similar to each other, both of cables 420, 430 with the exception that cables 520 may include cable tubes 529 having larger outer diameters than the corresponding passageways defined by partial housing tubes 516 when the lid of housing 512 is in the closed position. As previously discussed herein, in this manner, when connectors 525 of cables 520 are disconnected from adapter 550 and cables 520 are pulled towards the passageways through which they extend in a direction away from the interior of housing 512, cable tubes 529 may abut the inner surface of housing 512 surrounding the combination of partial housing tubes 516 and thus acting as a catch preventing removal of the cable tubes from the housing and thereby preventing disengagement from the housing of the respective portions of the cables extending from the cable tubes to the connector ends of the cables.

As further shown, coupling tubes 560 may be at least substantially similar to coupling tube 160 with the notable exceptions that coupling tubes 560 each include main flange 562 that as shown may taper in two directions in the form of central tapered portion 563 and outer tapered portion 564 as well as secondary flange 565 spaced from the main flange. Unlike partial housing tubes 416A, 416B, 417A, 417B of housing 412, a front edge of partial housing tubes 516 may include chamfer 516A tapering inwardly toward the interior of housing 512. In this manner, central tapered portion 563 of main flange 562 adjacent to secondary flange 565 may taper towards central axes defined by partial housing tubes 516 at the same angle that chamfer 516A tapers towards these central axes. When coupled to the respective partial housing tubes 516, retention rings 528 may have a taper as shown corresponding to outer tapered portion 564 of coupling tube 560 that compresses corresponding main flanges 562 against the corresponding partial housing tubes in directions orthogonal or substantially orthogonal to the tapered portions 563, 564 of the main flanges. Such compression of any one of the main flanges 562 of the coupling tubes 560 may result in compression of a portion of the corresponding cable 520 to prevent movement of such portion of the cable relative to the flange and thus relative to housing 512 and thereby provide additional structure to prevent disengagement of the cables from the housing. Moreover, when main flanges 562 of tubes 560 are so compressed, the interfaces between the main flanges and the corresponding cables 520 may form a watertight seal.

Further unlike partial housing tubes 416A, 416B, 417A, 417B of housing 412, partial housing tubes 516 of housing 512 may include grooves configured for receiving corresponding secondary flanges 565 of coupling tubes 560. Receipt of secondary flanges 565 within the grooves of partial housing tubes 516 aid in maintaining the location of coupling tubes 560 relative to the partial housing tubes, in particular prior to insertion of cables 520 as well as during sealing of the coupling tubes against the partial housing tubes. In some arrangements, secondary flanges 565 may be dimensioned with slightly larger dimensions, in any direction, than the grooves configured to receive the secondary flanges such that upon closure of the lid of housing 512, the secondary flanges may be compressed by the overall groove formed by the combination of the adjacent grooves of interfacing partial housing tubes 516. In this manner, the interfaces between secondary flanges 565 and the corresponding overall grooves formed by the combinations of the adjacent grooves of interfacing partial housing tubes 516 may form a watertight seal. Such seal may be additional to the seal at the interfaces between the main flanges 562 of tubes 560 and the corresponding cables 520 described previously herein.

As shown in FIG. 7A, each cable tube 529 may be received between a pair of hooks 519. Each cable tube 529 may be inserted between the hooks in a direction parallel to a longitudinal axis defined by the cable tube or may be inserted by pressing the cable tube between the hooks in a direction transverse to the longitudinal axis defined by the cable tube. As shown, lid 514 of housing 512 may include projections 514A located on the lid such that upon closure of the lid, the projections contact, and in some arrangements somewhat compress, cable tubes 529. In this manner, the combination of the pairs of hooks 519 and projections 514A may fix the positions of the respective cable tubes 529 in circumferential directions relative to the longitudinal axes defined by the cable tubes, and when such pairs of hooks and projections of the lid sufficiently press against the cable tubes, may fix the positions of the respective cable tubes 529 in directions parallel to the longitudinal axes defined by the cable tubes.

In an alternative arrangement shown in FIG. 7B, each cable tube 529 may be received between a single hook 519 and a divider 518 as well as a projection 514A of lid 514. Each cable tube 529 thus may be fixed in position in a similar manner as in the arrangement shown in the example of FIG. 7A. Referring again to FIG. 7A, a portion of hooks 519 adjacent to inner surface 510 of housing 512 may be chamfered, or in alternative arrangements, rounded to more closely correspond to the shape of cable tube 529 received by the hooks. Such chamfers and rounds may also be used at the interface of dividers 518 with inner surface 510 of housing 512. In other arrangements, such as in the example shown in FIG. 7B, the interface of any divider 518 or hook 519 with the inner surface of the housing may be less chamfered or rounded or even neither chamfered nor rounded to provide for space between cable tube 529 and such divider or hook.

Referring again to FIG. 8, optical fiber termination system 600 may be at least substantially similar to optical fiber termination system 500 with the notable exceptions that optical fiber termination system 600 may include coupling tube 660 as shown, or in alternative arrangements a plurality of coupling tubes 660, in place of coupling tube 560 and housing 612 in place of housing 512. Coupling tube 660 is at least substantially similar to coupling tube 560 with the notable exception that coupling tube 560 may not include a secondary flange such that the tapered portions of coupling tube 660 extend to opposing ends of coupling tube 660. As such and as in the example shown, partial housing tubes 616 of housing 612 may not include grooves for receipt of secondary flanges.

Referring now to FIG. 9, optical fiber termination system 700 is at least substantially similar to optical fiber termination system 500 with the notable exceptions that optical fiber termination system 700 may include housing 712 in place of housing 512, one or more termination unit assemblies 740, and optical fiber 732 in place of output cable 430. Termination unit assembly 740 may be similar to termination unit assembly 110, and as shown, may be attached to an inner surface 710 of housing 712 below adapter 550 and input cable 420 that may be maintained above the adapter by central platform 711 for space efficiency within the housing. In some arrangements, each of the termination unit assemblies may include a housing as shown through which optical fiber 732 is received as well as a plurality of any one or any combination of optical, optoelectronic, or electronic devices which may be but are not limited to being an optical splitter, e.g., optical splitter 116, and a patch panel terminal, e.g., patch panel terminal 140, or other module connection. Such optical, optoelectronic, or electronic devices may perform either one or both of optical and electronic signal processing based on signals obtained from input cable 420. Optical fiber 732 may terminate within housing 712 of termination unit assembly 740 such that the optical fiber conveys an optical signal to any one or any combination of the optical, optoelectronic, or electronic devices. Although not shown, one or more additional optical fibers may be attached to termination unit assembly 740 such that optical signals may be conveyed from the termination unit assembly following any such optical and electronic signal processing by the termination unit assembly.

Figure 10A:
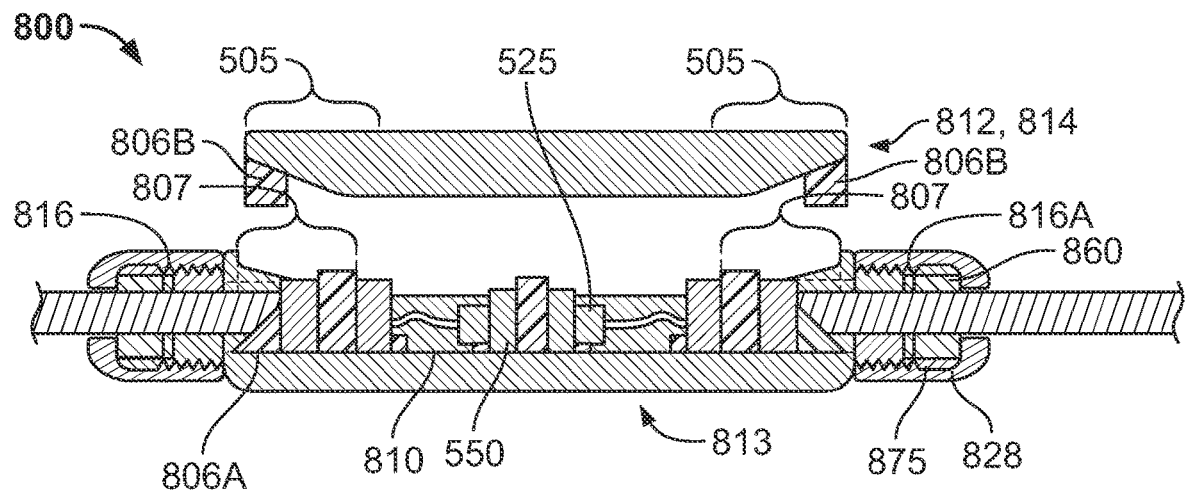
FIG. 10A is a partial cross-sectional elevation view of an optical fiber termination system in accordance with another embodiment.
Figure 10B:
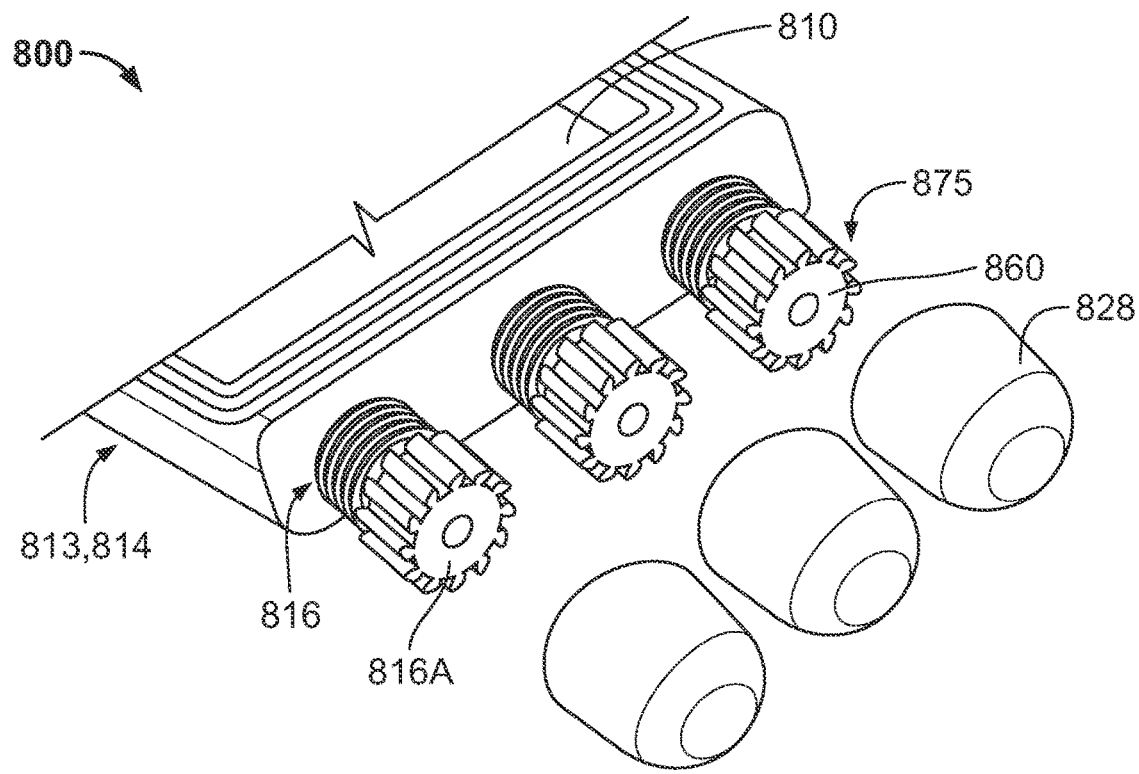
FIG. 10B is a perspective view of a portion of the optical fiber termination system shown in FIG. 10A.

With reference to FIGS. 10A and 10B, optical fiber termination system 800 may be at least substantially similar to optical fiber termination 500 with the notable exceptions that optical fiber termination system 800 may include housing 812 in place of housing 512, housing tubes 816 in place of partial housing tubes 516, coupling tube 860 in place of coupling tube 560, sealing ring 875, and retention rings 828 in place of retention rings 528. In the example shown, system 800 is a multi-port system, although in alternative arrangements, a similar system may include only one port at each end of a similar housing. As shown, housing 812 includes base 813 and lid 814. Base 813 may be similar to base 513 with the notable exceptions that base 813, as in the example shown, may include thicker sections 807 on opposing ends of the base. In this manner, as further shown, base 813 may include complete housing tubes 816 configured for receipt of optical cables such as cables 520. In contrast to housing 512 in which cables 520 may be set onto respective partial housing tubes 516 prior to the closure of lid 514, cables 820 may be inserted through passageways 816A defined by housing tubes 816. As in the example shown, each of passageways 816A may have an inner diameter equal to or greater than the outer diameter of cable tube 529 of cable 520 corresponding to housing tube 816 when the cable tube is preassembled to the cable. In this manner, cables 520 including their cable tubes 529 may be inserted through passageways 816A into housing 812. In alternative arrangements, each of passageways 816A may have any diameter, including a diameter less than the cable tube, sufficient to receive cable 520 when the cable tube is not preassembled to the cable and is assembled to the rest of the cable after the cable is received in housing 812.

Base 813 of housing 812 may further include base stoppers 806A extending from inner surface 810 of the housing. Each base stopper 806A may be fastened or adhered by an adhesive to inner surface 810 of housing 812 or may be integral with the housing such that the base stopper is inseparable from the inner surface without fracture of either one or both of the base stopper and the inner surface. As shown, each base stopper 806A may be tapered on a side adjacent to a corresponding housing tube 816. Each base stopper 806A may be sufficiently flexible such that any one of cable tubes 529 may be slid along the tapered portion of the base stopper during insertion of cables 520 and pass beyond a lip at an extremity of the base stopper into a desired position of the cable tube relative to adapter 550. Each base stopper 806A further may be sufficiently rigid such that the base stopper acts as a catch to prevent an inserted cable tube 529 from being passed back over the lip of the base stopper and thereby prevents disengagement of the portion of cable 520 extending from cable tube 529 to connector 525 of the cable that may be attached or that is attachable to adapter 550.

As further shown, lid 814 may be similar to lid 514 with the notable exceptions that lid 814, as in the example shown, may include thinner sections 505 on opposing ends of the lid that correspond to thicker sections 807 of base 813. Lid 814 further may include lid stoppers 806B extending from thinner sections 505 of the lid. Each lid stoppers 806B may be located such that upon closure of lid 814 onto base 813, an edge of the lid stopper furthest from the corresponding housing tube 816 is adjacent to or in abutment with a face of a corresponding cable tube 529 of cable 520. In this manner, each lid stopper 806B may prevent disengagement of the portion of cable 520 extending from cable tube 529 to connector 525 of the cable that may be attached or that is attachable to adapter 550.

To seal housing tubes 816, as shown in FIG. 10B, sealing rings 875 may be placed around the coupling tubes 860, and inner threads of retention rings 828 that are similar to but have a larger inner diameter than retention rings 528 may be threaded onto outer threads of the housing tubes 816. Coupling tubes 860 may be substantially cylindrical. As shown in FIG. 10A, coupling tubes 860 may fit within a corresponding recess of housing tubes 816. As further shown in FIG. 10A, retention rings 828 may tapered along their inner walls such that the retention rings gradually compress sealing rings 875 further as the retention rings are being threaded onto housing tubes 816 and thereby compress coupling tubes 860. As shown, in some arrangements, sealing rings 875 may include a plurality of fins, which may be in the form of petal-like segments as shown, attached together circumferentially. In alternative arrangements, any of housing tubes 816 may be replaced with one of the housing tube-retention ring-coupling element combinations shown in FIGS. 5, 6, and 8.

Figure 11A:
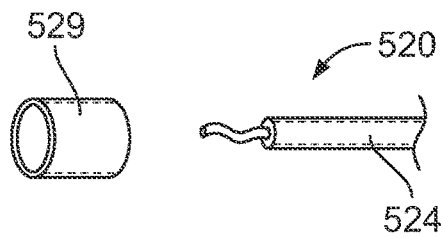
FIGS. 11A-11C are perspective views of cables in accordance further embodiments.
Figure 11B:
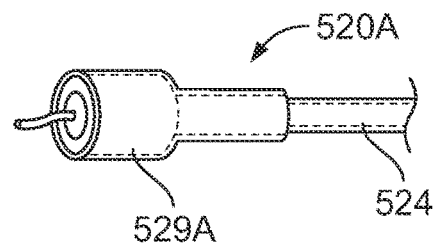
Figure 11C:
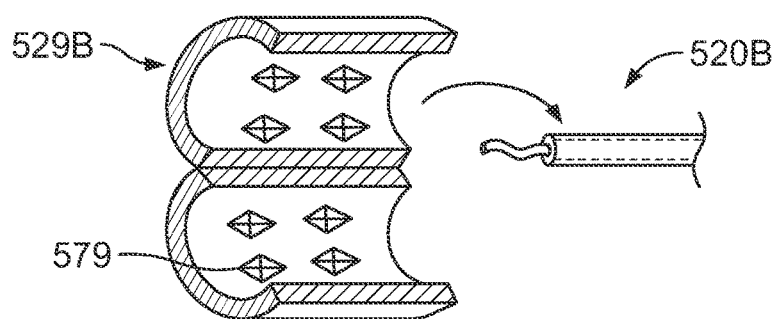

Referring now to FIG. 11A, cable tube 529 may be attached to outer sheath 524 of cable 520, and similarly cable tubes 429, 439 of cables 420, 430 may be attached to their respective outer sheaths 424, 434, by an adhesive such as but not limited to an epoxy. In one alternative, an outer diameter of outer sheath 524 of cable 520 may be larger than an inner diameter of cable tube 529 such that the cable tube remains fixed in position relative to the outer sheath upon insertion of the outer sheath through the cable tube until a minimum force is applied to move the cable tube. Such minimum force preferably may be greater than an expected pullout force by an operator assembling an optical fiber termination system such as systems 400, 500, 600, 700. In another alternative, as shown in FIG. 11B, cable 520A may be at least substantially similar to cable 520 with the notable exception that cable 520A includes cable tube 529A. Cable tube 529A may be substantially similar to cable tube 529 with the notable exception that cable tube 529A may include a reinforcement section to provide greater adherence of the cable tube to outer sheath 524 as well as to provide added strength and durability over at least the section of the outer sheath that extends through passageways formed by housing tubes as described previously herein. In yet another alternative, as shown in FIG. 11C, cable 520B may be substantially similar to cable 520 with the notable exception that cable 520B may include cable tube 529B. Cable tube 529B may be substantially similar to cable tube 529 with the notable exception that cable tube 529B may include a plurality of sections that together form the complete cable tube. As in the example shown, cable tube 529B may include a plurality of projections 579 that extend into outer sheath 524 of cable 520B to fix the position of the cable tube relative to the outer sheath. In one alternative, an outer diameter of outer sheath 524 of cable 520 may be larger than an inner diameter of cable tube 529B such that the cable tube remains fixed in position relative to the outer sheath upon insertion of the outer sheath through the cable tube until a minimum force is applied to move the cable tube.

Cables 520A, 520B may be used in place of cables 420, 520 in any of the arrangements described previously herein. Due to the multi-part configurations of each of cables 420, 430, 520, 520A, 520B, the cable tubes of each of these cables may be placed onto and fixed to their respective outer sheaths after the cables without the cable tubes are inserted into corresponding housings.

Figure 12A:
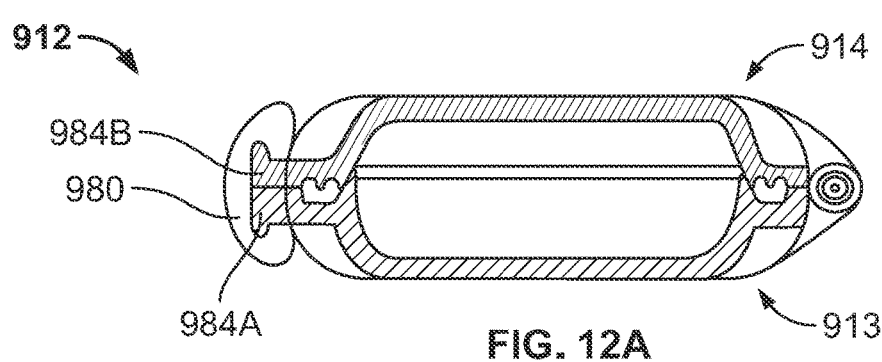
FIG. 12A is a cross-sectional elevation view of a housing in accordance with another embodiment.
Figure 12B:
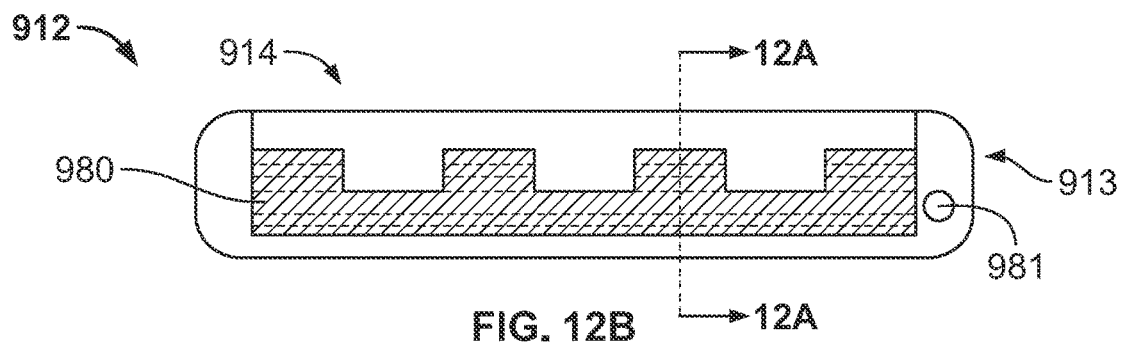
FIGS. 12B-12C are elevation views illustrating open and closed operating conditions of the housing shown in FIG. 12A.
Figure 12C:
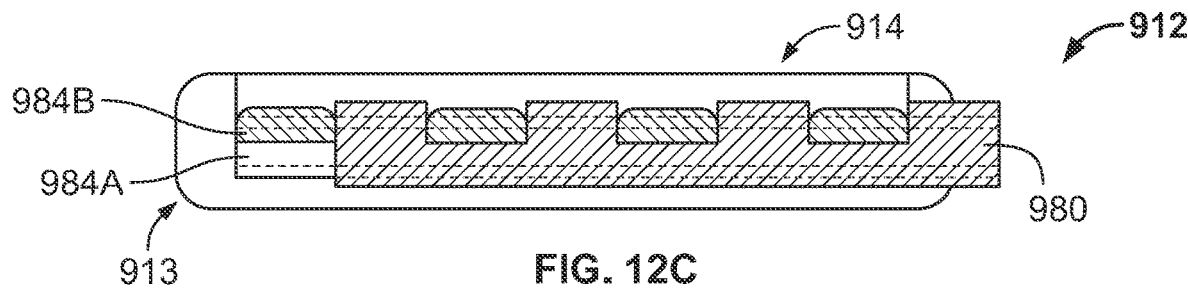

Referring now to FIGS. 12A-12C, housing 912 may be substantially similar to housing 812 with the notable exception that housing 912 may include slideable latch 980 that slides over respective flanges 984A, 984B of base 913 and lid 914 of the housing. Latch 980 may be used in place of other closure mechanisms such as the combination of closure flanges and closure hooks as described previously herein. As in the example shown, latch 980 may latch lid 914 to base 913 in a closed position of the latch, as shown in FIG. 12B, and may allow the lid to be opened in an open position of the latch in latch 980 is not overlapping flanges 984B of lid 914, as shown in FIG. 12C. In this example, button 981 may extend away from housing 812 to prevent latch 980 from sliding and, in some arrangements, the latch may be spring-loaded as known to those skilled in the art such that depression of the button may allow the latch to slide to the open position. In the example shown, latch 980 remains attached to base 913 upon opening lid 914, although in certain alternative arrangements, the latch may remain attached to the lid and be separated from the base upon opening the lid.

As shown in FIGS. 13A-13H, other alternative configurations for attaching together bases and lids such as those described previously herein may be utilized. Such configurations include the use of dual slideable latches like that of slideable latch 980 of housing 912A as shown in FIG. 13A; hook-style latch 1080 used in conjunction with hinge 1181 as shown in FIG. 13B; dual hook-style latches with dual seals 1185, which may be o-ring seals, as shown in FIGS. 13C and 13D; single hook-style latches used in conjunction with hinges and dual seals as shown in FIGS. 13E and 13F, such figures further showing that such latches may be attached to either the base or the lid and hook onto the other of either the base or the lid; dual slideable latches with dual seals as shown in FIG. 13G, and a single slideable latch used in conjunction with a hinge and dual seals as shown in FIG. 13H. Housings with any of these configurations may be used in place of housings like those of housings 412, 512, 712, and 812.

Figure 14:
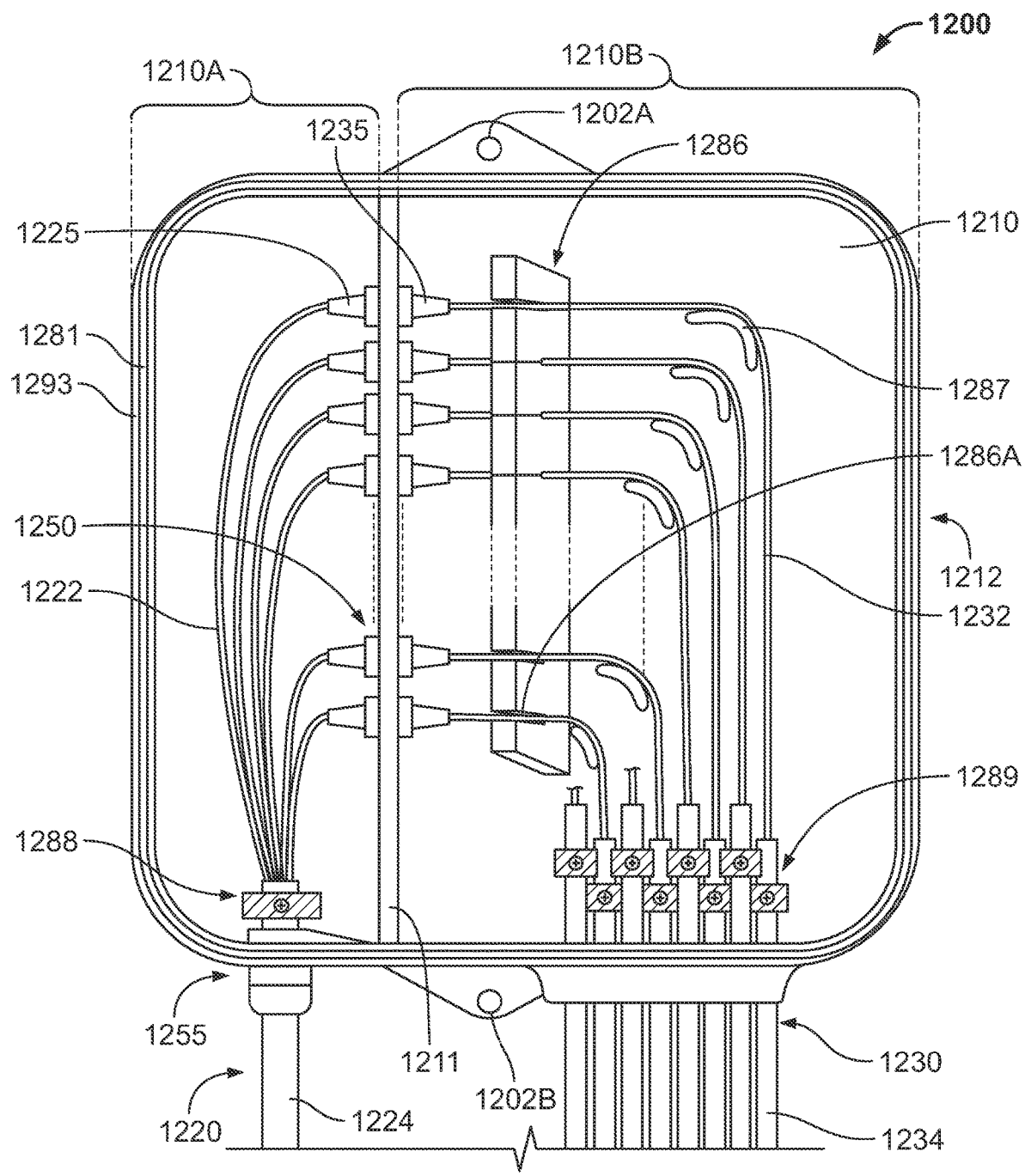
FIG. 14 is a plan view of a termination unit assembly in accordance with another embodiment.

Referring now to FIG. 14, termination unit assembly 1200, which may be water tight in a closed condition, may be an optical device unit, especially for use with fiber optic networks used in the telecommunications industry. Assembly 1200 may be installed via the placement of fasteners through mounting holes 1202A, 1202B onto buildings or other stable structures such as telephone poles. As shown, assembly 1200 includes housing 1212, supply side cable 1220, a plurality of demand side cables 1230, a plurality of adapters 1250, stabilizer 1286 attached to inner surface 1210 of housing 1212, a plurality of routing projections 1287 which as shown may be of variable size as needed, supply side coupling assembly 1255, a plurality of demand side coupling assemblies 1270 (shown in FIGS. 17A-17D), a supply side cable clamp 1288, a plurality of demand side cable clamps 1289. Any one or any combination of such components of assembly 1200 may be provided separately as a kit.

As shown, supply side cable 1220 may include a plurality of supply side optical fibers 1222 and a single supply side sheath 1224 surrounding a majority of the length of the supply side optical fibers in which supply side connectors 1225 define a plurality of ends of the supply side cable insertable into first ends of respective adapters 1250. Each demand side cable 1230 may include demand side optical fiber 1232 and demand side sheath 1234 surrounding a majority of the length of the demand side optical fiber in which demand side connector 1235 defines an end of the demand side cable insertable into a second end opposite the first end of a respective one of adapters 1250.

As shown in FIG. 14, housing 1212 may include first compartment 1210A separated from second compartment 1210B by wall 1211. Adapters 1250 may be inserted along and extend from both sides of wall 1211. Main housing seal 1281 may be inserted into a groove along a mating surface along outer rim 1293 of base 1213 of housing 1212 such that upon closure of a lid corresponding to the base, such as lids similar to those shown in FIGS. 15A and 15B described further herein, a waterproof seal may be formed between the main housing seal and the lid.

As further shown, supply side cable 1220 may extend through supply side coupling assembly 1255 inserted into a port in housing 1212, which may be in the form of a cylindrical hole through a housing tube, similar to housing tubes 816, of the housing, to first compartment 1210A of housing 1212. Supply side coupling assembly 1255 may be substantially in the form of the combination of coupling tubes 860, sealing rings 875, and retention rings 828.

The plurality of supply side optical fibers 1222 may be uncovered by supply side sheath 1224 and exposed to provide for their separation from each other and their ease of bending within first compartment 1210A and may be connected to respective adapters 1250 via respective supply side connectors 1225 of the supply side cable. As in the example shown, supply side clamp 1288 may be attached, such as by a fastener or another mode of attachment known to those skilled in the art, to housing 1212. Supply side cable 1220 may extend through supply side clamp 1288 such that the supply side clamp may be actuated to compress a portion of the supply side cable to fix the position of the clamped portion of the supply side cable relative to the fixed supply side clamp. In this manner, the positions of the exposed portions of supply side optical fibers 1222 when connected to respective adapters 1250 may remain fixed or substantially fixed in position relative to first compartment 1210A of housing 1212.

Still referring to FIG. 14, the plurality of demand side cables 1230 may extend through respective ports in housing 1212, which may be in the form of cylindrical holes through the housing, to second compartment 1210B of housing 1212. The demand side optical fibers 1232 of each demand side cable 1230 may be uncovered by demand side sheath 1234 and exposed for their ease of bending within second compartment 1210B and may be connected to respective adapters 1250 via respective demand side connectors 1225 of each demand side cable. As in the example shown, each demand side clamp 1289 may be attached, such as by a fastener or another mode of attachment known to those skilled in the art, to housing 1212. Demand side cables 1230 may extend through respective demand side clamps 1289 such that each demand side clamp may be actuated to compress a portion of the demand side cable to fix the position of each clamped portion of the demand side cables relative to the respective fixed demand side clamps. In this manner, the positions of the exposed portions of demand side optical fibers 1232 when connected to respective adapters 1250 may remain fixed or substantially fixed in position relative to second compartment 1210B of housing 1212.

As second compartment 1210B is larger than first compartment 1210A in the example shown, the exposed portions of demand side optical fibers 1232 may be longer than the exposed portions of the supply side optical fibers 1222. To provide additional support and stability for the exposed portions of demand side optical fibers 1232, the exposed portions of the demand side optical fibers may be bent around the curved routing projections 1287 and then inserted through respective slots 1286A of stabilizer 1286 such that the fibers rest on the stabilizer from which the fibers may be connected to respective adapters 1250. In some arrangements, each demand side optical fiber 1232 may be inserted through a respective hole in the stabilizer in a direction along a longitudinal axis of the demand side optical fiber, again such that the demand side optical fiber rests on the stabilizer. Utilizing routing projections 1287 and stabilizer 1286 may substantially reduce slack in the exposed portions of demand side optical fibers 1232, in particular in the sections of demand side optical fibers 1232 directly adjacent to respective demand side connectors 1225, to avoid such slack impacting the connection of the optical fibers with their respective adapters 1250. Use of routing projections 1287 and stabilizer 1286 further may secure the fibers separate from the securement of demand side cables 1230 by clamps 1289 in which the clamps compress sheaths 1234 of the cables to compensate for potential movements of the fibers relative to their respective sheaths due to changes in temperature, humidity, or other environmental conditions. In some arrangements, a spool may be placed between any corresponding clamp 1289 and routing projection 1287 such that slack in the corresponding demand side optical fiber 1232 may be wrapped around the spool as needed.

As in the example shown as well as in alternative arrangements such as those using housings 1312, 1412 shown in FIGS. 15A and 15B, the ports, e.g., ports 1391, 1491, through which the plurality of demand side cables 1230 extend may be arranged in a plurality of rows such that a series of the plurality of demand side cables 1230 may run in parallel in a first row and another series of the plurality of the demand side cables may run in parallel in another row above or below the first row. In alternative arrangements, such ports may be in a staggered or any other pattern, or even randomly located, as needed for the demand side cables to be used. As in the example shown, a height above inner surface 1210 within compartment 1210B at which each demand side cable 1230 rests in the slot or hole 1286A of stabilizer 1286 may be level with the connection to be made by each respective connector 1235 with adapter 1250.

Figure 15A:
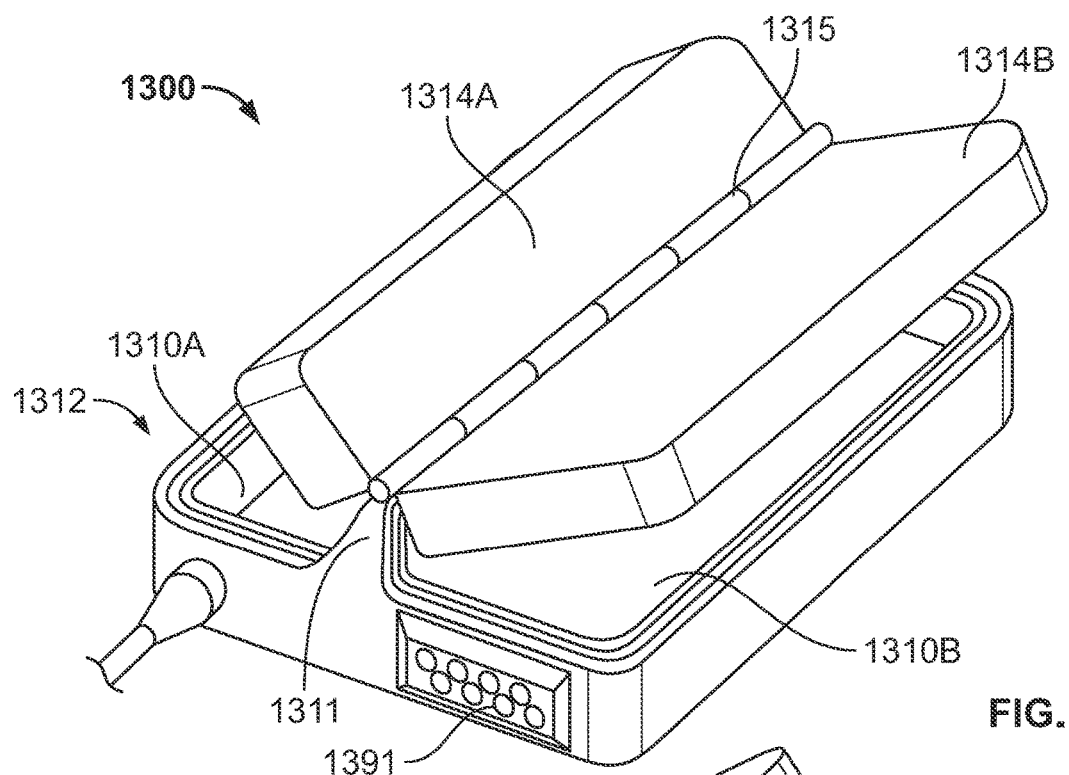
FIGS. 15A and 15B are perspective views of termination unit assemblies in accordance with further embodiments.
Figure 15B:
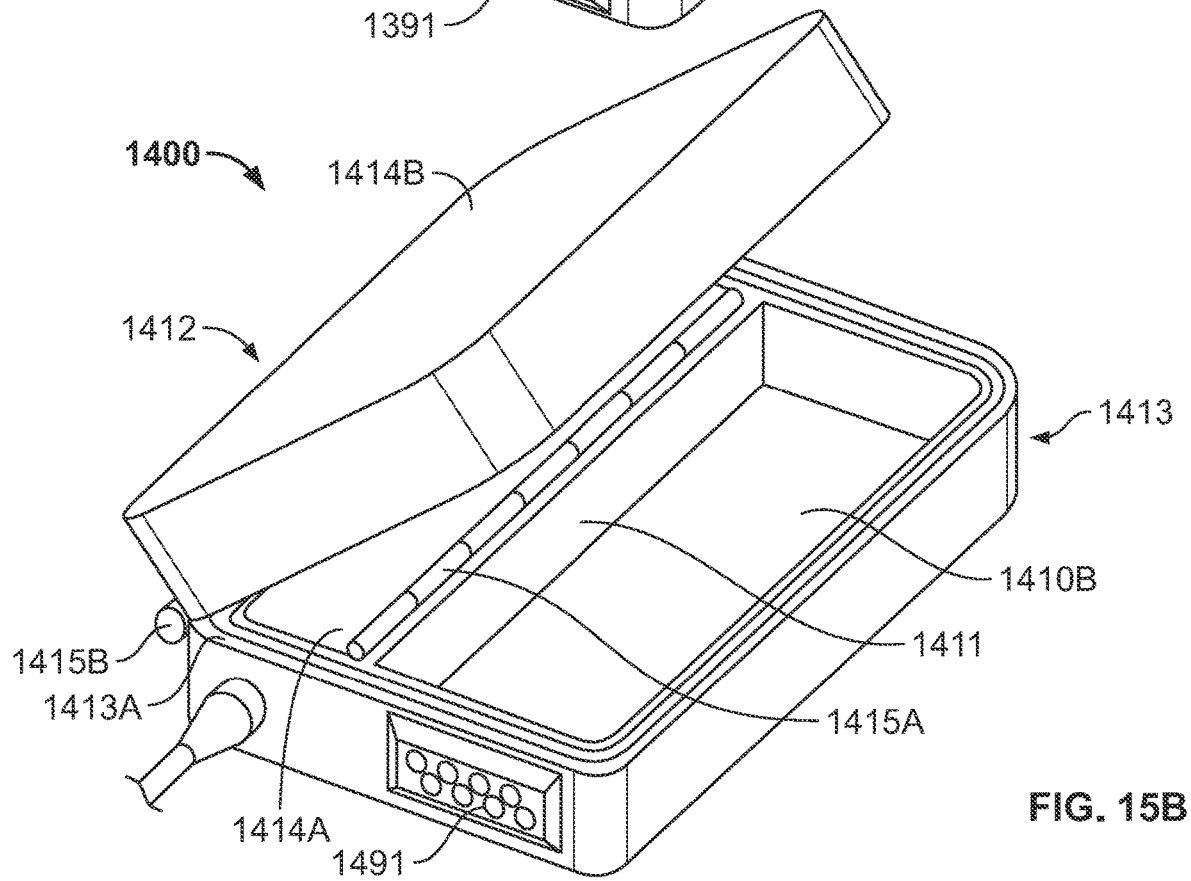

With further reference to FIG. 15A, a termination unit assembly 1300, which may be substantially similar to termination unit assembly 1200, may include housing 1312 having first compartment lid 1314A attached to second compartment lid 1314B at common hinge 1315 which is attached to a top of wall 1311 of the housing. As shown, first compartment lid 1314A may close to cover first compartment 1310A, and second compartment lid 1314B may close to cover second compartment 1310B of housing 1312. With further reference to FIG. 15B, termination unit assembly 1400, which also may be substantially similar to termination unit assembly 1200, may include housing 1412 having first compartment lid 1414A attached at hinge 1415A which is attached to a top of wall 1411 of the housing and having second compartment lid 1414B attached at hinge 1415B which is attached to outer edge 1413A of base 1413 of housing 1412. As shown, first compartment lid 1414A may close to cover a first compartment defined by one side of base 1413, and second compartment lid 1414B may close to cover second compartment 1410B of housing 1412.

Figure 16A:
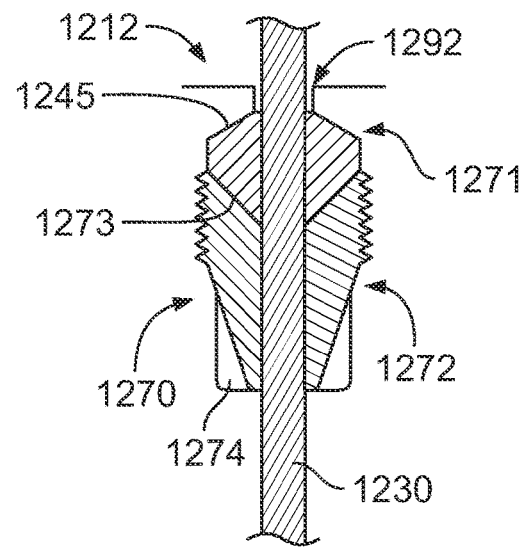
FIG. 16A is a cross-sectional elevation view of a portion of the termination unit assembly shown in FIG. 14.
Figure 16B:
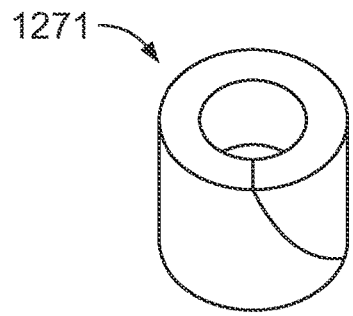
FIG. 16B is a perspective view of a coupling tube of the termination unit assembly shown in FIG. 14.
Figure 16C:
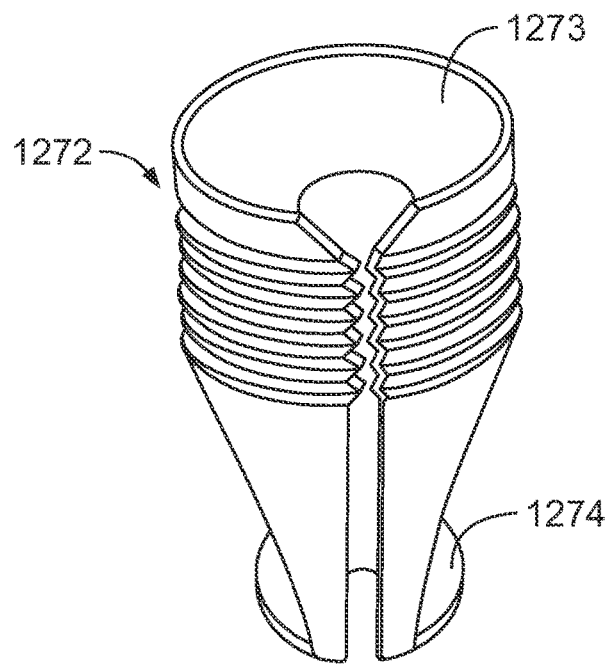
FIG. 16C is a perspective view of a plug of the termination unit assembly shown in FIG. 14.
Figure 16D:
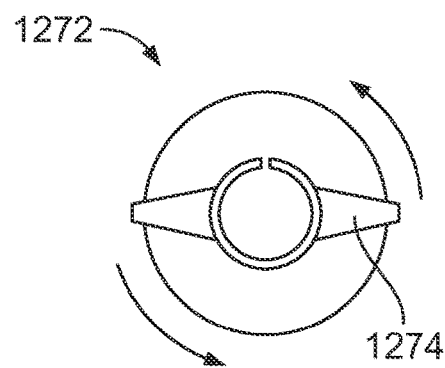
FIG. 16D is a plan view of the plug shown in FIG. 16C.

As shown in FIGS. 16A-16D, demand side coupling assembly 1270 for use in fixing the position of the demand side cables 1230 relative to housing 1212 may include coupling tube 1271 and plug 1272. In this example, coupling tube 1271 includes opposing ends separated by a thickness in which one end, in this example neither end as shown in FIG. 16B, may be chamfered around a circumference of the coupling tube. As in the example shown, plug 1272 may include external threads along a portion of the plug, an internal chamfer 1273 for compressing one end of coupling tube 1271, and tabs 1274 for use in providing leverage to thread the plug into opposing threads.

Housing 1212 may include port holes 1292 in which, as shown, each port hole may include internal threads such that the external threads of plug 1272 may be threaded into a corresponding port hole and may include chamfer 1245 for compressing one end of a corresponding coupling tube 1271 that narrows the port hole in the direction towards the interior of the housing. Coupling tube 1271 and plug 1272 both may be flexible to provide for their compression and to provide strain relief for any demand side cable 1230 inserted into the coupling tube and plug combination. In some arrangements, coupling tube 1271 and plug 1272 may be made of plastic materials, and in some other arrangements, plug 1272 may be made of a metallic material. In the configuration shown, plug 1272 may be more rigid than the coupling tube. In this manner, when demand side coupling assembly 1270 is assembled as shown, either one or both of internal chamfer 1273 of plug 1272 may press against its corresponding end of coupling tube 1271 and chamfer 1245 of housing 1212 may press against its corresponding end of the coupling tube when plug 1272 is threaded into a corresponding port hole 1292 such that the position of the portion of each demand side cable 1230 in contact with the coupling tube is fixed relative to the coupling tube in a first position of the plug relative to the coupling tube and each demand side cable is movable relative to the coupling tube when the plug is in a second position relative to the coupling tube.

When plug 1272 is sufficiently threaded with housing 1212, a watertight seal may be formed at the interface of coupling tube 1271 and housing 1212. As shown, for ease of use, either one or both of coupling tube 1271 and plug 1272 may be slit to allow for insertion of any one of the plurality of demand side cables 1230 in a direction transverse to a longitudinal axis defined by any such demand side cable being inserted.

Referring now to FIGS. 17A-17C, termination unit assembly 1500 may be substantially similar to termination unit assembly 1200 with the notable exceptions that a combination of housing 1212 and the plurality of demand side cable clamps 1289 may be replaced by a combination of housing 1512 and cable port insert assembly 1590 that may act as a catch. In the example shown, insert assembly 1590 includes insert 1591, insert plate 1595 attached to the insert, and a plurality of demand side cable clamps 1589 that may be attached to opposite sides of the insert plate. Insert 1591, which may be in the form of a grommet such as but not limited to a rubber grommet, may include a plurality of port holes 1592 through which demand side cables 1230 may be inserted. An outer rim 1593 of insert 1591 may include ribbing configured to interface with housing 1512 to provide a watertight seal at an interface between the insert and the housing. As best shown in FIG. 17B, port holes 1592 may include internal ribs 1594 along their surface which may provide frictional contact with inserted cables and that may form a watertight seal with the inserted cables.

Insert plate 1595 may be made of a rigid material, e.g., a metal such as steel, sufficient for attachment of cable clamps 1589. As shown in FIG. 15C, plate 1595 may include attachment holes 1596 that may be configured to receive tabs 1584 of cable clamps 1589, as shown, or a fastener for attaching the cable clamps in alternative arrangements. As further shown in FIG. 15C, demand side cable clamp 1589, and similarly supply side cable clamp 1288 and the plurality of demand side cable clamps 1289, may include clamp housing 1597 that includes insertable anchor 1584 on its ends, pressure plate 1598 or similar structure for pressing against an inserted cable such as cables 420, 430, 520, 1220, 1230, and an adjustable actuator 1599, such as a piston or a screw as in the example shown. In a press position, actuator 1599 may press against pressure plate 1598 which in turn may press down on an inserted portion of cable 1230 to fix that portion of the cable relative to cable clamp 1589 and thus relative to cable port insert assembly 1590. In an open position, pressure plate 1589 may move somewhat freely to allow cable 1230 to be inserted into or removed from cable clamp 1589.

In this example, housing 1512 excludes port holes for receiving demand side cables 1230 and instead includes slot 1503 configured to receive insert assembly 1590 and further includes adjacent cutout 1504 shaped and dimensioned to provide access to port holes 1592 of the insert assembly when the insert assembly is received in the slot. Housing 1512 further includes a pair of sockets 1501 configured to receive a fastener (not shown) extending through corresponding mounting holes 1597 of plate 1595 of insert assembly 1590 to attach the insert assembly to the housing when the insert assembly is received in slot 1503 of the housing.

With further reference to FIG. 17B, in some arrangements, internal ribs such as internal ribs 1594 within port holes 1592 of insert 1591 may provide sufficient frictional contact such that demand side cable clamps 1589 may not be needed to prevent disengagement of cables such as cables 420, 520. In such arrangements, the cables may have a sufficient diameter relative to the internal ribs such that the portions of the cables interfacing with the internal ribs remain fixed in position relative to the internal ribs upon insertion of the cables across the internal ribs until a minimum force is applied to move the cables. Such minimum force preferably may be greater than an expected pullout force by an operator assembling optical fiber termination system that includes termination unit assembly 1500 or the like.

Figure 18:
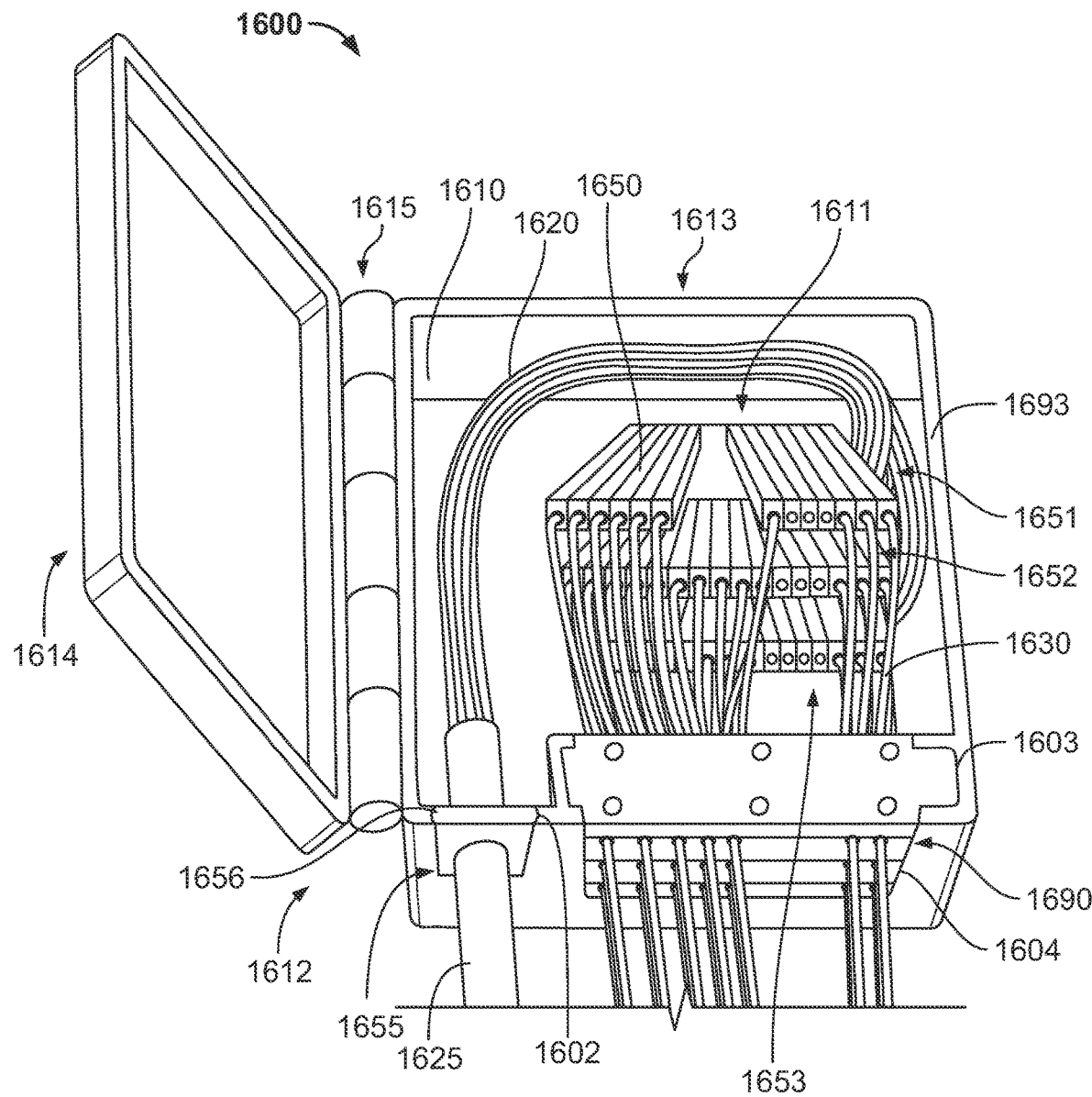
FIG. 18 is a perspective view of a termination unit assembly in accordance with another embodiment.

Referring now to FIG. 18, in an example of another termination unit assembly, termination unit assembly 1600 generally includes housing 1612, patch panel assembly 1611, a plurality of supply side optical cables 1620, a plurality of demand side optical cables 1630, supply side insert 1655, and demand side insert assembly 1690. Such assemblies may be used, for example, as OSP terminals for telecommunications networks.

As shown, housing 1612 includes base 1613 and lid 1614 attached to the base. As in this example, base 1613 may be attached to lid 1614 by hinge 1615 such that the base is rotatable relative to the lid. Base 1613 of housing 1612 includes outer rim 1693 and inner surface 1610 bounded by the outer rim. As shown in the example of FIG. 18, inner surface 1610 is defined by housing walls of housing 1612 extending from a housing base of the housing. In the example shown, base 1613 includes first slot 1603 configured to receive demand side insert assembly 1690 and further includes adjacent cutout 1604 shaped and dimensioned to provide access to insert holes defined by the demand side insert assembly when the insert assembly is received in the first slot. First slot 1603 is substantially in the same form as slot 1503 of housing 1512 of termination unit assembly 1500. As further shown, base 1613 includes second slot 1602 configured to receive supply side insert assembly 1655 when the supply side insert assembly is received in the second slot.

Patch panel assembly 1611 includes one or more panel bases (not shown) and stacked panels 1651-1653 are attached to the panel base or to the plurality of panel bases in arrangements in which only some of the panels of the termination unit assembly are attached to any particular panel base. In some arrangements, each panel base may be in the form of a simple fixture or mounting bracket. As in this example, each panel base of patch panel assembly 1611 may be mounted to inner surface 1610 of housing 1612. Each of stacked panels 1651-1653 may include a rack (not shown) mounted to the panel base or one of the panel bases and a set of adapters 1650 supported by the rack and in the form of an array, as shown, similar to the examples shown in U.S. Pat. No. 8,939,792 B2 ("the '792 patent") to Takeuchi et al., the entire disclosure of which is hereby incorporated by reference herein.

Adapters 1650 of each set of adapters may be slideable or rotatable relative to their respective racks, e.g., in a horizontal direction, such that ports defined by the adapters may be moved towards or away from an adjacent adapter in the same rack, as in the examples of the '792 patent, and in some arrangements, slideable or rotatable in a transverse direction, e.g., in a vertical direction, such that the ports defined by the adapters may be moved towards or away from an adjacent adapter in an adjacent rack. As in the example shown, each of the adapters 1650 may include opposing ports configured for receiving ends of optical connectors, as shown, to form arrays of connector assemblies such that optical communication can be made between the opposed connectors.

When stacked panels 1651-1653 include a rack as in the example shown, the racks of each of the stacked panels may be attached to the panel base via a respective hinge or other flexible mechanism such that the individual stacked panels may be rotatable relative to, and preferably towards and away from rather than in direction substantially parallel to, inner surface 1610 of housing 1612. In this manner, the entireties of each of stacked panels 1651-1653 may be separated from the other stacked panels for easier access to the panels. In some arrangements, a plurality of hinges may attach the stacked panels to the panel base. In some such arrangements, each of such hinges may be part of universal joints as known to those skilled in the art such that the stacked panels may be moveable in directions toward and away from inner surface 1610 of housing 1612 as well as in directions substantially parallel to the inner surface. In some such arrangements, the universal joint may provide resistance such that the stacked panel remains in position after being moved. In yet another arrangement, ball-and-socket joints may be used in place of the universal joints to provide for very similar articulation movements and resistance to movement for maintaining the position of the stacked panels.

In some alternative arrangements, stacked panels 1651-1653 may be individually attached directly to inner surface 1610 of housing 1612 without being attached to a separate panel base. In some other alternative arrangements, adapters may be directly attached to a panel base or directly to the inner surface of the housing. In any of these alternative arrangements, the stacked panels or the individual adapters may be articulable such that they may be moved towards and away from adjacent adapters in both lateral and longitudinal directions substantially parallel to inner surface 1610 of housing 1612.

Still referring to FIG. 18, supply side optical cables 1620 may be inserted into any one of adapters 1650 and are generally inserted into ports of the adapters further from, i.e., more distal to, the locations of the entries of the supply side optical cables into housing 1612. In some arrangements, supply side optical cables 1620 may be detachable from any adapter 1650 into which any such cable is inserted via release mechanisms known to those skilled in the art, such as but not limited to any one or any combination of a connector release button, a latch lever or flange of a connector of the cables, and a boss or protrusion providing resistance to pullout that is overcome by applying a sufficient force, while in other arrangements the supply side optical cables may be permanently inserted into respective adapters 1650 such that the adapters themselves must be disassembled to remove the supply side optical cables. The mobility of stacked panels 1651-1653 and of the individual adapters 1650 facilitates removal and insertion of supply side optical cables 1620. In particular, rotation of stacked panels 1651-1653 towards inner surface 1610 of housing 1612 may move impediments to reaching specific adapters 1650 out of the way of a user, such as a telecommunications technician, and orient longitudinal axes of adapter ports that are further from the locations of the entries of supply side optical cables 1620 into housing 1612 towards being parallel to the inner surface to allow access for insertion and removal of connectors of supply side optical cables 1620 from ports of adapters further from the locations of the entries of the supply side optical cables into housing 1612.

Demand side optical cables 1630 also may be inserted into any one of the adapters 1650. Demand side optical cables 1630 are generally inserted into ports of the adapters closer to, i.e., more proximal to, the locations of the entries of the demand side optical cables into housing 1612 and are generally detachable from their respective adapters in the same manner that supply side optical cables 1620 may be detachable from any adapter 1650 into which they are inserted as described previously herein. Rotation of stacked panels 1651-1653 away from inner surface 1610 of housing 1612 allows for easier accessibility to ports of adapters 1650 on the sides of the adapters closer to the locations of the entries of the demand side optical cables. Stop limits (not shown), such as through the use of flanges that abut one or more of stacked panels 1651-1653, may be used to prevent rotation of the stacked panels beyond a certain range of motion, in order to prevent the inducement of bending stresses in either supply side optical cables 1620 or demand side optical cables 1630 when such cables are received in adapters 1650.

As further shown in FIG. 18, supply side insert 1655 is insertable into second slot 1602 of housing 1612. As shown, insert 1655 may include opposing tabs 1656 such that the insert may be inserted in only one direction into housing 1612. In the example shown, sleeve 1625 surrounds supply side optical cables 1620 and thus serves as the outer jacket for the supply side optical cables. Sleeve 1625 preferably may be rigid to protect cables 1620. Sleeve 1625 extends through a hole defined by supply side insert 1655. In some arrangements, insert 1655 may be molded around sleeve 1625 or the sleeve may be passed through the hole defined by the insert and a sealant, such as caulk, or a seal, such as a rubber seal, may be added around the joint of the sleeve and the insert to prevent or substantially inhibit the intrusion of water or other liquids into housing 1612.

Figure 19B:
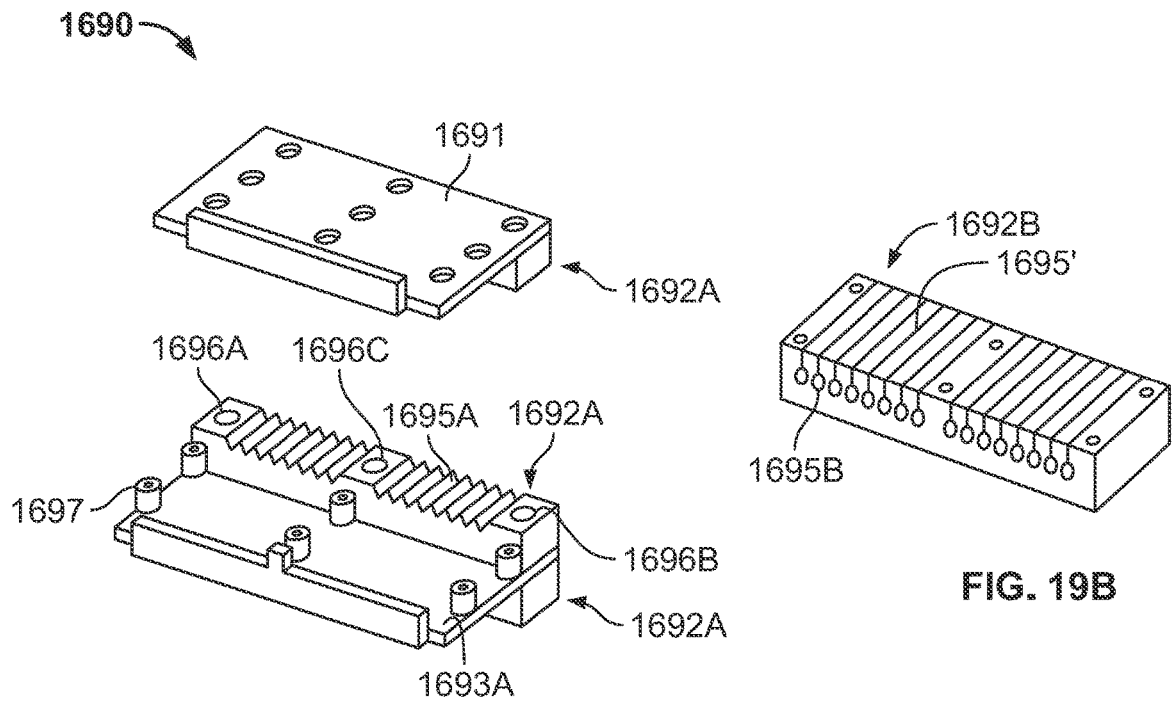
FIGS. 19B and 19C are perspective views of insert layers for use in the termination unit assembly shown in FIG. 18.
Figure 19C:
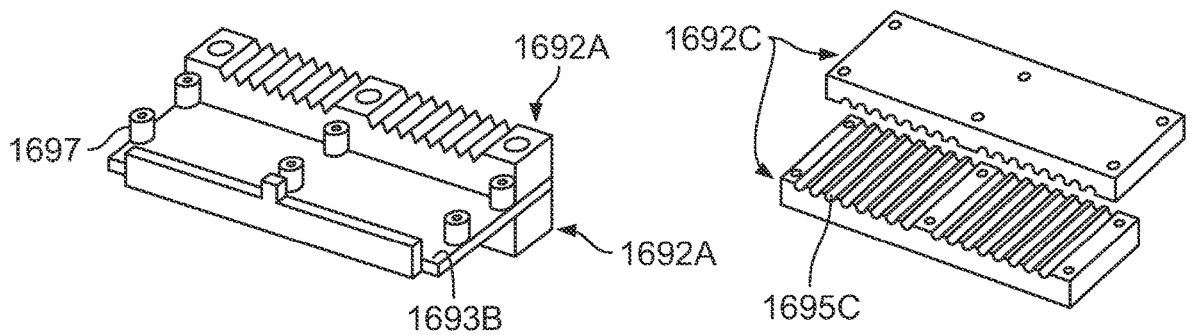
Figure 19A:
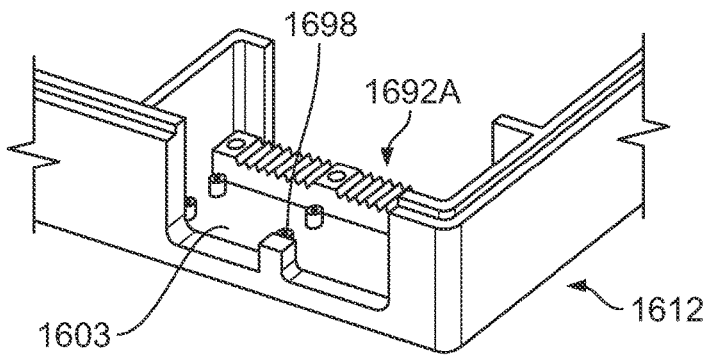
FIG. 19A is an exploded view of an insert assembly of the termination unit assembly shown in FIG. 18.

Still referring to FIG. 18, demand side insert assembly 1690 includes a plurality of rigid plates and stacked compressible insert layers that may be inserted into first slot 1603 of housing 1612. With further reference to FIGS. 19A-19C, the plurality of demand side optical cables 1630 may be inserted into respective holes defined by an insert layer, such as insert layer 1692B in the example of FIG. 19B, or by a pair of insert layers, such as in the example of insert layers 1692C in FIG. 19C. Fasteners 1699A-1699C, which may be screws, may be inserted through holes extending through plates and insert layers of insert assembly 1690 and attached to housing 1612 to retain the insert assembly in first slot 1603 and to compress demand side optical cables 1630. In this manner, insert assembly 1690 may act as a catch on each of demand side optical cables 1630.

Referring again to FIG. 19A, insert assembly 1690 includes outer plate 1691, insert layer 1692A attached to outer plate 1691 on an inner side of the outer plate, two sets of further insert layers 1692A attached to opposing sides of respective first and second central plates 1693A, 1693B, and another insert layer 1692A attached to housing 1612 within first slot 1603. As in the example shown, insert layers 1692A may have grooves 1695A having a cross-section in the form of a saw-tooth pattern and spaced-apart holes 1696A-1696C for receiving respective fasteners 1699A-1699C. Any one or any combination of plates 1691, 1693 and insert layers 1692A preferably may be made of a hard material such as a hard plastic or metal. Grooves 1695A of confronting insert layers 1692A may define insert holes having smaller diameters than the diameters of demand side optical cables 1630. In this manner, grooves 1695A may define insert holes for receiving and compressing demand side optical cables 1630 to mechanically clamp these cables. As further shown in this example, alignment bosses 1697 may extend from central plates 1693A, 1693B through which fasteners 1699A-1699C extend, and mounting bosses 1698 to which the fasteners are mounted, such as by threading, may extend from housing 1612. Insert layers 1692B or a confronting set of insert layers 1692 C may be placed onto each of first and second central plates 1693A, 1693B and onto housing 1612 within first slot 1603 at locations between insert layers 1692A and the exposed opening of the first slot through which demand side optical cables 1630 enter housing 1612.

With reference to FIG. 19C, insert layer 1692C is similar in shape to insert layer 1692A but insert layer 1692C includes grooves 1695C having a cross-section in the form of an arc. Grooves 1695C of confronting insert layers 1692C define insert holes for receiving and compressing demand side optical cables 1630 to form a seal, which may be a watertight seal, around the demand side optical cables. In some arrangements, insert layers 1692C may be sufficiently compressible such that the insert holes defined by confronting grooves 1695C may have smaller diameters than the diameters of demand side optical cables 1630 received by the grooves. In this manner, a seal, which may be watertight seal, may be formed around optical cables 1630 received in insert assembly 1690 and such cables may be mechanically clamped to prevent or substantially inhibit the pullout of these cables from housing 1612.

The diameter of insert holes 1695B of insert layer 1692B like the insert holes defined by confronting insert layers 1695C may be smaller than the diameters of demand side optical cables 1630. In such arrangements, as shown in FIG. 19B, slits 1695' may extend from insert holes 1695B to allow for insertion of demand side optical cables 1630 into the insert holes in a direction transverse to a longitudinal axis defined by each of the insert holes. One insert layer 1692B may be used in conjunction with outer plate 1691 and central plates 1693 in place of each set of confronting insert layers 1692C.

Insert layers 1692B, 1692C may be made of compressible materials that may act as a seal upon compression such as but not limited silicone, soft plastics such as but not limited to a soft urethane, or rubber. In some arrangements, insert layers 1692B, 1692C may be molded onto any one or any combination of outer plate 1691, central plates 1693, and housing 1612.

Figure 20:
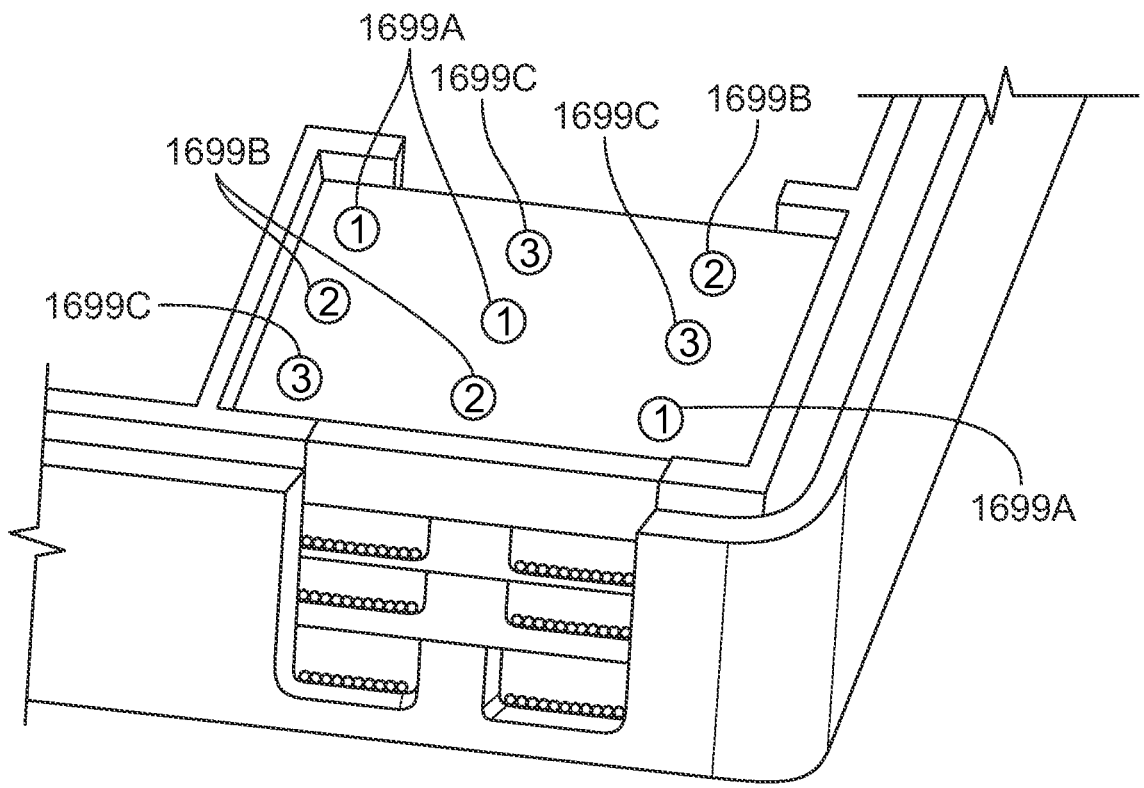
FIG. 20 is a perspective view of a portion of the termination unit assembly shown in FIG. 18.
Figure 21:
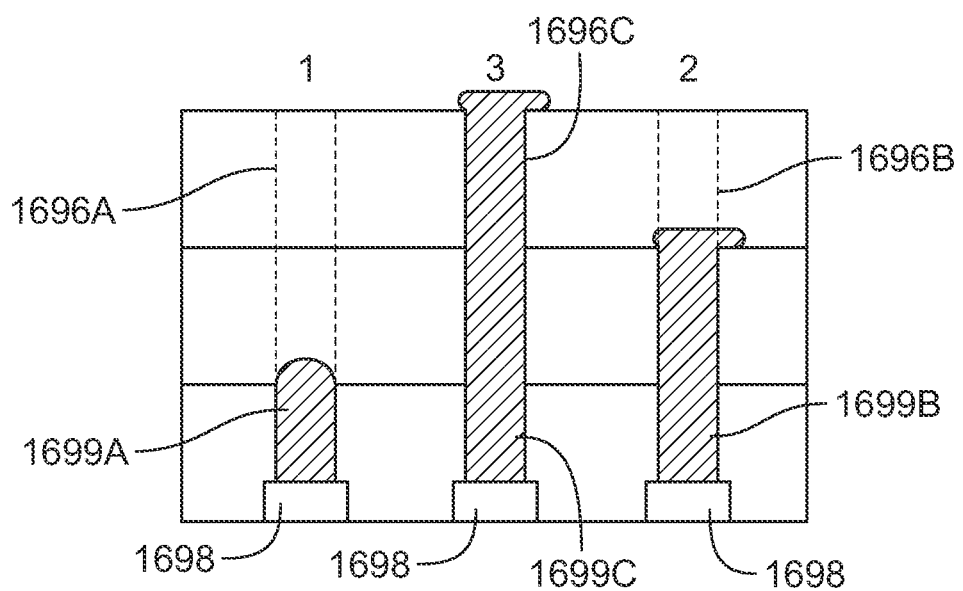
FIG. 21 is a cross-sectional elevation view of a portion of the insert assembly shown in FIG. 18.

With reference to FIGS. 20 and 21, fasteners 1699A-1699C may be of different sizes such that they correspond to specific holes 1696-1696C. In the example shown in which there are three sets of holes defined by demand side insert assembly 1690, outer plate 1691 and central plate 1693A may include wider portions along holes 1696A such that a head of only the shortest fastener 1699A may contact and compress central plate 1693B in these holes when threaded into corresponding mounting bosses 1698. Similarly, only outer plate 1691 may include wider portions along holes 1696B such that a head of only a medium-sized fastener 1699B may contact and compress both central plates 1693A, 1693B when threaded into corresponding mounting bosses 1698. None of plates 1691, 1693A, 1693 may include wider portions along holes 1696C such that a head of only a longest fastener 1699C may contact and compress each of outer plate 1691 and central plates 1693A, 1693B. Utilizing these differently sized fasteners allows some layers to be removed without having to remove all layers in order to add or remove any demand side optical cables 1630. For example, removal of fasteners 1699B and 1699C would allow the removal of all layers except central plate 1693B and the stacked insert layers between central plate 1693B and housing 1612.

Figure 22A:
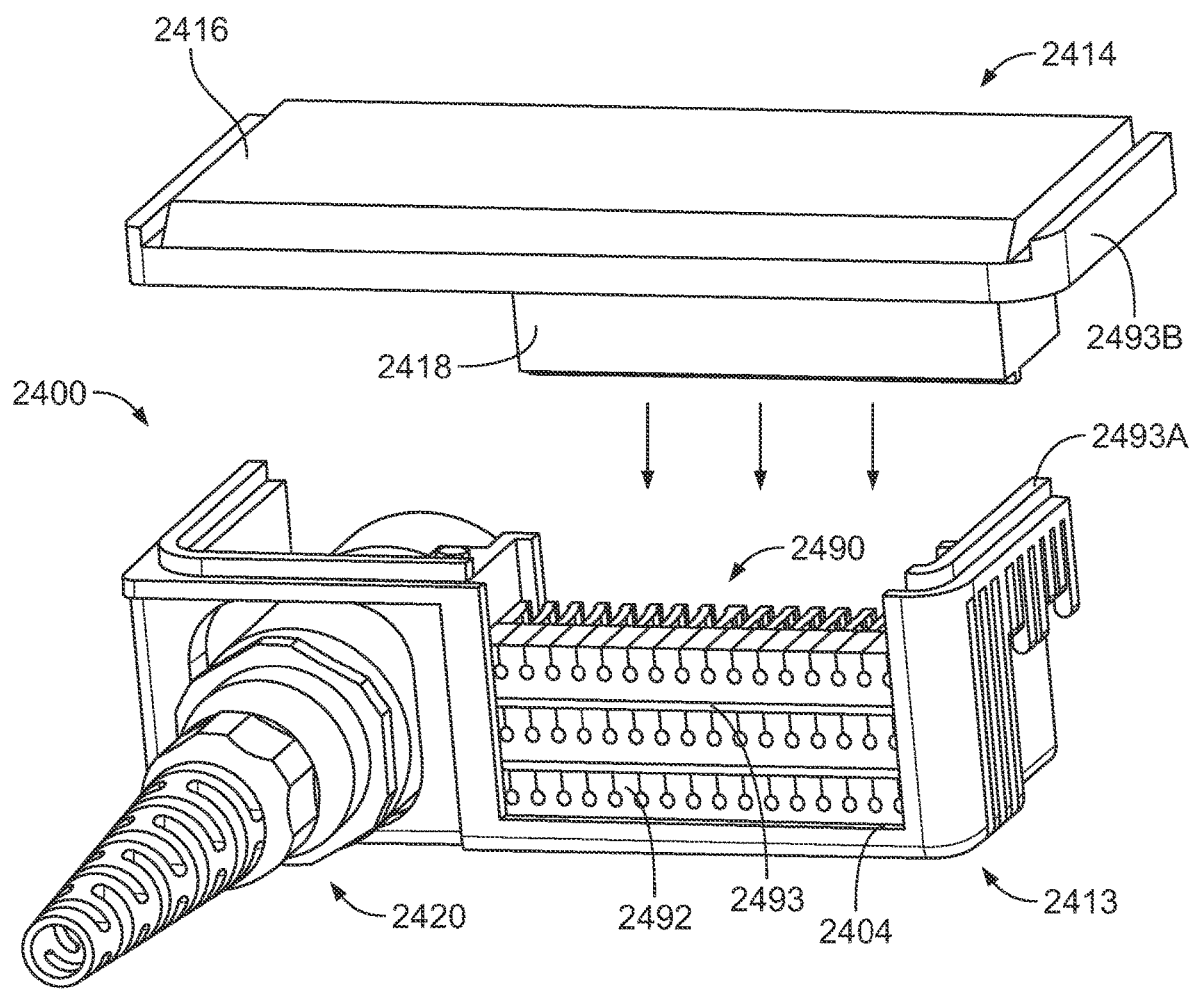
FIG. 22A is a perspective view of a portion of a termination unit assembly in accordance with another embodiment.
Figure 54:
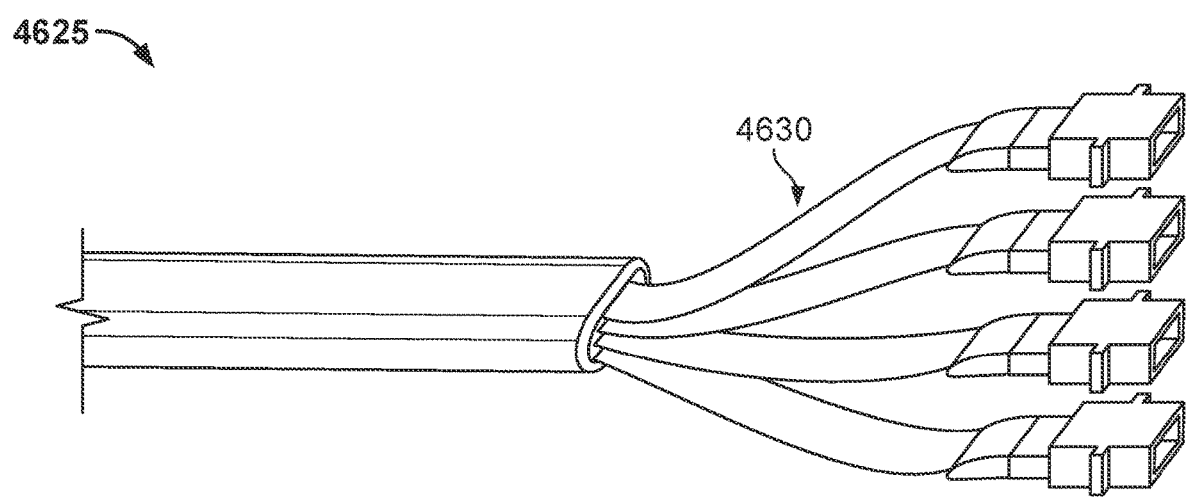
FIG. 54 is a perspective view of inner optical cables in accordance with an additional embodiment.

Referring now to FIG. 22A, in another example, termination unit assembly 2400 generally includes housing base 2413 and housing lid 2414 configured for placement onto the housing base, supply side cable 2420 further described below with respect to FIG. 54D, and demand side insert assembly 2490. As shown, housing base 2413 generally includes cutout 2404 substantially in the same form as cutout 1604 and configured for receipt of demand side insert assembly 2490 and base outer rim 2493A having a thinner profile than an upper portion of base 2413 from which the base outer rim extends. Housing lid 2414 generally includes main section 2416, insert compression section 2418 extending from a portion of the main section corresponding to the location of demand side insert assembly 2490 when the insert assembly is received in cutout 2404 and the housing lid is placed onto housing base 2413, and lid outer rim 2493B corresponding to and defining a channel for receipt of base outer rim 2493A when the housing lid is placed onto the housing base.

Figure 22B:
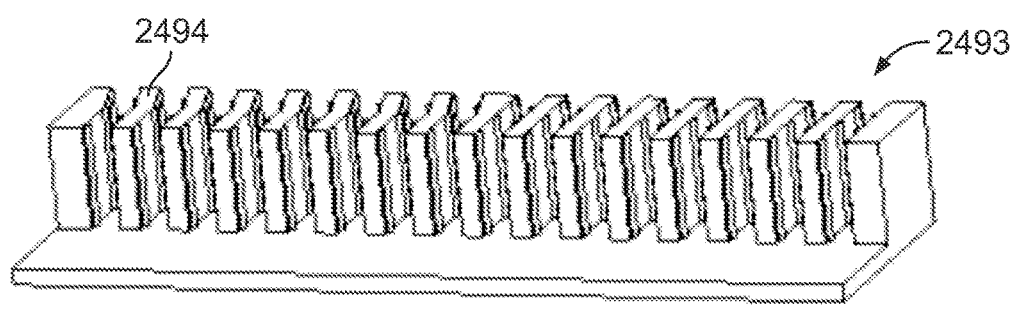
FIG. 22B is a perspective view of a central plate of the termination unit assembly of FIG. 22A.

As shown in FIGS. 22A and 22B, demand side insert assembly 2490 includes a plurality of insert layers 2492 and a plurality of central plates 2493 on which each of the insert layers may be stacked as shown. Insert layers 2492 are substantially in the same form and operate in the same manner as insert layers 1692B shown in FIG. 19B. Central plates 2493 include multiple flanges 2494 defining slots through which demand side optical cables 1630 may be received and separated from one another. Flanges 2494 may be any one or any combination of curved as shown, tapered, and aligned at various angles to each to guide demand side optical cables 1630 towards a patch panel assembly such as but not limited to patch panel assembly 2511 shown in FIG. 23.

When housing lid 2414 is placed onto housing base 2413 to close the housing formed by the combination of the housing lid and the housing base, insert compression section 2418 may compress demand side insert assembly 2490 such that portions of demand side optical cables 1630 are compressed within holes of the plurality of insert layers 2492 of insert assembly 2490 through which the cables are inserted and such that the compressed portions of the cables are held in place relative to the insert assembly. In this manner, when the housing defined by housing lid 2414 and housing base 2413 is closed such that lid outer rim 2493B overlaps base outer rim 2493A and insert assembly 2490 is compressed by insert compression section 2418, an interior of the housing defined by a combination of housing base 2413 and housing lid 2414 may form a seal, which may be a watertight seal, at interfaces between the housing base and the housing lid, the housing base and the insert assembly inserted into the housing base, the housing lid and the insert assembly, and the insert assembly and the portions of demand side optical cables 1630 compressed by the insert assembly.

Figure 24D:
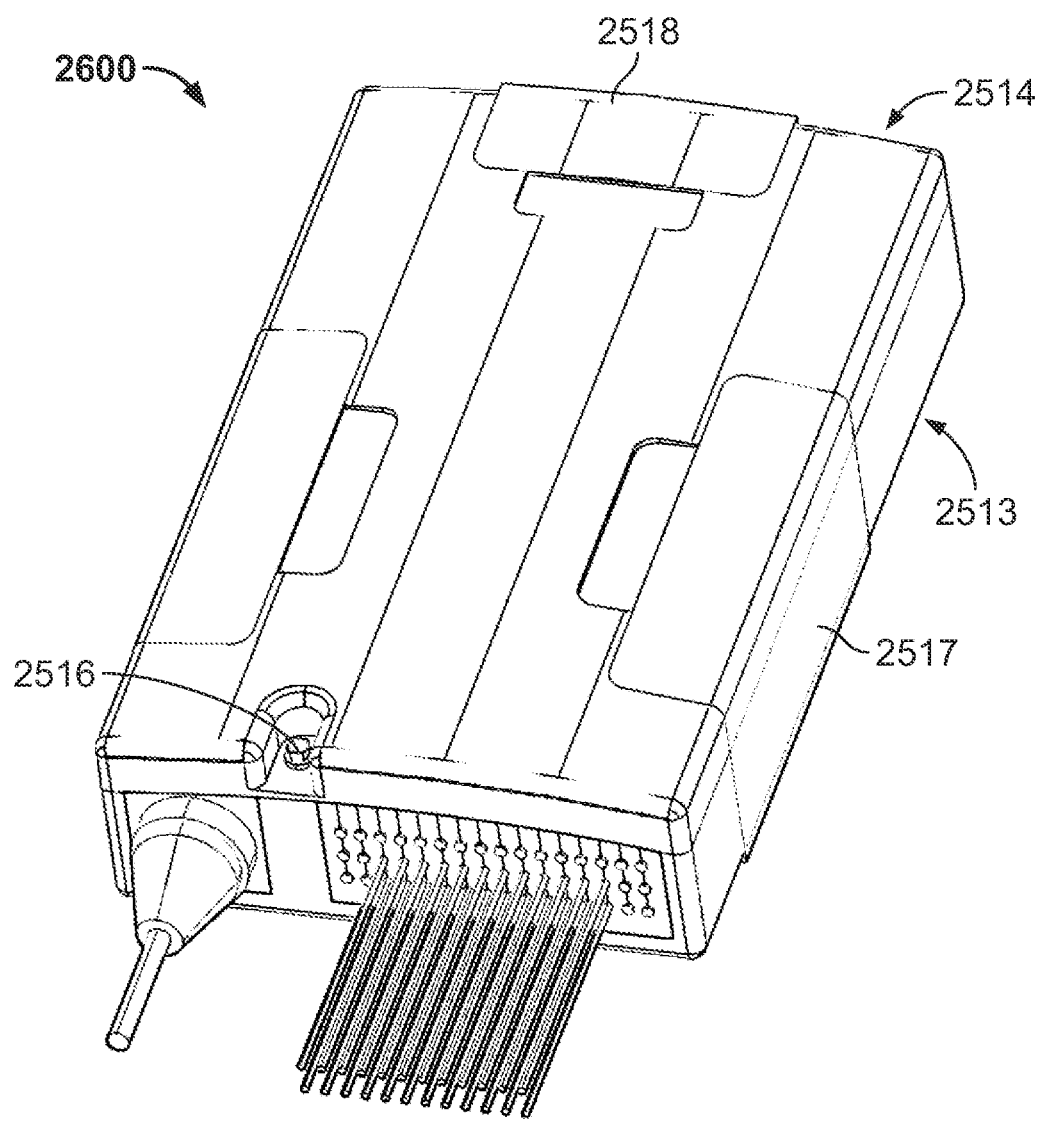
FIG. 24D is a perspective view of an exterior of the termination unit assembly of FIG. 24A.
Figure 51:
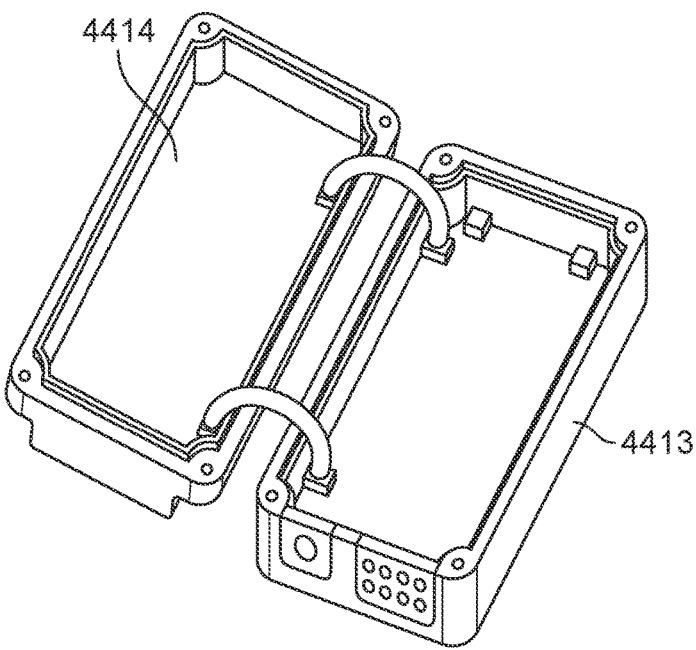
Figure 52:
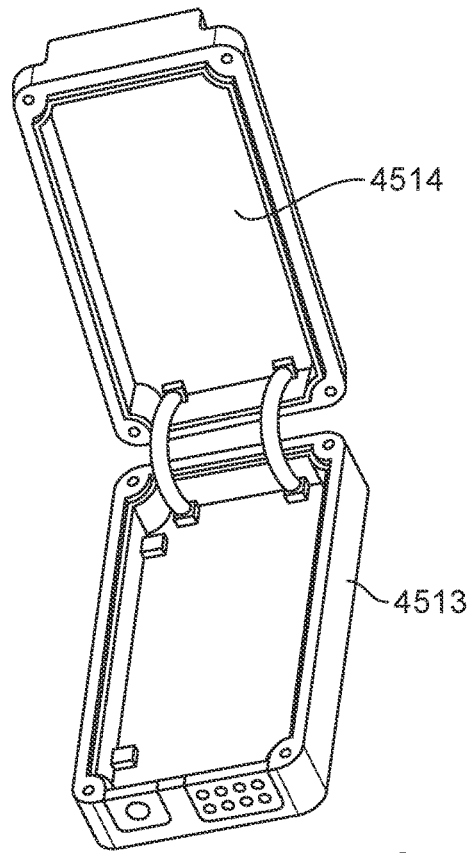
Figure 53A:
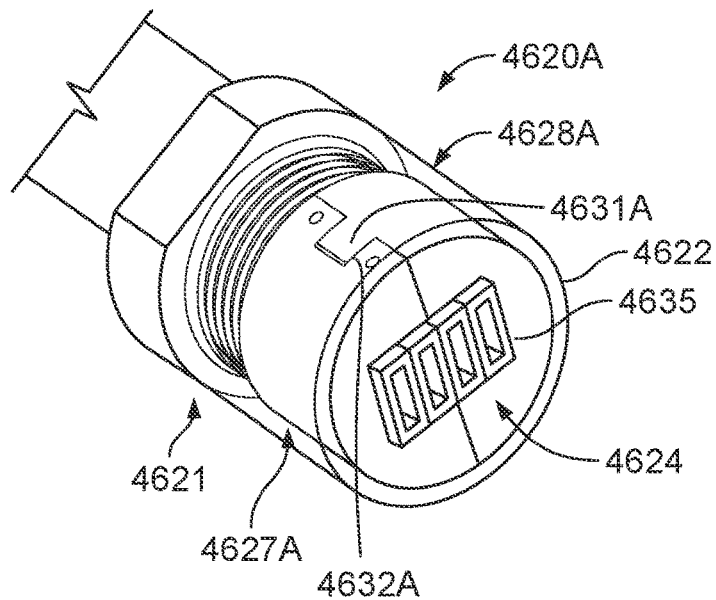
FIGS. 53A-53C are perspective views of portions of supply side cables in accordance with further embodiments.
Figure 53B:
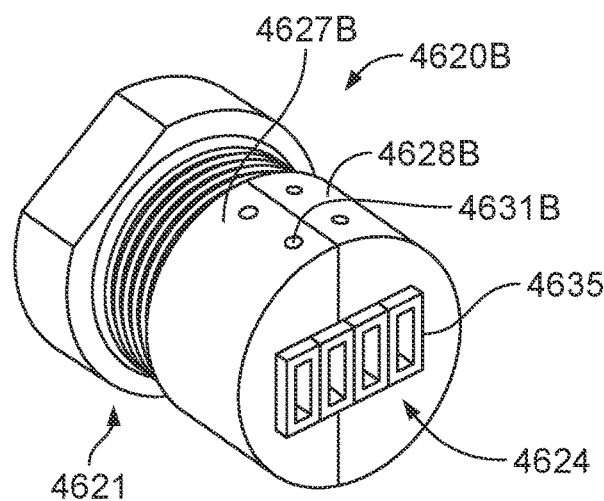
Figure 53C:
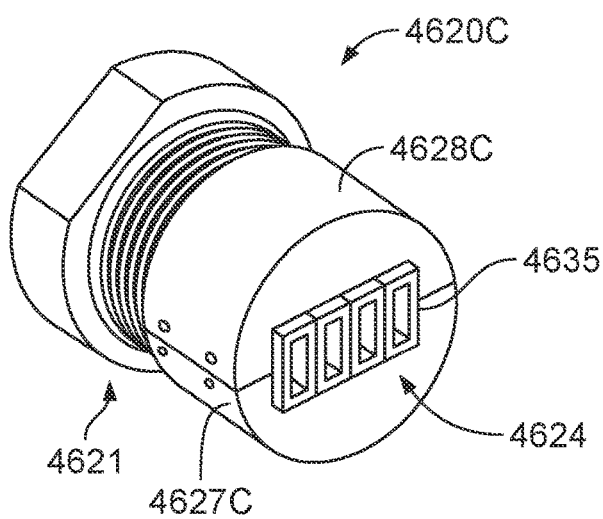
Figure 53D:
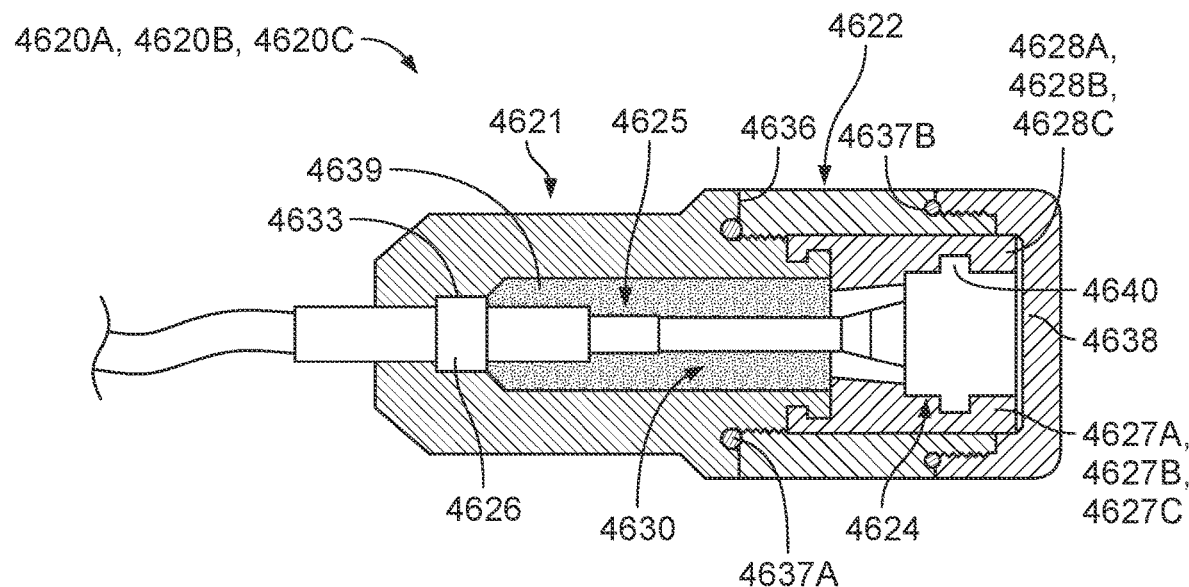
FIG. 53D is a cross-sectional view of a portion of the supply side cables of FIGS. 53A-53C.

Housing base 2413 may be rotatably attached to housing lid 2414 as in the examples described further herein with respect to FIGS. 52 and 53 or the housing base and housing lid may be fastened together by fasteners such as screws as in the examples shown in FIGS. 24D and 51. In some alternative arrangements, the configurations of base outer rim 2493A and lid outer rim 2493B may be reversed such that the lid outer rim may be received within a channel defined by the base outer rim.

Figure 23:
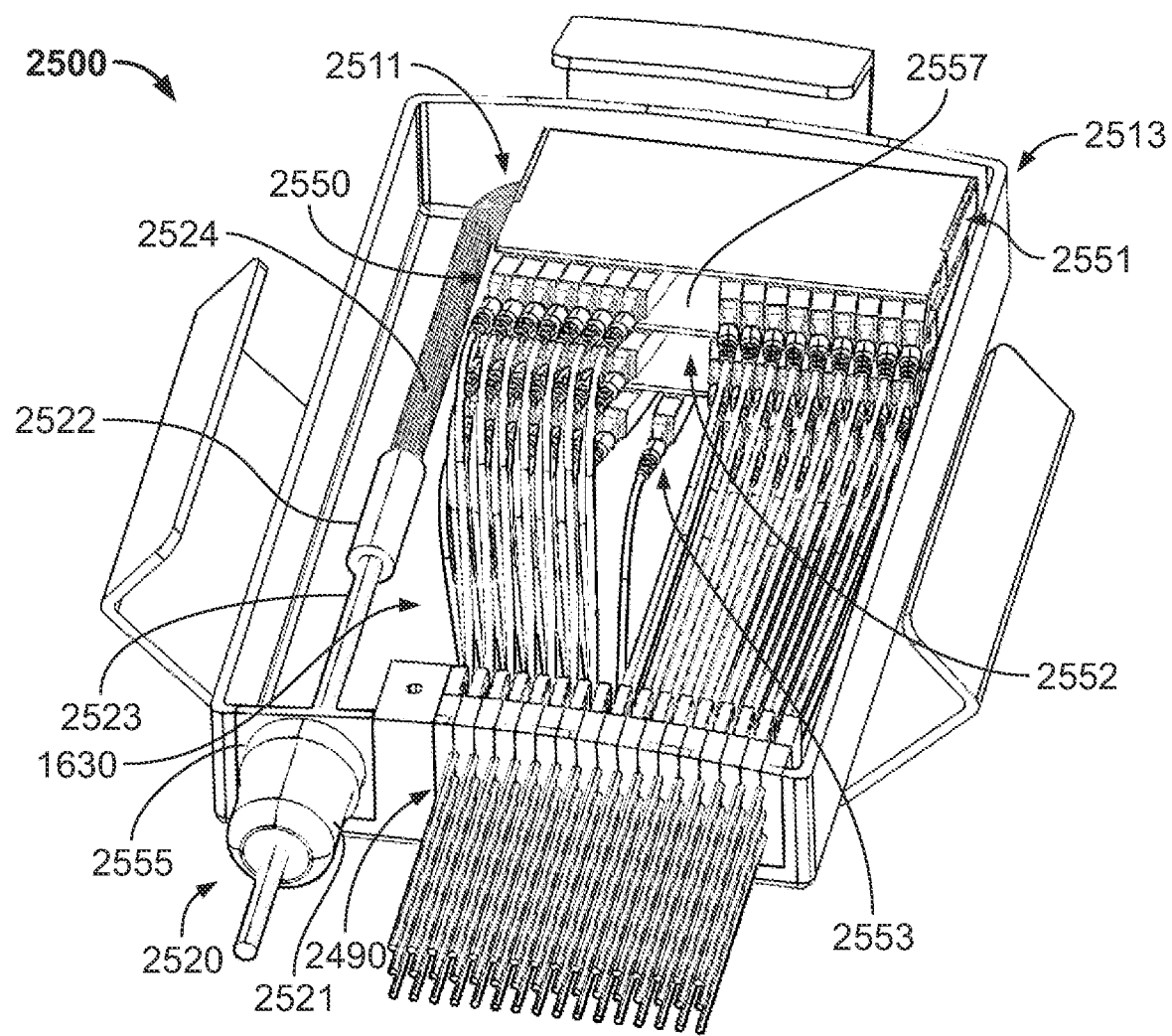
FIG. 23 is a perspective view of a portion of a termination unit assembly in accordance with another embodiment.

Referring now to FIG. 23, termination unit assembly 2500 is substantially the same as termination unit assembly 2400 with the notable exceptions that termination unit assembly 2500 includes housing base 2513 and housing lid 2514 (as shown in FIG. 24D) in place of housing base 2413 and housing lid 2414, respectively, and includes supply side cable 2520 in place of supply side cable 2420. As noted above, termination unit assembly 2500 includes patch panel assembly 2511 which is the same or substantially the same as patch panel assembly 1611 shown in FIG. 18. As with patch panel assembly 1611, patch panel assembly 2511 includes a plurality of stacked panels 2551-2553. As in the example shown, patch panel assembly 2511 may be attached to housing base 2513, such as by fasteners or by way of a snap fit. Stacked panels 2551-2553, or at least adapters 2550 of each of the stacked panels, may be staggered such that the adapters of stacked panel 2553 are closer to demand side insert assembly 2490 than the adapters of stacked panels 2551, 2552, and the adapters of stacked panel 2552 are closer to the insert assembly than the adapters of stacked panel 2551. In some alternative arrangements, the plurality of stacked panels 2551-2553 may be stacked and attached to each other in any one of the configurations shown in FIGS. 28-37C or in other arrangements.

Figure 28:
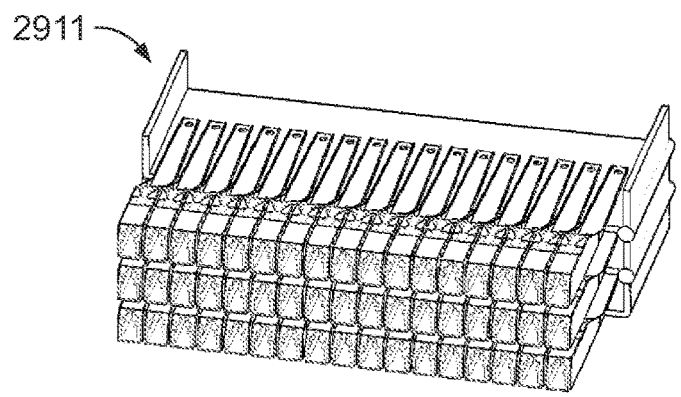
FIGS. 28-32 are perspective views of patch panel assemblies in accordance with additional embodiments.
Figure 29A:
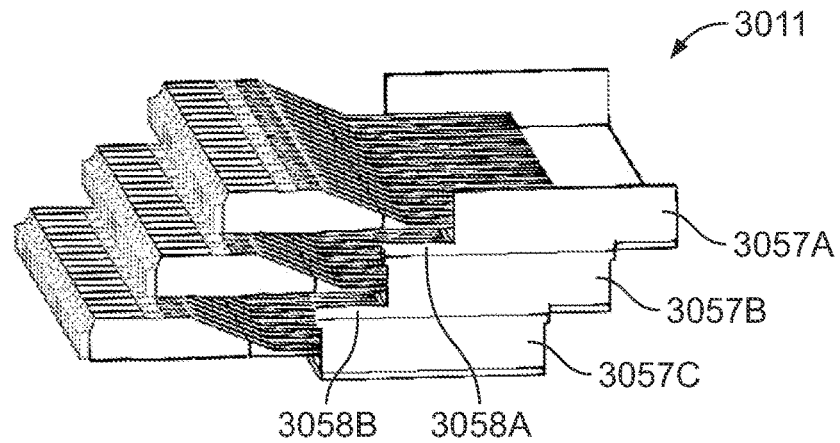
Figure 29B:
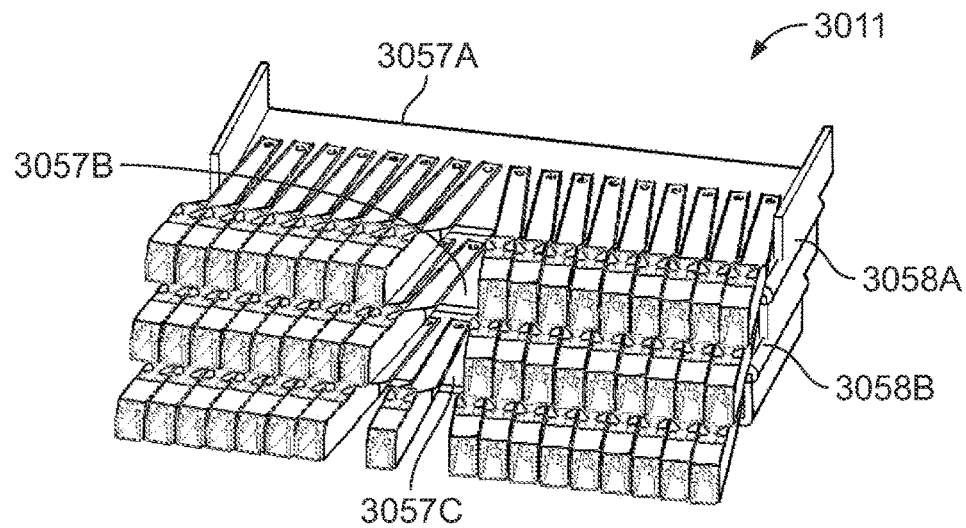

Stacked panels 2551-2253 each include panel base 2557 to which adapters 2550 are pivotally attached by a hinge, such as the hinges attaching the panel bases to the adapters in FIG. 28, for example. In this manner, as further shown in FIG. 23, each of adapters 2550 may be pivoted away from adjacent adapters in order to isolate an adapter for easier accessibility in order to attach one of demand side optical cables 1630 to the isolated adapter or to detach any such cable from the isolated adapter.

In the example shown, supply side cable 2520 is received against and into supply side insert 2555, which is configured and operates in substantially the same manner as supply side insert 1655, and then into an interior of housing base 2513. Supply side cable 2520 includes relatively thick outer cover 2521, relatively thinner inner cover 2522, and even thinner intermediate cover 2523 attached to and extending between the outer cover and the inner cover. Outer cover 2521 may be relatively rigid to prevent bending of one or more optical fibers extending through the outer cover. In some arrangements, intermediate cover 2523 and inner cover 2522 may be relatively rigid. The one or more optical fibers extending through outer cover 2521 may extend through intermediate cover 2523 and may be in optical communication with a plurality of optical fibers 2524 that may extend from inner cover 2522. In some arrangements, there may be twenty-four (24) or forty-eight (48) optical fibers 2524. Connectors on ends of the plurality of optical fibers 2524 in turn may be inserted into ends of adapters 2550 opposite ends of the adapters into which demand side optical cables 1630 may be inserted such that the supply side optical fibers 2524 may be in optical communication with corresponding optical fibers within the demand side optical cables.

Referring now to FIGS. 24A-24D, in another example, termination unit assembly 2600 is substantially the same as termination unit assembly 2500 with the notable exceptions that supply side cable 2520 is replaced by a combination of supply side cable 2620 that may be inserted through supply side insert 2555 and a plurality of extension cables 2625, a total of four multi-fiber push on (MPO) cables in the example shown, that each include a portion of the supply side optical fibers 2624 extending from inner cover 2622. Supply side cable 2620 is substantially in the form of supply side cables 4620A, 4620B, 4620C shown in FIG. 54D and described further herein, which may be optical cables, with cap 4638 removed. Each of the plurality of extension cables 2625 may be inserted into respective ports of inner adapters 4624 (see FIG. 54D) such that the optical fibers within the extension cables may be in optical communication with respective inner subcables 4630 (see FIG. 54D) within outer cover 2621 of supply side cable 2620. Supply side optical fibers 2624 may be inserted into ends of adapters 2550 opposite ends of the adapters into which demand side optical cables 1630 may be inserted such that supply side optical fibers 2624 may be placed in optical communication with corresponding optical fibers within the demand side optical cables.

As shown by FIGS. 23, 24A, and 24D, housing lid 2514 may be secured to housing base 2513 by one or more fasteners 2516 extending through the housing lid and the housing base. As shown, housing lid 2514 may include a recess such that an entirety of fastener 2516 may sit below a top surface of the housing lid. Opposing side flaps 2517 may be hingedly attached to sides of housing base 2513 and end flap 2518 may be hingedly attached to an end of the housing base. As shown, side flaps 2517 and end flap 2518 each may include a flange that may be seated onto a top surface of housing lid 2514 to aid in the closure and securement of the housing lid onto housing base 2513. As shown, side flaps 2517 and end flap 2518 may be received in corresponding recesses of housing lid 2514.

Figure 25:
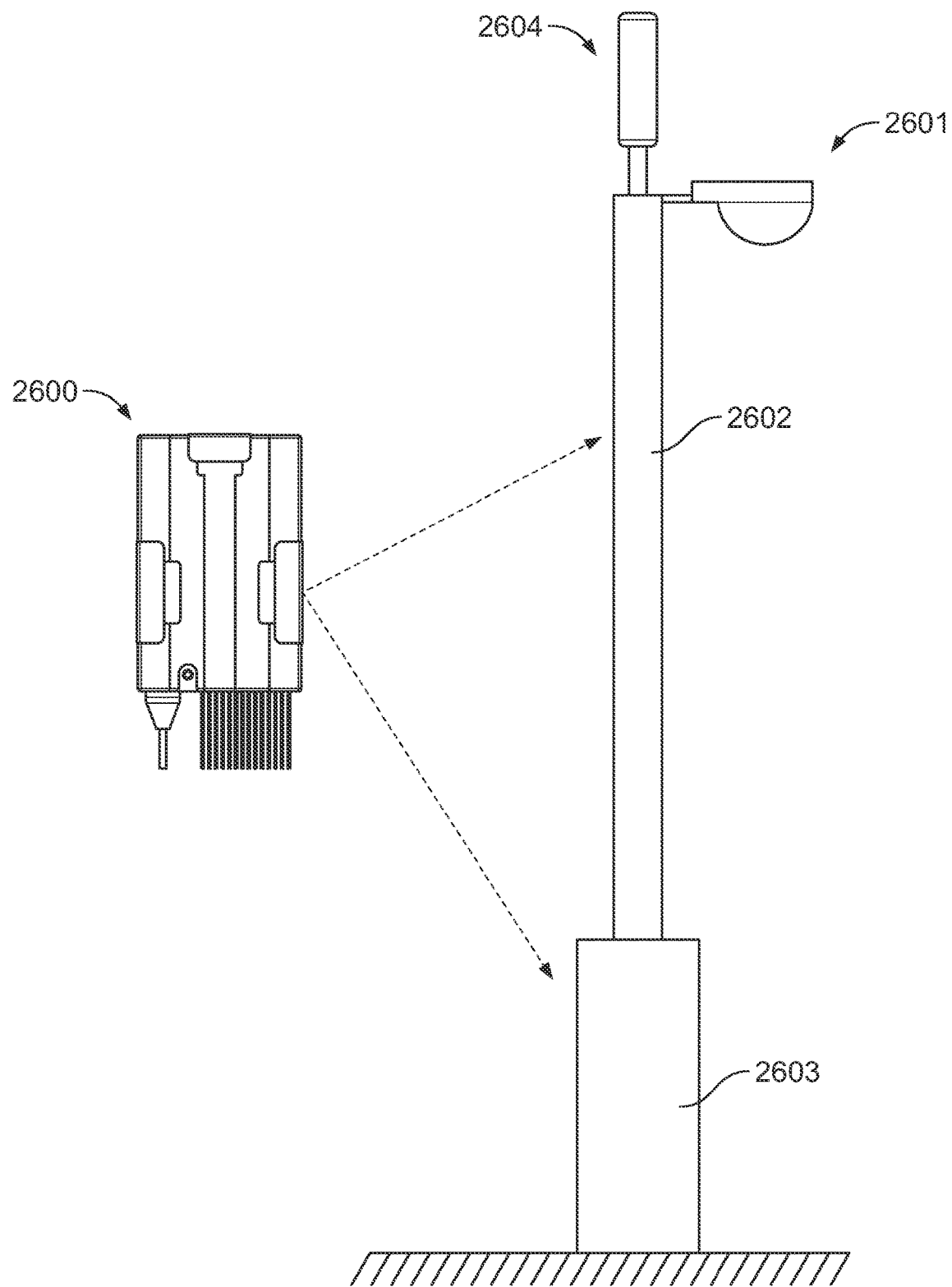
FIG. 25 is a schematic showing possible installation locations for the termination unit assembly of FIG. 24A.

Referring now to FIG. 25, termination unit assembly 2600, as well as all other termination unit assemblies described herein, may be secured to various stable structures, including street light pole assembly 2601. In this manner, the termination unit assemblies may be accessible by more easily accessible by technicians responsible for installing and maintaining the termination unit assemblies and also for providing shorter distribution routes to consumers of optical signals sent from the termination unit assemblies. As shown, termination unit assembly 2600 may be attached to pole 2602 such that the termination unit assembly may be exposed to the naked eye or may be attached to base unit 2603 of light pole assembly 2601 such that the termination unit assembly may be concealed by the base unit. In some arrangements, termination unit assembly 2600 may be electrical communication with a receiver or transceiver of a radio/antenna 2604 extending from light pole assembly 2601 such that the termination unit assembly 2600 may receive instructions from remote locations or transmit status notifications of the termination unit assembly remotely as needed.

Figure 26:
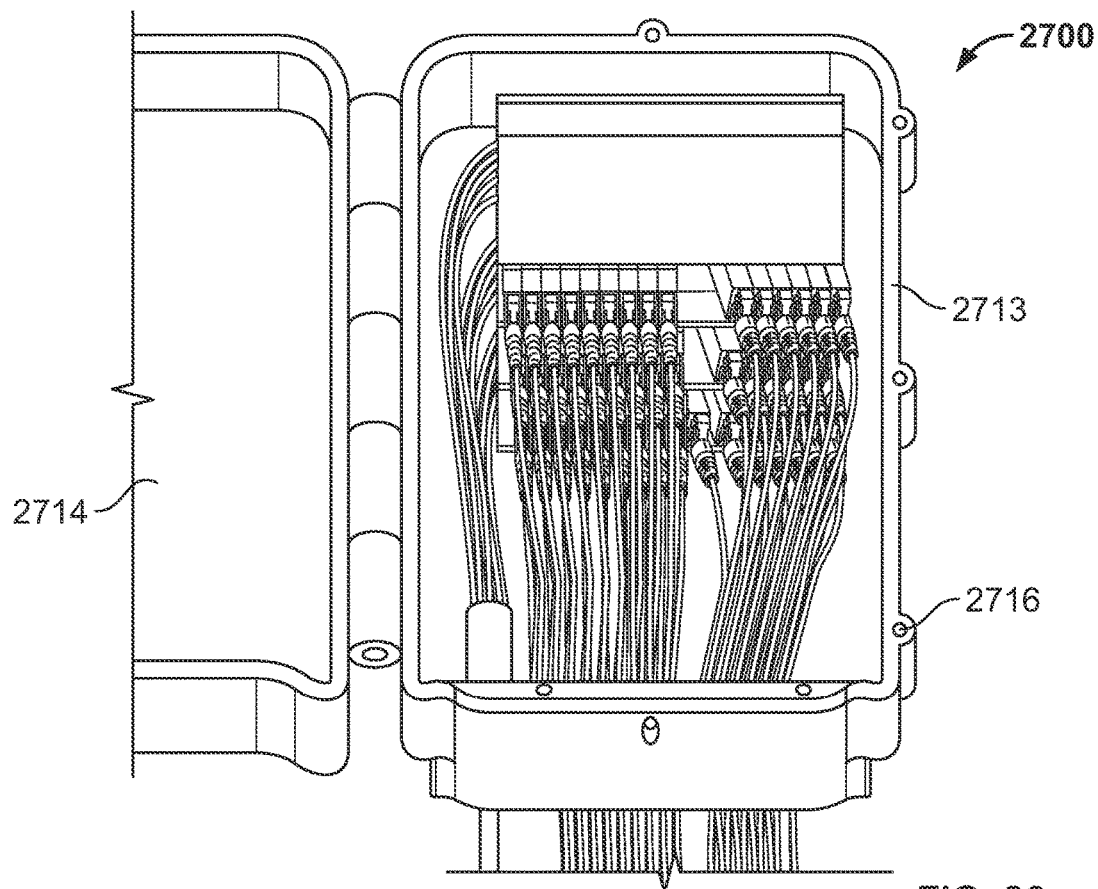
FIG. 26 is a plan view of a portion of a termination unit assembly in accordance with another embodiment.

As shown in FIG. 26, in another alternative arrangement, termination unit assembly 2700 may be substantially the same as termination unit assembly 1600 with the notable exceptions that housing lid 2714 and housing base 2713 hingedly attached to the housing lid additionally include holes 2716 for receiving fasteners to secure the housing lid to the housing base upon closure of the housing lid and that housing base 2713 may additionally include removable insert assembly cover 2705 that may be attached to the housing base to cover the slot, such as slot 1603, that receives the demand side insert assembly, such as insert assembly 1690.

Figure 27:
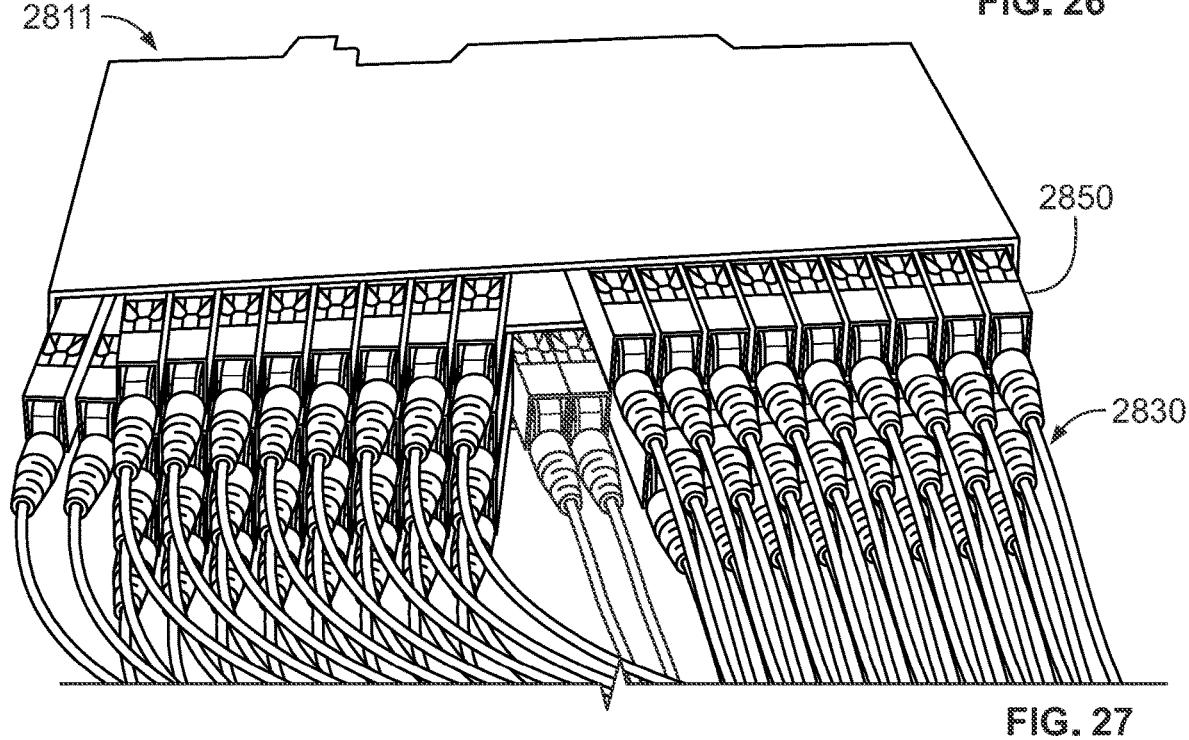
FIG. 27 is a perspective view of a patch panel assembly and attached optical cables in accordance with another embodiment.

As shown in FIG. 27, in an alternative arrangement, patch panel assembly 2811 could replace other patch panel assemblies described herein, such as patch panel assemblies 1611, 2511. Patch panel assembly 2811 is substantially similar to patch panel assemblies 1611, 2511 with the notable exception that assembly 2811 includes adapters 2850 in place of respective adapters 1650, 2550. Adapters 2850 each include two ports such that each adapter 2850 may receive two demand side optical cables 2830 unlike adapters 1650, 2550 that only receive one demand side optical cable 1630.

Figure 30:
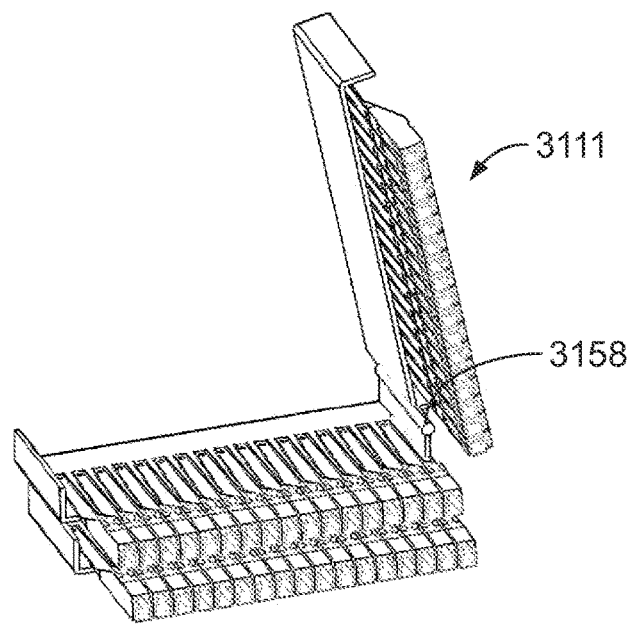
Figure 31:
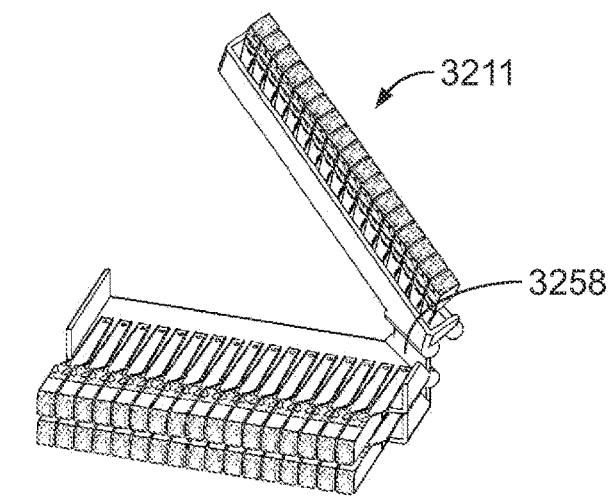
Figure 32:
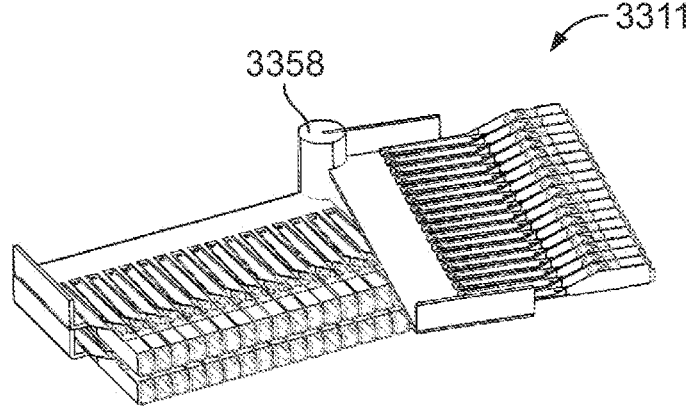

Referring now to FIGS. 28-38C, patch panel assemblies for use with any of the termination unit assemblies described herein may include various features allowing for relative movement of the stacked panels of the patch panel assemblies to provide for clearance and thus easier access to the adapters of each of the stacked panels and their respective ports. As shown in FIG. 28, the stacked panels of patch panel assembly 2911 may be fixed in position relative to each other. As shown by FIGS. 29A and 29B, each of the stacked panels of patch panel assembly 3011 may be slid relative to their adjacent panel. As best shown in FIG. 29B, bottoms of opposing side walls of panel base 3057A may be slid within corresponding grooves 3058A of panel base 3057B and bottoms of opposing side walls of panel base 3057B may be slid within corresponding grooves 3058B of panel base 3057C. As shown in FIG. 30, each of the stacked panels of patch panel assembly 3111 may be rotated about respective hinge 3158 corresponding to each of the stacked panels. As shown in this example, each of hinges 3158 is located along a side edge of the corresponding stacked panel such that the stacked panel rotates up and away from the stacked panel below and generally to the side of the patch panel assembly and accordingly to the side of the termination unit assembly into which the patch panel assembly may be inserted. In a similar example, as shown in FIG. 31, each of the stacked panels of patch panel assembly 3211 may be rotated about respective hinge 3258 corresponding to each of the stacked panels. As shown in this example, each of hinges 3258 is located along arear corner of the corresponding stacked panel such that the stacked panel rotates up and away from the stacked panel below and generally towards the respective hinge. As shown in FIG. 32, each of the stacked panels of patch panel assembly 3311 may be rotated about respective hinge 3358 corresponding to each of the stacked panels. As shown in this example, each of hinges 3358 is located at a rear corner of the corresponding stacked panel such that the stacked panel rotates within a plane defined by the stacked panel to the side of the patch panel assembly and accordingly to the side of the termination unit assembly into which the patch panel assembly may be inserted. As shown, each of hinges 3358 may be attached to the same post and thus be rotatable about the same axis.

Figure 33A:
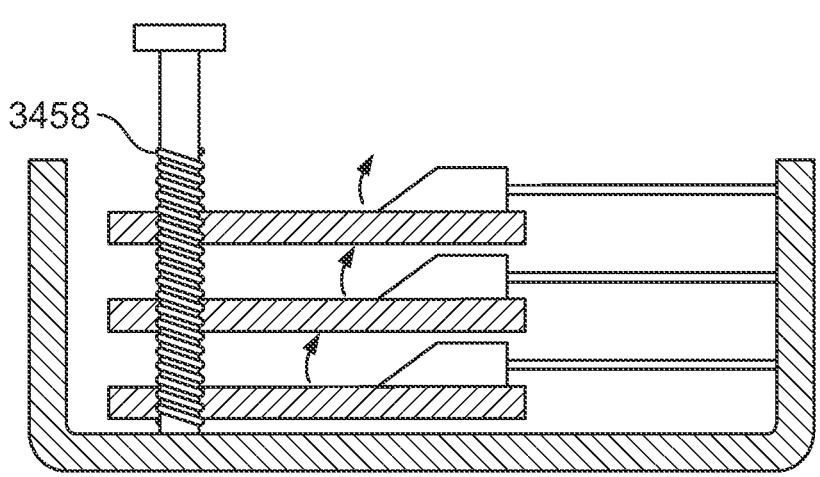
FIGS. 33A, 33B, and 34 are cross-sectional elevation views of termination unit assemblies in accordance with additional embodiments.
Figure 33B:
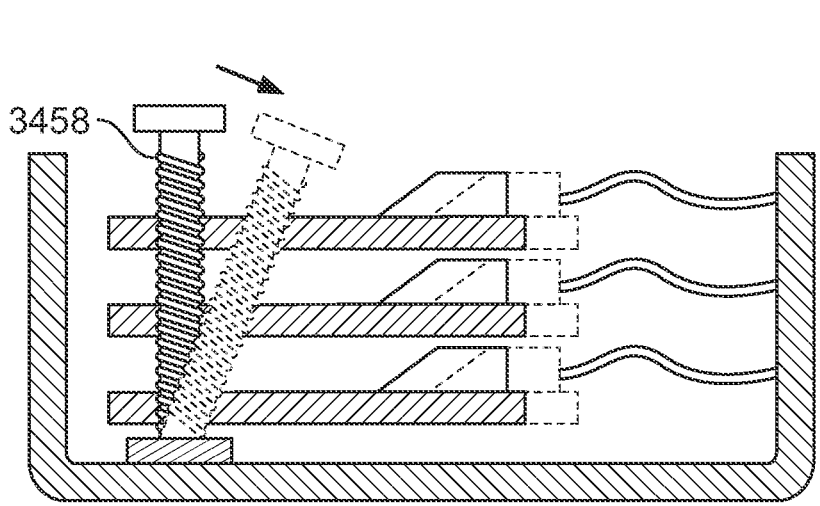
Figure 34:
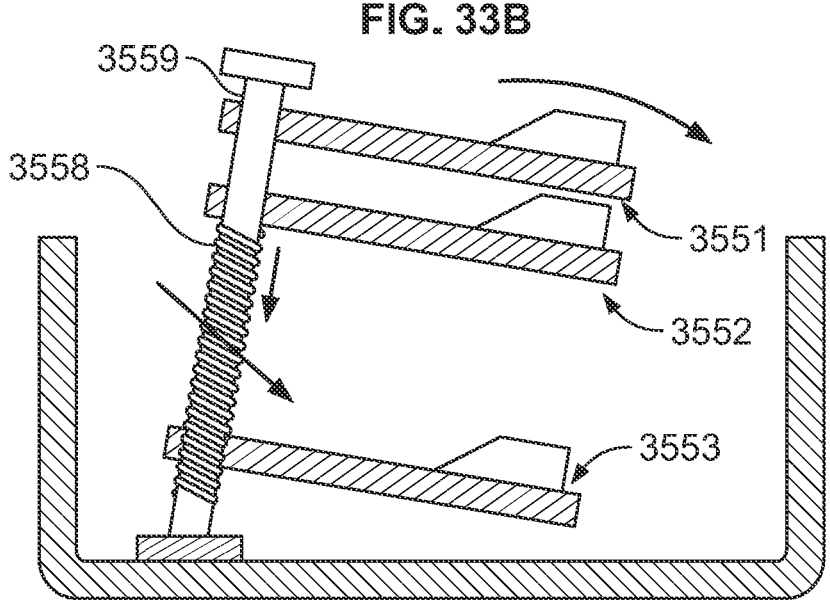

As shown in FIG. 33A, each of the stacked panels of patch panel assembly 3411 may be attached to coiled spring 3458 or other operably similar elastic member. As in the example shown, coiled spring 3458 may be stretched in a direction along a longitudinal axis of the spring to allow each stacked panel to be spaced from its adjacent stacked panels while maintaining the stacked panels of patch panel assembly 3411 together when the spring is at rest. As shown in FIG. 33B, coiled spring 3458 or operably similar elastic member may be stretched in a direction transverse, e.g., in a direction perpendicular, to a longitudinal axis of the spring to allow each stacked panel to be staggered relative to its adjacent stacked panels while again maintaining the stacked panels of patch panel assembly 3411 together when the spring is at rest. As shown in FIG. 34, in an alternative arrangement, rear portions of stacked panels 3551, 3552 extend around panel post 3559 such that stacked panels 3551, 3552 may be slid along the shaft and away from stacked panel 3553. Panel post 3559 extends through coiled spring 3558 positioned between stacked panels 3552, 3553.

As shown in FIG. 35A, a patch panel assembly may include stacked panel 3652 slidably attached to panel post 3659. As in the example shown, stacked panel 3652 may include resilient portion 3657 and adapter portion 3658 extending from the resilient portion and to which adapters 2550 are hingedly attached. Resilient portion 3657 may be in the form of one or more springs or, as in the example shown, may be made of an elastomeric material and have a porous portion that defaults to a retracted position at rest but that allows for adapter portion 3658 to be moved away from the resilient portion. As shown in FIG. 35B, panel post 3659 may be flexible allow for an entirety of stacked panel 3652 to be moved in a direction away from a longitudinal axis defined by the panel post.

As shown in FIG. 36A, a patch panel assembly may include stacked panel 3752 slidably attached to panel post 3759. As in the example shown, stacked panel 3752 may include rear plate 3757A and front plate 3757B extending from the rear plate and to which adapters 2550 are hingedly attached. Springs, such as coiled spring 3658A and leaf spring 3658B, may be attached on opposing ends to each of rear plate 3757A and front plate 3757B such that the front plate defaults to a retracted position when stacked panel 3752 is at rest but that allows for the front plate to be moved away from the rear plate. As shown, peg 3756A (or an opposing set of such pegs on opposite sides of rear plate 3757A) extends from rear plate 3757A and front plate 3757B includes groove 3756B (or opposing such grooves of front plate 3757B where there are opposing pegs) such that the peg may be slid within the groove to guide the movement of the front plate relative to the rear plate, e.g., in only forward and rearward movements as permitted by the springs attached to the front and the rear plates. As shown in FIG. 36B, panel post 3759 may be an extendable shaft, such as a two-piece shaft as shown, to allow for an entirety of stacked panel 3752 to be moved in a direction along a longitudinal axis defined by the panel post and thus away from an adjacent stacked panel. In such arrangements, panel post 3759 may be placed into a retracted position in which the panel post may maintain the stacked panels of the patch panel assembly including stacked panel 3752 in close proximity, e.g., to allow for closure of a housing lid onto a housing base of a termination unit assembly, such as assemblies 1600, 2500, 2600 described previously herein, and thereby limiting the space occupation of patch panel assemblies within such termination unit assemblies.

Figure 37A:
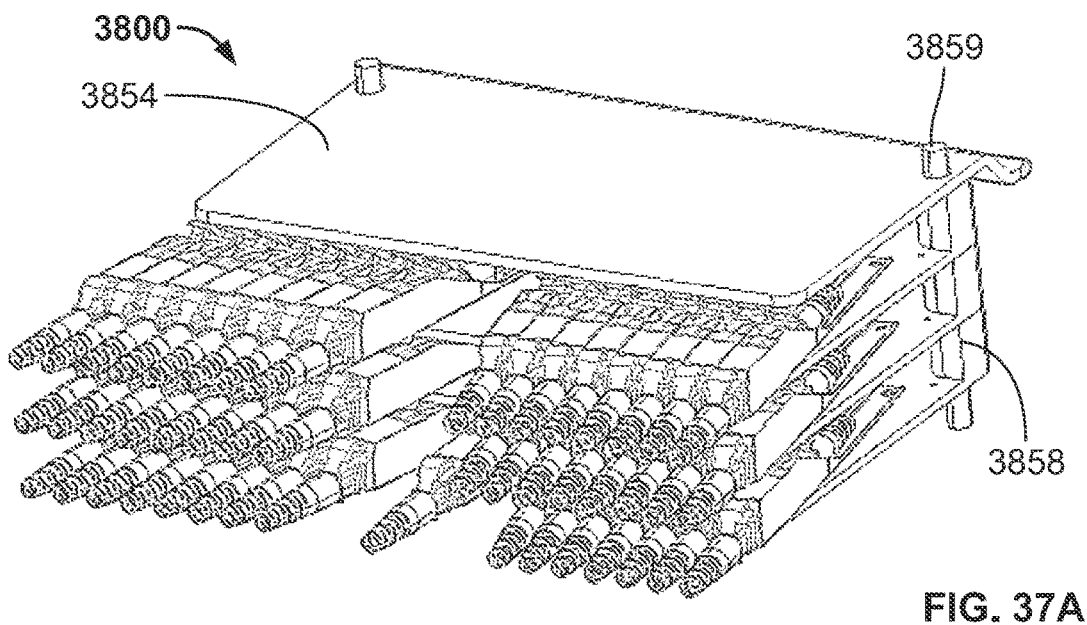
FIG. 37A shows a perspective view of a patch panel assembly and attached optical cables in accordance with an embodiment.
Figure 37B:
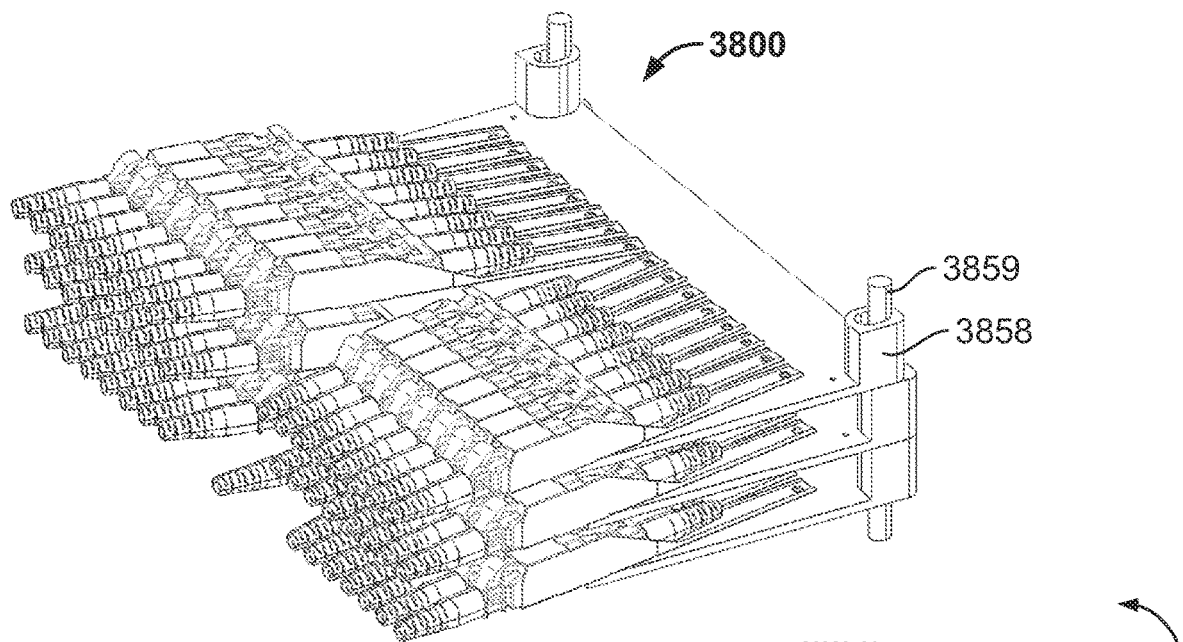
FIG. 37B shows a perspective of a portion of the patch panel assembly of FIG. 37A.
Figure 37C:
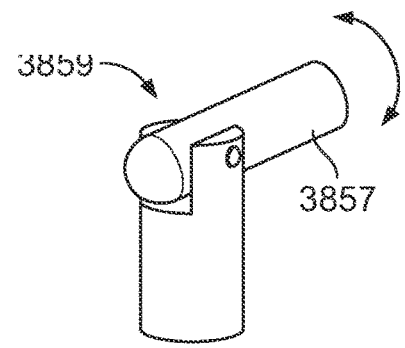
FIG. 37C shows a perspective view of a panel post of the patch panel assembly of FIG. 37A.

As shown in FIGS. 37A and 37B, patch panel assembly 3800 may include stacked panels each having bushing 3858 and panel post 3859 configured to extend through each of the bushings. At a first position of the stacked panels of patch panel assembly 3800 shown by FIG. 37A, bushings 3858 of each of the stacked panels and likewise oblong holes defined by the bushings may be in alignment with panel post 3859 extending through the oblong holes of the bushings at the same relative locations of the oblong holes. In the first position, panel post 3859 may be aligned at a most forward position within the oblong holes of bushings 3858 in which the set of adapters 2250 are nearest to the panel post. Each of the stacked panels of patch panel assembly 3800 may be moved to a most forward position, i.e., may be moved a maximum distance, in which panel post 3859 is aligned at a most rearward position within the oblong holes of bushings 3858 in which the set of adapters 2250 are furthest from the panel post. In this manner, bushings 3858 limit the maximum travel of the stacked panels of patch panel assembly 3800 preventing tension that may otherwise be induced on supply side optical fibers inserted into adapters 2250. As shown in FIG. 37C, panel post 3859 may include lever 3857 hingedly attached to a main shaft portion of the panel post. With reference to FIGS. 37A and 37C, lever 3857 may be positioned on an end of panel post 3859 such that the lever retains cover 3854 against bushing 3858 of the stacked panel of patch panel assembly 3800 directly adjacent to the cover. In this manner, bushings 3858 of the other of the stacked panels may also be retained against adjacent stacked panels as further shown in the example of FIG. 37A, thereby limiting the space occupation of patch panel assembly 3800.

In the respective manners described with respect to each of the arrangements shown in FIGS. 33A-37C, clearance may be provided to the stacked panels on demand. Furthermore, the ability of springs 3458, 3558, 3658A, 3658B to be stretched in a direction transverse to their longitudinal axes, the elastic movement provided by resilient portion 3657, and the clearance provided panel post 3859 within the oblong holes of bushings 3858, all allow slack to be created in demand side optical cables 1630 inserted into adapters of any patch panel assembly into which they are utilized, which may be the same patch panel assembly with which they were described previously herein or another patch panel assembly into which they be configured. In this manner, adapters may be pivoted relative to their attached panel bases without demand side cables 1630 being in tension during such pivoting. Slack may be especially useful when the stiffness of demand side cables 1630 is small.

It is to be understood that in any of the patch panel assemblies described previously herein, such as but not limited to the arrangements of FIGS. 28-37C, the adapters of the stacked panels may be pivoted through a hinged connection to their respective panel bases such that the adapters may be isolated from adjacent adapters of the same stacked panel as described previously herein. Such isolation from adjacent adapters may be additional to the movement of the stacked panels relative to the other stacked panels as just described.

Figure 38:
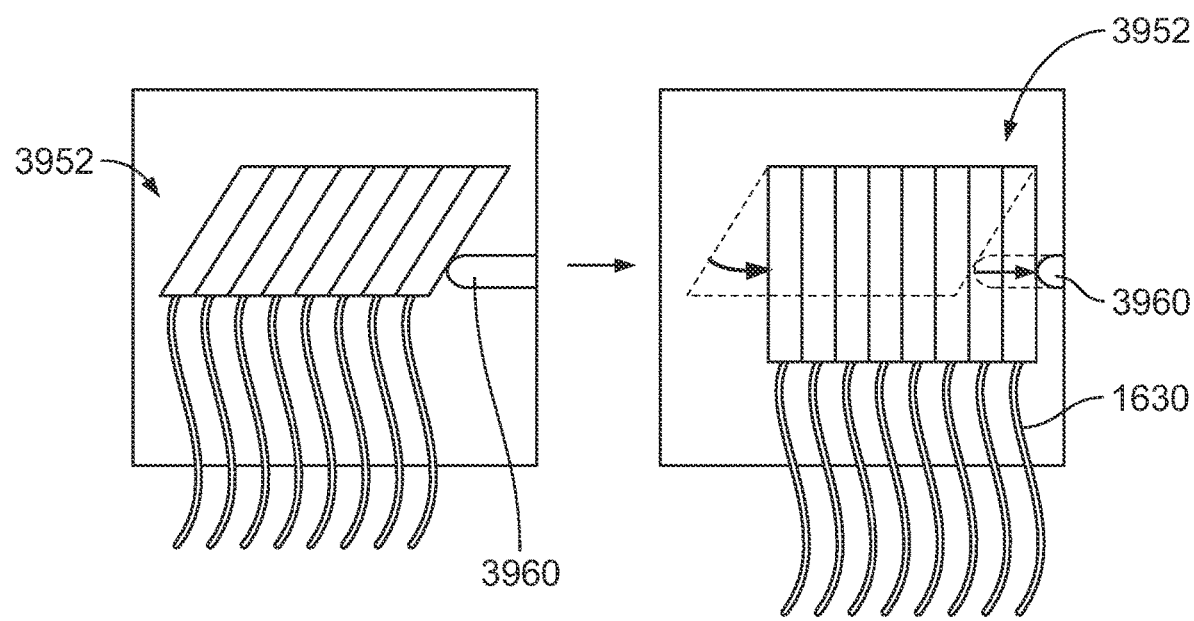
FIGS. 38-40B show portions of termination unit assemblies in accordance with further embodiments.
Figure 39:
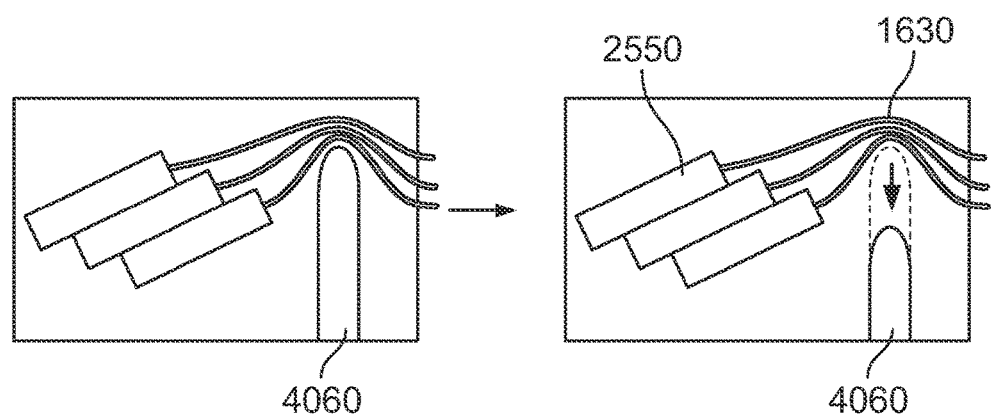

In some arrangements, slack may be created manually such as by a technician who may move a set of adapters or a stacked panel of a patch panel assembly in a direction towards an entry of demand side cables, e.g., cables 1630, into a termination unit assembly such as those described previously herein. In this manner, installation of the cables with the set of adapters set in the position towards the entry of the demand side cables will provide slack in the cables during installation or maintenance on the cables. However, other slack creation mechanisms also may be utilized alone or in conjunction with the slack creation mechanisms described previously herein. As illustrated in FIG. 38, actuator 3960 may be attached to a separate component, e.g., a housing base of a termination unit assembly, and in abutment with stacked panel 3952 of a patch panel assembly of a termination unit assembly. Actuator 3960 may retract to shift stacked panel 3952 within a plane defined by the stacked panel from a default position in which the demand side cables generally face away from the entry of the demand side cables into the termination unit assembly to a position in which the demand side cables generally face towards or more towards the entry of the demand side cables into the termination unit assembly. In such arrangements, retraction of actuator 3960 may be automatic such as upon the opening of a housing lid of the termination unit assembly. As illustrated in FIG. 39, actuator 4060 may be attached to a separate component, e.g., a housing base of a termination unit assembly, and in abutment with demand side cables, e.g., cables 1630, extending from an entry into a termination unit assembly to adapters, e.g., adapters 2550, within the termination unit assembly in a default position of the actuator. In this manner, installation of cables 1630 may necessitate that adapters 2250 do not face toward the entry of the cables into the termination unit assembly as a poke-a-yoke to avoid too much tension being placed on the cables. Actuator 4060 may be retracted away from demand side cables 1630 to a position in which the tension on the cables is released such that the adapters 2550 may be moved to generally face towards or more towards the entry of the demand side cables into the termination unit assembly. In such arrangements, retraction of actuator 4060 may be automatic such as upon the opening of a housing lid of the termination unit assembly.

Figure 40A:
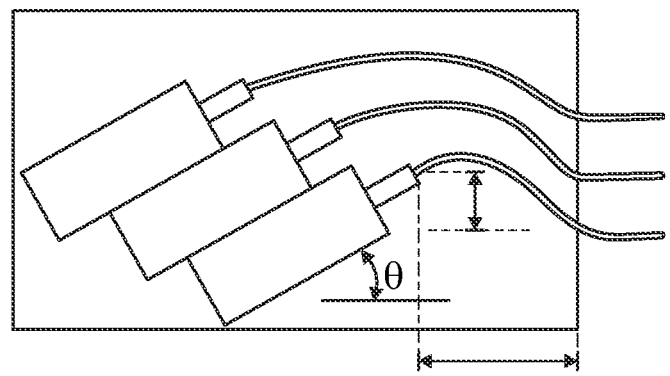
Figure 40B:
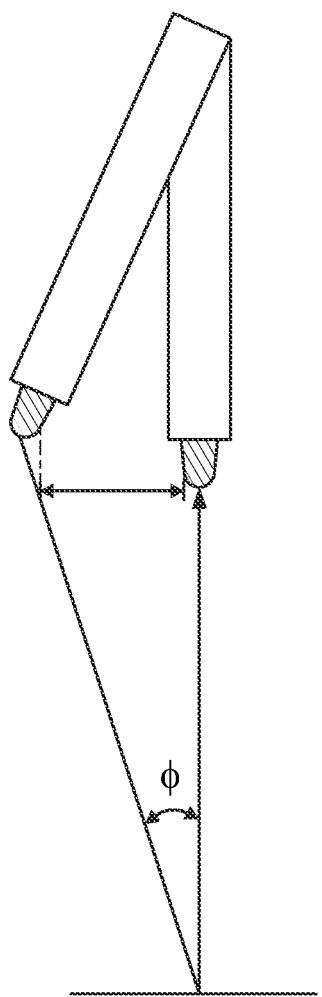

As shown in FIGS. 40A, 40B, in general, sufficient slack in demand side cables is provided by setting either one or both of (i) a sufficient vertical angle θ between a longitudinal axis defined by adapters 2550 of a patch panel assembly and a line parallel to a line of entry of the respective demand side cables into a termination unit assembly and (ii) a sufficient horizontal angle ϕ between the line of entry of the demand side cables into the termination unit assembly and a line from the entry point of the demand side cables to the positions of the adapters, or more precisely to the positions of ends of boots into which the cables are received when the boots are inserted into their respective adapters, when adapters are set at their respective default positions. Such angles generally should be greater for relatively less stiff cables.

Figure 41:
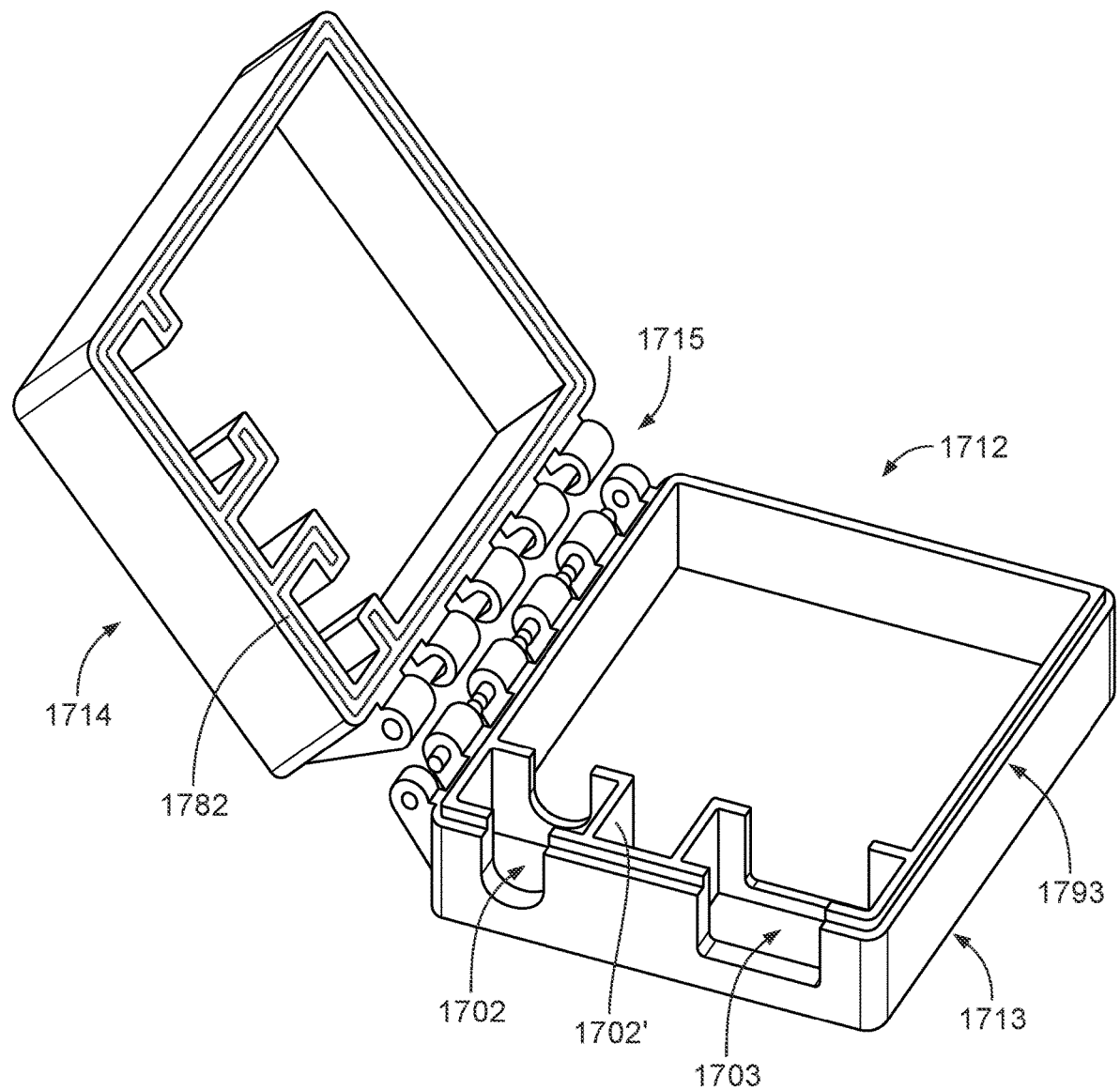
FIG. 41 is a perspective view of a housing for a termination unit assembly in accordance with another embodiment.

Referring now to FIG. 41, housing 1712 is the same as housing 1612 with the notable exceptions that housing 1712 includes second slot 1702 in place of second slot 1602, lid 1714 in place of lid 1614, hinge 1715 in place of hinge 1615, and outer rim 1793 of base 1713 in place of outer rim 1693 of base 1613. Second slot 1702 is wider than second slot 1602 and thus provides for a wider supply side insert and thus greater stability for retaining the plurality of supply side cables and surrounding sleeve when they are received through the wider supply side insert. Lid 1714 includes slots corresponding to second slot 1702 and first slot 1703 unlike lid 1614 in the example of housing 1612 and further includes seal 1782 within a groove along a rim of the lid. Hinge 1715 is a separable hinge such that lid 1714 may be removed from base 1713. An inner edge of outer rim 1793 and second slot wall 1702' of base 1713 have greater thicknesses than an outer edge of outer rim 1793 corresponding to portions of lid 1714 including seal 1782 in order to provide additional sealing characteristics, which may be a watertight seal, between the base and the lid upon closure of the lid onto the base. In some arrangements, such greater thicknesses of the inner edge of outer rim 1793 and second slot wall 1702' may extend into the groove along the rim of the lid in which in some such arrangements, the lid still may include seal 1782 and in which in other such arrangements, the lid may not include the seal along the rim of the lid while still providing a seal.

Figure 42:
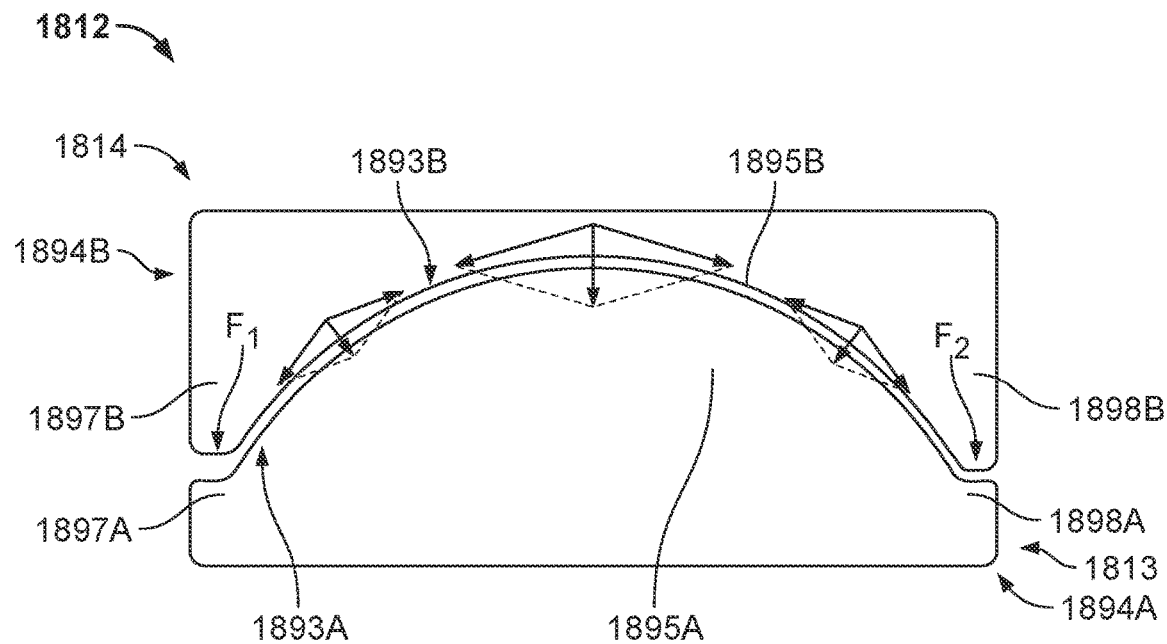
FIGS. 42 and 43 are elevation views of an enclosure in accordance with further embodiments.

Referring now to FIG. 42, further alternative configurations for attaching together bases and lids such as those described previously herein may be utilized. As shown, model enclosure 1812 (shown with clamp forces $F_1$ and $F_2$ and not any particular clamp mechanisms) includes base 1813, which may be in the form of a tray, and lid 1814. Each of base 1813 and lid 1814 may be in the form of a rigid plastic, such as but not limited to a fiberglass composite material. Enclosure 1812 may include side openings and cutouts through which optical cables may be passed such that the enclosure may be used as a housing for a termination unit assembly, for example in place of housings like those of housings 412, 512, 712, 812, 912, 1612, and 1712, such as in the example of housing 2312 of termination unit assembly 2300 shown in FIG. 28. In the example shown, base 1813 includes base rim surfaces 1893A on opposing base side walls 1894A of the base attached by opposing base end walls (not shown). Each of opposing base rim surfaces 1893A include convex portion 1895A defining an arc and end portions 1897A, 1898A extending from the convex portion.

As further shown in this example, lid 1814 includes lid rim surfaces 1893B on opposing lid side walls 1894B of the lid attached by opposing lid end walls (not shown). Each of opposing lid rim surfaces 1893B include concave portion 1895B defining an arc and end portions 1897B, 1898B extending from the concave portion. As in this example, the arcs defined by concave portions 1895B of lid rim surfaces 1893B preferably may have a shorter length than the arcs defined by convex portions 1895A of the opposing base rim surfaces 1893A. In this manner, when lid 1814 is placed on base 1813 in the manner shown in FIG. 23 with end portions 1897B, 1898B of lid rim surfaces 1893B in alignment with end portions 1897A, 1898A of base rim surfaces 1893A, respectively, and concave portions 1895B of lid rim surfaces 1893B are in a position substantially complementary to convex portions 1895A of base rim surfaces 1893A, a gap is defined between either one or both of (i) end portions 1897B of lid rim surfaces 1893B and end portions 1897A of base rim surfaces 1893B, as in the example of FIG. 42, and (ii) end portions 1898B of lid rim surfaces 1893B and end portions 1898A of base rim surfaces 1893B. Thus, when clamp forces $F_1$ and $F_2$ are applied to end portions 1897B, 1898B of lid 1814, the compressive forces acting at the end portions of lid rim surfaces 1893B bring the end portions of the lid rim surfaces closer to or more preferably tightly against respective end portions 1897A, 1898A of base rim surfaces 1893A and thereby create tensile forces tangential to the arcs of the lid rim surfaces and compressive forces radial to the arcs of the lid rim surfaces to create a seal, which may be a watertight seal, along the interface of the lid rim surfaces and the base rim surfaces.

In another arrangement, the arcs defined by concave portions 1895B of lid rim surfaces 1893B may have a greater radius than the arcs defined by convex portions 1895A of the opposing base rim surfaces 1893A while the arcs defined by concave portions 1895B of lid rim surfaces 1893B also have a shorter length than the arcs defined by convex portions 1895A of the opposing base rim surfaces 1893A. In a more preferable arrangement, the arcs defined by concave portions 1895B of lid rim surfaces 1893B may have a greater radius than the arcs defined by convex portions 1895A of the opposing base rim surfaces 1893A while the arcs defined by concave portions 1895B of lid rim surfaces 1893B have the same length as the arcs defined by convex portions 1895A of the opposing base rim surfaces 1893A.

In some alternative arrangements, base rim surfaces 1893A and lid rim surfaces 1893B may be replaced with base rim surfaces and lid rim surfaces that include corresponding lips. Rigid strips, which may be metal strips, may be applied along the lips of the base and the lid rim surfaces such that when the base and lid rim surfaces are compressed together, the base and lid rim surfaces are sandwiched between the rigid strips. In this manner, rigidity and durability may be added to the base and the lid rim surfaces.

Figure 43:
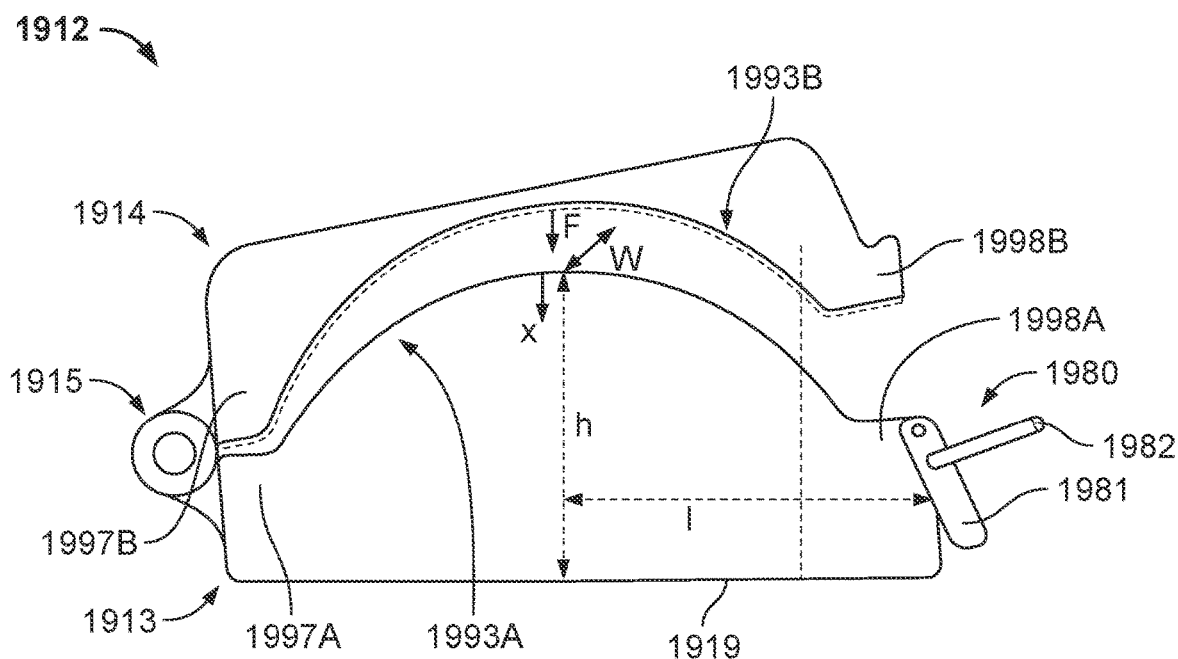
Figure 47:
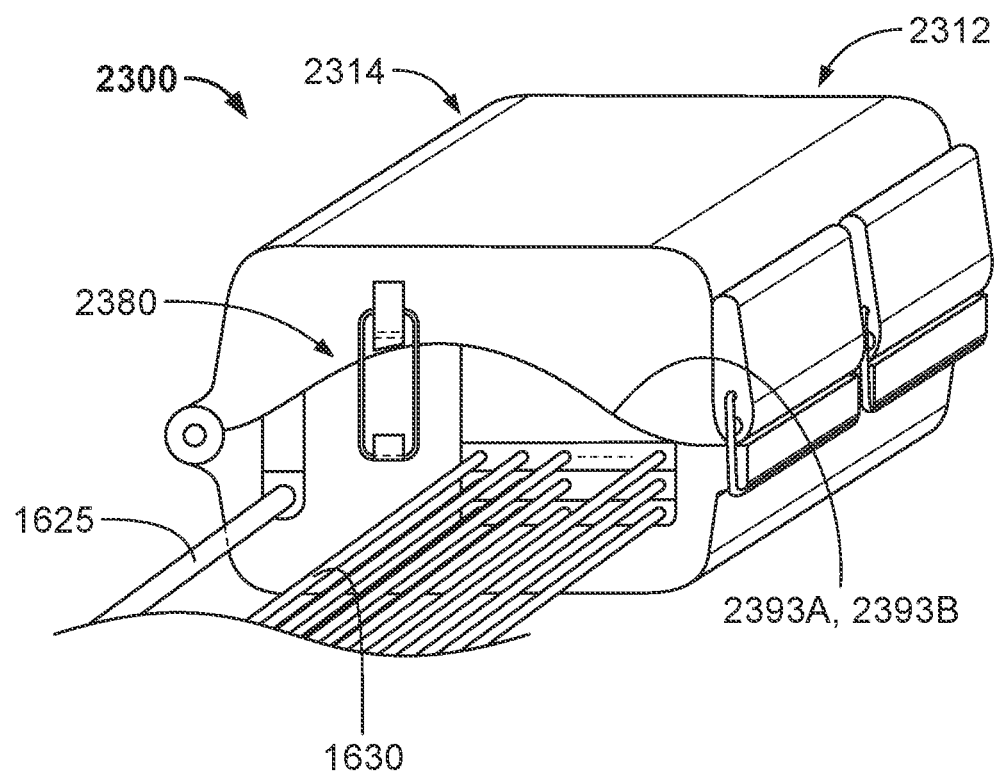
FIG. 47 is a perspective view of a termination unit assembly in accordance with a further embodiment.

As shown in FIG. 43, enclosure 1912 is substantially the same as model enclosure 1812 with the exception that enclosure 1912 includes hinge 1915 attached to both base 1913 and lid 1914 on one end of the enclosure such that the lid is rotatable relative to the base and latch 1980 or a plurality of such latches attached to the base only when the lid is in the open position, as shown. When lid 1914 is in the closed position, buckle 1981 attached to clasp 1982 of each latch 1980 is rotated over corresponding end portion 1998B of the lid such that end portions 1997B, 1998B of lid rim surfaces 1993B are brought tightly against respective end portions 1997A, 1998A of base rim surfaces 1993A, as in the example of FIG. 47. With references to the variables identified in FIG. 43, in this configuration, deflection x of base rim surfaces 1993A and lid rim surfaces 1993B at each corresponding location along the base and lid rim surfaces is approximately proportional to $F*wl^3/h^3$, where F is the compressive force applied along the lid rim surfaces due to the clamp force created by each latch 1980 in the latched position, w is the width across each of the lid rim surfaces, h is an average or effective thickness where the maximum forces are applied by the lid rim surfaces to the base rim surfaces, and l is the length from the latch to the lateral coordinate of where the maximum forces are applied by the lid rim surfaces to the base rim surfaces, i.e., the distance from the latch taken along a line parallel to bottom surface 1919 of lid 1914 to a line that may be drawn from each such location to the bottom surface. In the example shown, such maximum forces are applied by the lid rim surfaces at the middle of the arcs of the base rim surfaces.

Figure 44:
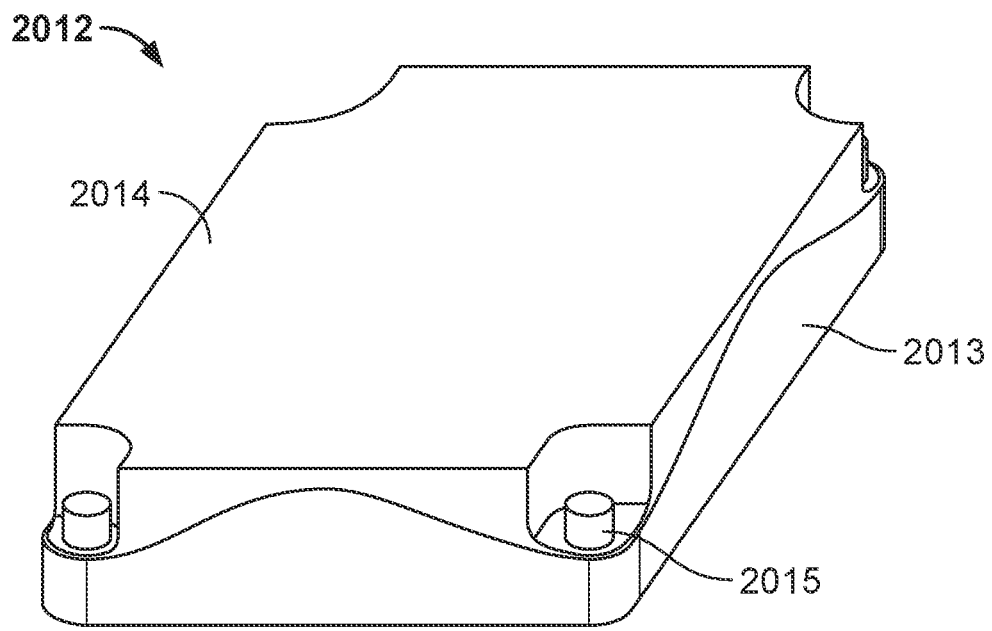
FIGS. 44-46 are perspective views of enclosures in accordance with further embodiments.
Figure 45:
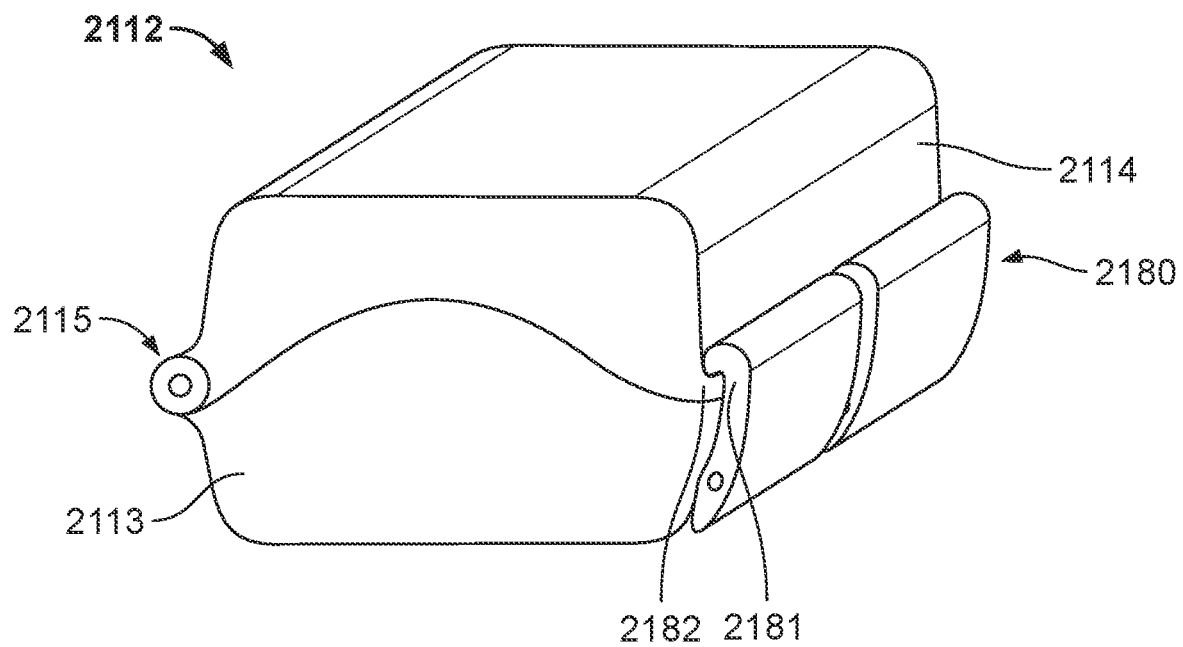

As shown in FIGS. 44 and 45, additional clamp mechanisms may be employed to clamp the lid to the base in place of hinges and latches. As shown in FIG. 44, lid 2014 of enclosure 2012, which is substantially similar to enclosures 1812, 1912, may be fastened to base 2013 by fasteners 2015 at each of the corners of the lid and the base. As shown in FIG. 45, lid 2114 of enclosure 2112, which is substantially similar to enclosures 1812, 1912, 2012, may be attached on one end to base 2113 by hinge 2115. Lid 2114 may be clamped to base 2113 on an end opposite hinge 2115 when hooks 2181 of latches 2180 rotatably attached to the base are received in recesses of flanges 2182.

Figure 46:
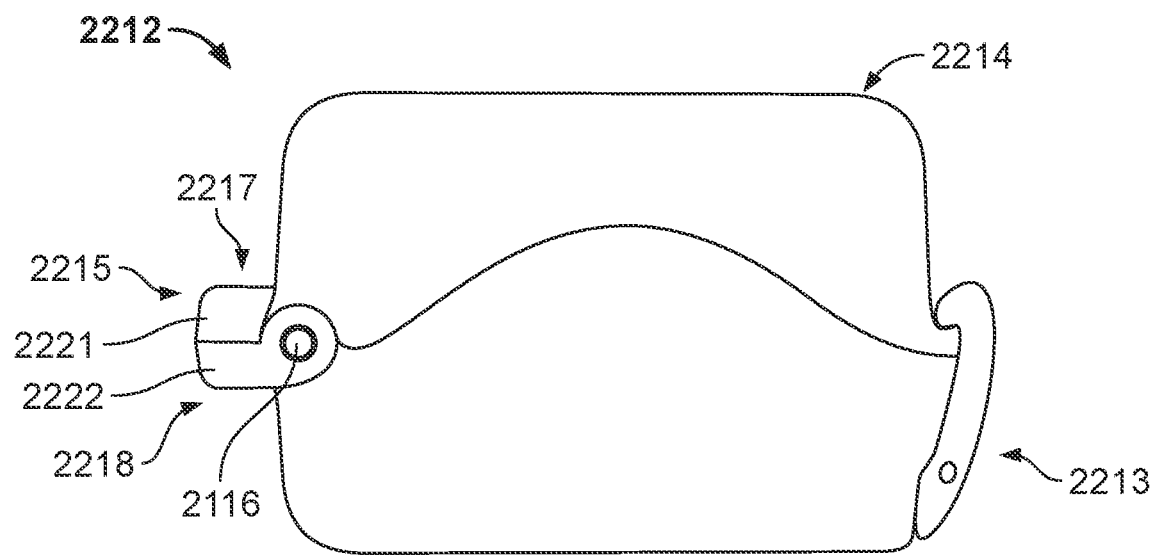

Referring now to FIG. 46, enclosure 2212 is substantially the same as enclosure 2112 with the exception that enclosure 2212 includes hinge 2215 in place of hinge 2115. Hinge 2215 is substantially the same as hinge 2115 to the extent that hinge rod 2116 is inserted through base and lid flanges to rotatably attach the base to the lid, in this instance base flange 2217 of base 2213 and lid flange 2218 of lid 2214, or alternatively is substantially the same as hinge 1715. In contrast to hinge 2115 or hinge 1715, base flange 2217 includes tab 2221 and lid flange 2218 includes corresponding tab 2222. In this manner, upon closure and clamping of lid 2214 to base 2213, tab 2222 of lid flange 2218 compresses against tab 2221 of base flange 2217 such that the tabs push away from each other. As such, the interface of tabs 2221, 2222 prevents the repeated contact compression between hinge rod 2116 and both of base flange 2217 and lid flange 2218 that would otherwise occur each time lid 2214 is clamped to base 2213 due to clearance needed between the hinge rod and the flanges that reduces friction between the hinge rod and the flanges during rotation of the lid.

In another example, as shown by termination unit assembly 2300, housing 2312 may be substantially similar to enclosure 1912 with the exception that housing 2312 includes side openings and cutouts for supply side optical cables 1620 (received in sleeve 1625 acting as the supply side optical cables outer jacket in the example shown) and demand side optical cables 1630 as well as an additional latch 2380 attached to lid 2314 that extends across base rim surface 2393A and lid rim surface 2393B, and in particular across the convex and concave portions of these surfaces, on the side of the optical cables when latched to further compress the base rim surface to the lid rim surface. Another latch 2380 may be applied on the side of housing 2312 opposite optical cables 1620, 1630 in some arrangements. Latches such as latches 1980 and latch or latches 2380 may be employed on any of the housings and enclosures described herein to maintain closure of the respective lids and bases, and in some arrangements, to provide compression, such as for any one or any combination of sealing and clamping, of the lids against their respective bases.

Figure 48:
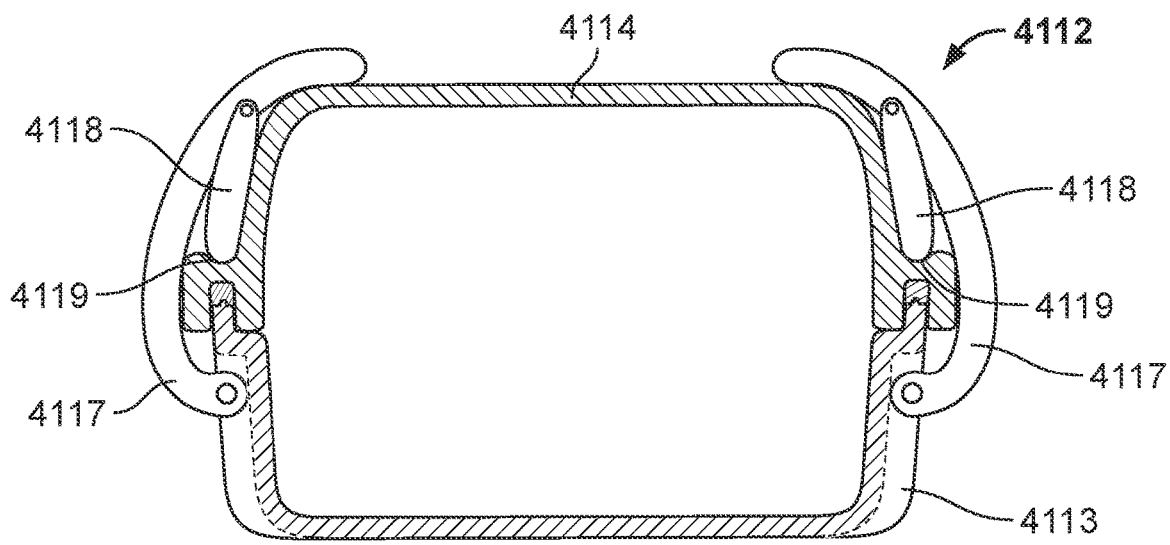
FIGS. 48 and 49 are a cross-sectional views of enclosures in accordance with further embodiments.

Referring now to FIG. 48, in yet another example, housing 4112 for use with any of the termination unit assemblies described previously herein includes housing base 4113 and housing lid 4114 having lid outer rim overlapping base outer rim in the same manner as with housing lid 2414 and housing base 2413 of termination unit assembly 2400. As shown, opposing base latches 4117 are hingedly attached to opposite sides of housing base 4113. Secondary latches 4118 are attached along a length of each of opposing base latches 4117. Opposing base latches 4117 may be rotated towards housing lid 4114 until secondary latches 4118 may be inserted into groove or grooves 4119 of housing lid 4114. When secondary latches 4118 are received in the groove or grooves 4119 of housing lid 4114, continued rotation of opposing base latches 4117 causes the secondary latches to compress the groove or grooves of the housing lid and lock the housing lid to housing base 4113. Once secondary latches 4118 rotate past a vertical direction such that the secondary latches are set an angle towards a center of housing lid 4114, the secondary latches exert forces against their respective base latches 4117 to maintain the base latches in a closed position, in the example shown, a position in which the base latches are against the housing lid.

Figure 49:
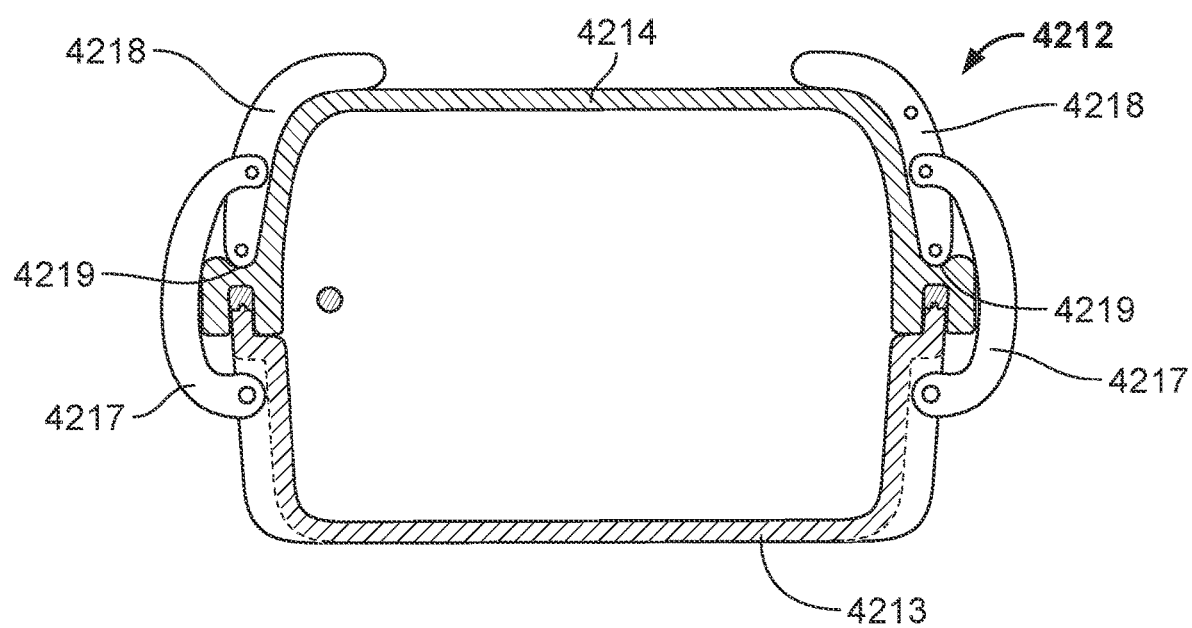

As shown in FIG. 49, housing 4212 is the same or substantially the same as housing 4112 with the exception that housing 4212 includes opposing base latches 4217 in place of opposing base latches 4117 and secondary latches 4218 in place of secondary latches 4118. Base latches 4217 are shorter than base latches 4117 such that base latches 4117 do not extend to the top of housing lid 4214 of housing 4212. Secondary latches 4218 are longer than secondary latches 4118 and are curved such that secondary latches 4218 do extend to the top of housing lid 4214 when base latches 4217 are rotated towards the housing lid. In the same manner as with housing 4112, when base latches 4217 are rotated about housing base 4213 towards housing lid 4214 and secondary latches 4218 are received in groove or grooves 4219, which are configured in substantially the same form as groove or grooves 4119 of housing lid 4114, continued rotation of opposing base latches 4217 causes the secondary latches to compress the groove or grooves of the housing lid and secure the housing lid to housing base 4213.

Figure 50:
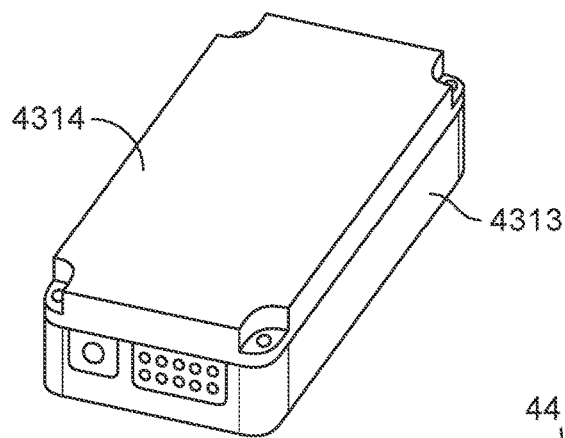
FIGS. 50-52 are perspective views of enclosures in accordance with further embodiments.

As shown in FIGS. 50-52, additional configurations of housings may be utilized with any of the termination unit assemblies described previously herein. In the example of FIG. 50, housing lid 4314 is attached via fasteners to each corner of housing base 4313. In the examples of FIGS. 51 and 52, housing lids 4414, 4514 are attached via dual hinges on one side and one end, respectively, to housing bases 4413, 4513, and the housing lids are secured to the housing bases via fasteners through each of the corners of the housing lids and the housing bases.

In each of the arrangements describing hinges, latches, and other attachment mechanisms for attaching bases and lids of housing and enclosures, it is to be understood that with respect to embodiments in which such attachment mechanisms have been described as being attached to only the lid or only the base when the lid is in the open position, in further arrangements, such attachment mechanisms may be attached to only the other of the lid and the base when the lid is in the open position.

Referring now to FIGS. 53A-53D, supply side cables 4620A, 4620B, 4620C, and similarly supply side cable 2620 described previously herein, each generally include outer cover 4621, clamp member 4622, cap 4638, inner adapter 4624, cable stopper 4626, and inner cable 4625 that includes a plurality of inner subcables 4630. Supply side cable 4620A shown in FIG. 53A includes a two-piece adapter holder 4627A, 4628A in which adapter holder part 4628A includes flange 4631A corresponding to and receivable into inset 4632A of adapter holder 4627A. Supply side cable 4620B shown in FIG. 53B includes a two-piece adapter holder 4627B, 4628B in which both pieces of the adapter holder are attached by fasteners such as rivets 4631B to inner adapter 4624 such that both pieces of the adapter holder form a parting line that extends in a same direction that ports 4635 of the inner adapter are aligned. Supply side cable 4620C shown in FIG. 53C includes a two-piece adapter holder 4627C, 4628C in which both pieces of the adapter holder are attached by fasteners such as rivets 4631C to inner adapter 4624 such that both pieces of the adapter holder form a parting line that extends in a direction perpendicular to a direction that ports 4635 of the inner adapter are aligned.

A portion of inner cable 4625 is inserted into cable stopper 4626 such as by way of an interference fit to prevent or at least inhibit relative movement between the cable stopper and the inner cable. A thickest portion of cable stopper 4626 is inserted into recess 4633 of outer cover 4621 to prevent both lateral and longitudinal movement of inner cable 4625 relative to the outer cover. An adhesive 4639 such as a glue or a sealing material may be applied around cable stopper 4626 when received in recess 4633 to aid in maintaining the cable stopper within the recess. Preferably the adhesive or sealing material is applied such as by injection prior to the insertion of cable stopper 4626. Connectors of the plurality of subcables 4630 which extend out of a sheath of inner cable 4625 (see FIG. 54) are inserted into inner ports (not shown) of inner adapter 4624 that are substantially in the same form as ports 4635. In this manner, optical fibers within subcables 4630 may be held in a substantially linear orientation aligned with the inner ports of inner adapter 4624. In the examples of FIGS. 53A-53D, ports 4635 are configured to receive connectors of cables such as extension cables 2625. In the example shown, flange 4640 of inner adapter 4624 is received in a groove of any one of the adapter holders defined by corresponding adapter holder parts 4627A-C, 4628A-C. The adapter holders are received within a bore of clamp member 4622 such that the adapter holders circumferentially contact the bore. In some alternative arrangements, the adapters and the adapter holders may be monolithic, i.e., one-piece, structures such that they are inseparable without fracture of either one or both components. As shown, clamp member 4622 is threaded onto outer cover 4621 such that the clamp member may be placed against abutment 4636 of the outer cover. Alternatively, abutment 4636 may be placed against an outer side of a wall, such as a wall of a housing of a termination unit assembly, and clamp member 4622 may be threaded onto outer cover 4621 until the clamp member is placed against an inner side of the same wall. Seal 4637A, which may be an o-ring seal, may be placed around outer cover 4621 along abutment 4636 for additional sealing between the wall and the over cover. Until supply side cables 4620A, 4620B, 4620C are ready for use, cap 4638 may be threaded onto clamp member 4622 to cover and protect ports 4635 of adapter 4624. Seal 4637B, which may be an o-ring seal, may be placed around clamp member 4622 at an interface between the clamp member and cap 4638 for additional sealing between the clamp member and the cap.

Figure 55A:
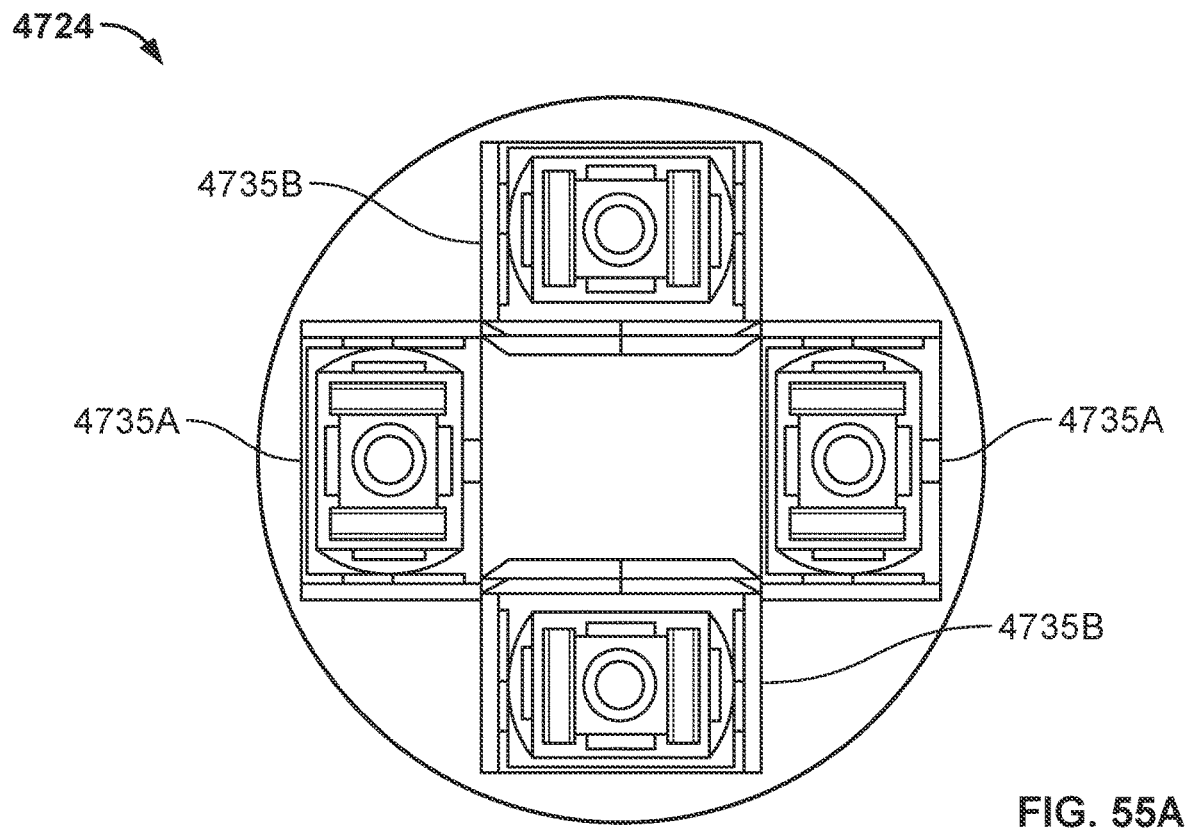
FIGS. 55A and 55B are elevation views of optical adapters in accordance with further embodiments.
Figure 55B:
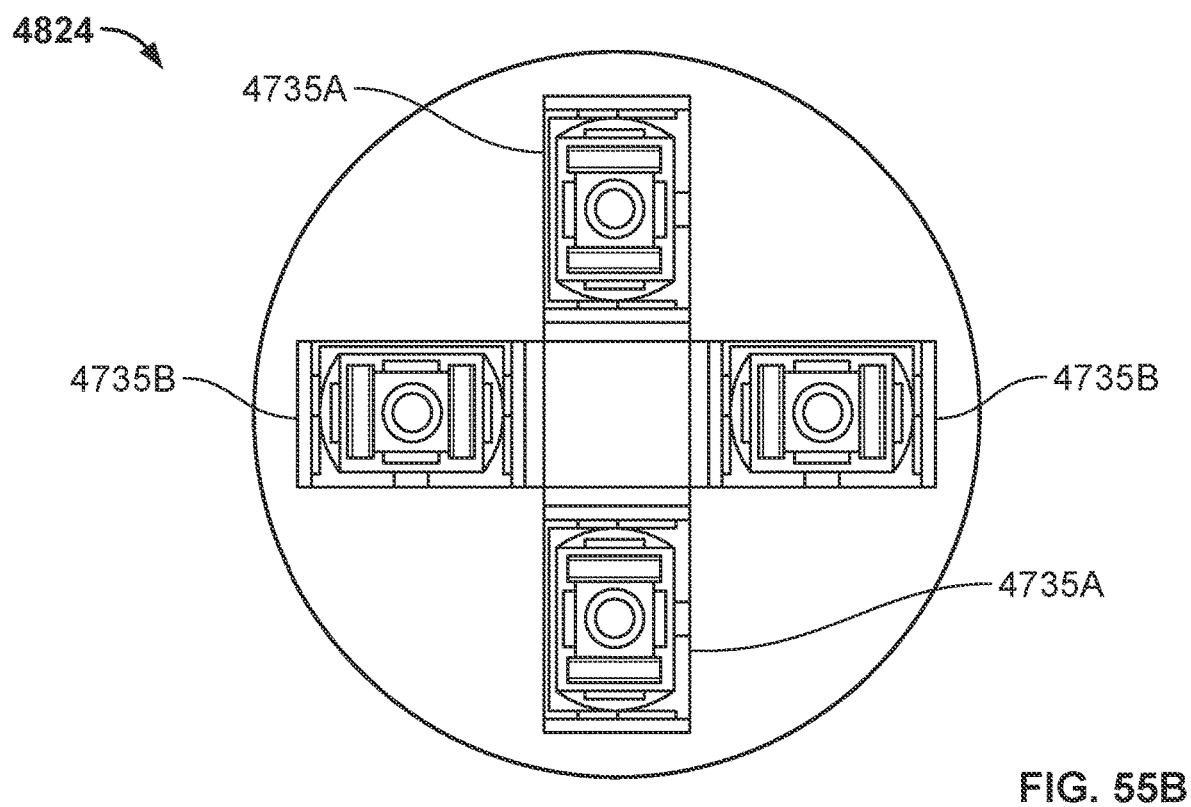

As shown in FIGS. 55A and 55B, instead of being positioned directly next to each other and all oriented in the same direction as with ports 4635 of inner adapter 4624, inner adapters may have ports that only intersect or most nearly intersect at their corners. In the examples of FIGS. 55A, 55B, adapters 4724, 4824 each include two ports 4735A, 4835A aligned longitudinally and two ports 4735B, 4835B aligned laterally. In this manner, only two of the plurality of subcables 4630 must be partially twisted for insertion into ports of adapters 4724, 4824. It is to be understood that each of the port configurations shown in FIGS. 55A and 55B may provide more space for a user assembling a supply side cable utilizing such ports to insert subcables 4630 relative to the port configuration of inner adapter 4624.

Figure 56:
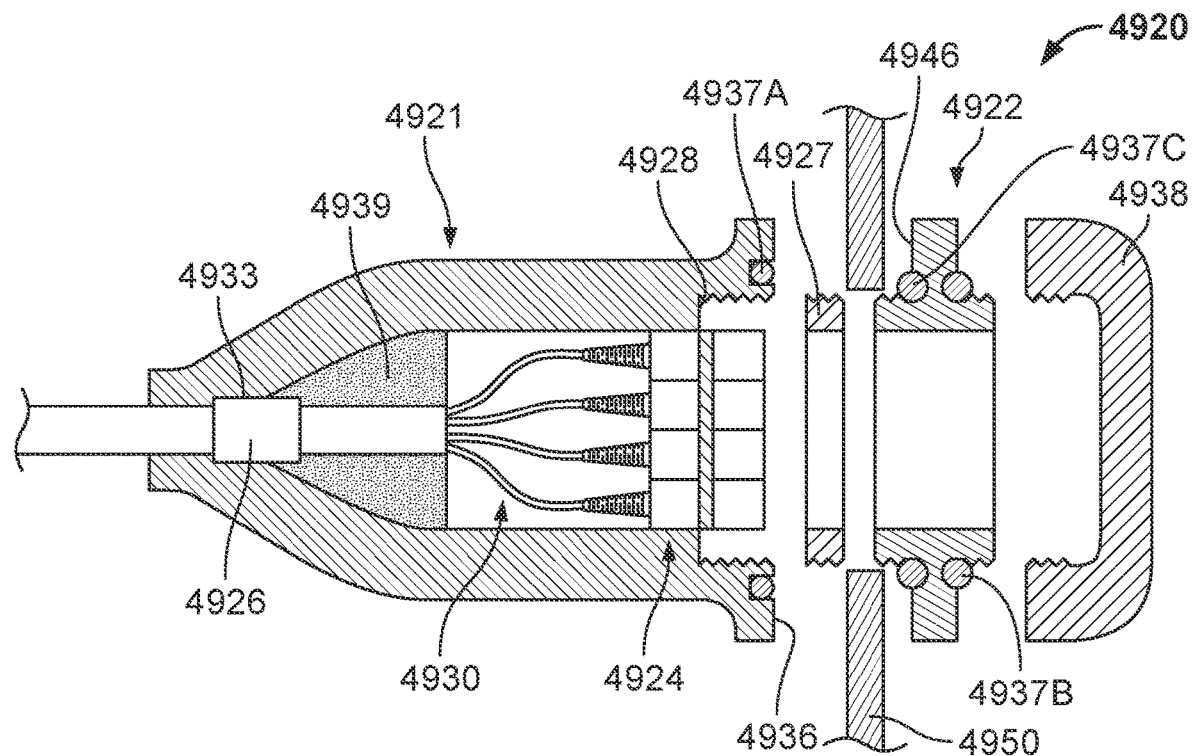
FIG. 56 is an exploded cross-sectional view of a portion of a supply side cable in accordance with another embodiment.
Figure 57:
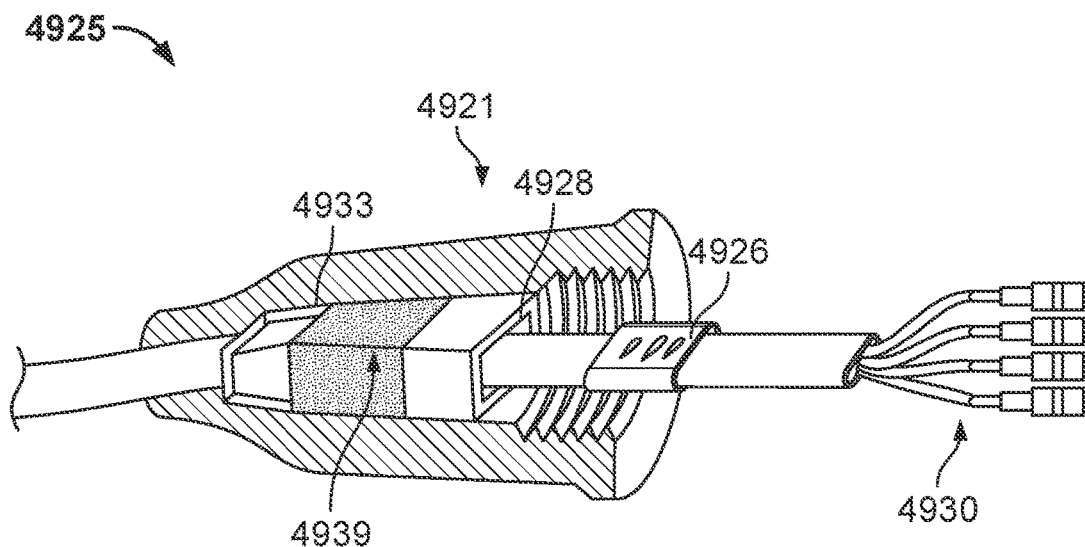
FIG. 57 is a partially exploded view of a portion of the supply side cable of FIG. 56.

Referring now to FIG. 56, supply side cable 4920 generally includes outer cover 4921, clamp member 4922, cap 4938, inner adapter 4924, cable stopper 4926, inner cable 4925 that includes a plurality of inner subcables 4930, and optionally may include auxiliary adapter stopper 4927. Cable stopper 4926 is attached to a portion of inner cable 4925 such as by crimping the cable stopper to the inner cable as best shown in FIG. 57, to prevent relative movement between the cable stopper and the inner cable. Cable stopper 4926 is inserted, and in some arrangements pressed by way of an interference fit, into recess 4933 of outer cover 4921 to prevent both lateral and longitudinal movement of inner cable 4925 relative to the outer cover. Adhesive 4939 such as a glue or a sealing material may be applied around cable stopper 4926 when received in recess 4933 to aid in maintaining the cable stopper within the recess. Preferably the adhesive or sealing material is applied such as by injection prior to the insertion of cable stopper 4926. Connectors of the plurality of subcables 4930 which extend out of a sheath of inner cable 4925 (see FIG. 57) are inserted into inner ports (not shown) of inner adapter 4924 that are substantially in the same form as ports 4635. As or just after cable stopper 4926 is received in recess 4933, inner adapter 4924 connected to the plurality of subcables 4930 is received by way of an interference fit into inner opening 4928 defined by a bore of outer cover 4921 through which the plurality of subcables 4930 extend upon insertion to prevent or at least inhibit relative movement between the inner adapter and the outer cover. As shown in this example, inner opening 4928 may have a smaller diameter than the rest of the bore of outer cover 4921 such that the inner opening acts as an adapter stopper. In this manner, optical fibers within subcables 4930 may be held in a substantially linear orientation aligned with the inner ports of inner adapter 4924. Optional auxiliary adapter stopper 4927 may be threaded into outer cover 4921 and around inner adapter 4924 received in inner opening 4928 such as by interference fit to provide an additional retention force to the inner adapter to further prevent or at least inhibit relative movement between the inner adapter and the outer cover.

As shown, clamp member 4922 is threaded into outer cover 4921 such that side face 4946 of the clamp member is placed against abutment 4936 of the outer cover, or as shown, such that the abutment of the outer cover and the side face of the clamp member are placed against opposite sides of wall 4950, which may be a wall of a housing of a termination unit assembly. Seal 4937A, which may be an o-ring seal, may be placed around outer cover 4921 along abutment 4936 for additional sealing between wall 4950 and the outer cover. Until supply side cables 4620A, 4620B, 4620C are ready for use, cap 4938 may be threaded onto clamp member 4922 to cover and protect ports of adapter 4924. Seal 4937B, which may be an o-ring seal, may be placed around clamp member 4922 at an interface between the clamp member and cap 4938 for additional sealing between the clamp member and the cap. Seal 4937C, which may be an o-ring seal, may be placed around clamp member 4922 alongside face 4946 for additional sealing between wall 4950 and the clamp member.

Figure 58:
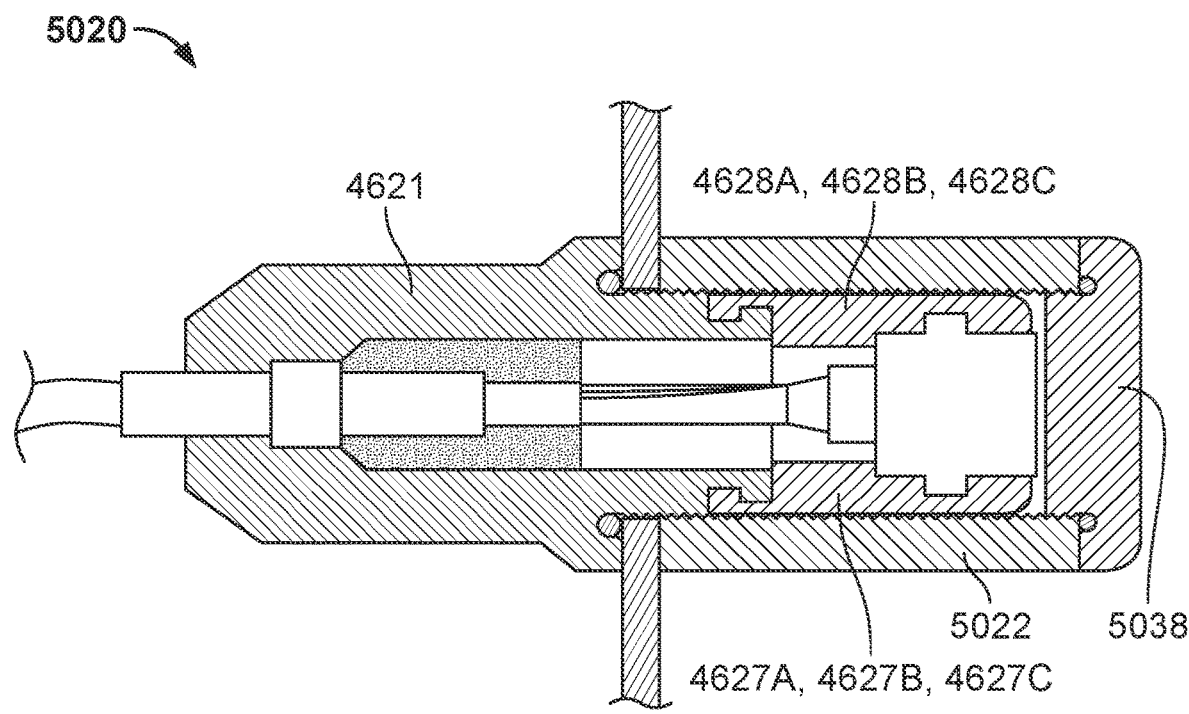
FIGS. 58 and 59 are cross-sectional views of portions of supply side cables in accordance with further embodiments.

Referring now to FIG. 58, supply side cable 5020 is the same or substantially the same as supply side cables 4620A, 4620B, 4620C with the notable exceptions that supply side cable 5020 includes clamp member 5022 in place of clamp member 4622 and cap 5038 in place of cap 4638. Clamp member 5022 is threaded along an entirety of its inner diameter such that the clamp member may be threaded onto outer cover 4621, the combination of adapter holder parts 4627A-C, 4628A-C may be received within clamp member 5022 such that the adapter formed by the combination of the adapter holder parts circumferentially contact the threaded diameter of the clamp member, and cap 5038 may be threaded into clamp member 5022. In some alternative arrangements, a portion of the inner diameter of clamp member 5022 may have a smooth surface instead of a threaded surface such that the adapter formed by the combination of corresponding adapter holder parts 4627A-C, 4628A-C may circumferentially contact such smooth surface of the clamp member rather than threaded surface.

Figure 59:
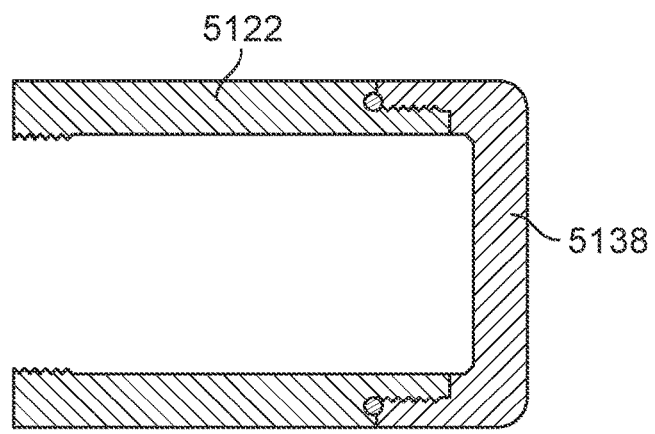

As shown in FIG. 59, in a further alternative embodiment of supply side cable 5020, clamp member 5022 may be replaced by clamp member 5122 and cap 5038 may be replaced by cap 5138. Unlike the combination of clamp member 5022 and cap 5038, in this example, cap 5138 has internal threads that mate with external threads on an end of clamp member 5122. Additionally, clamp member 5122 has a smooth surface along a length of an inner bore of the clamp member that is configured to contact an adapter holder such as that formed by the combination of corresponding adapter holder parts 4627A-C, 4628A-C.

Figure 60:
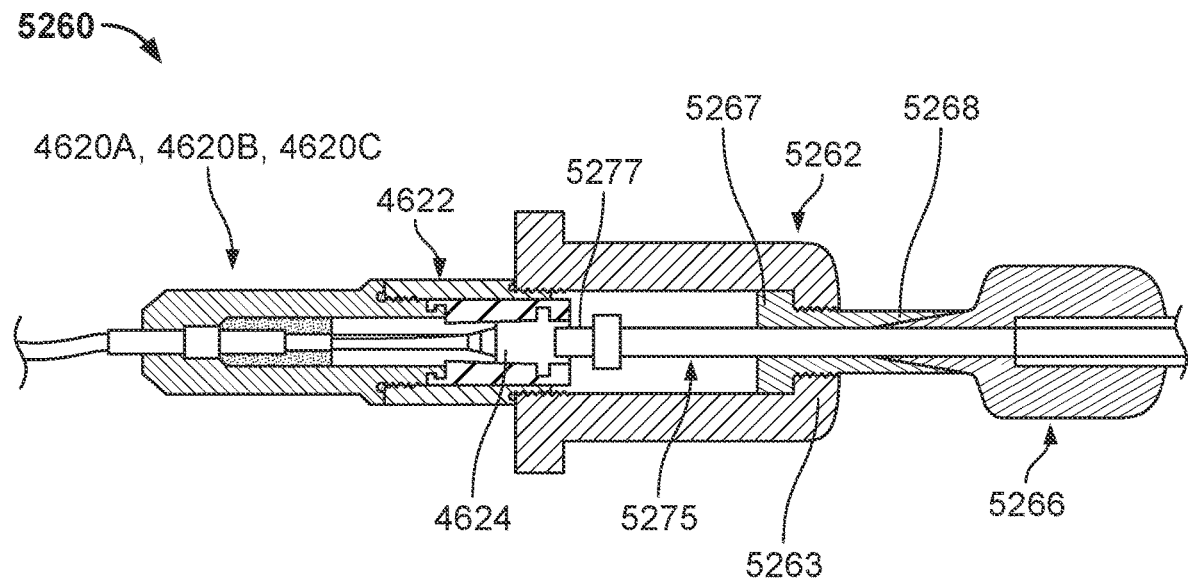
FIGS. 60 and 61 are cross-sectional views of supply side cables attached to connectors in accordance with further embodiments.

Referring now to FIG. 60, when supply side cables 4620A, 4620B, 4620C are ready for use, multi-fiber push on (MPO) cable 5260 may be attached, in example threaded, onto any one of the supply side cables after removal of cap 4638 from the supply side cables. As shown, MPO cable 5260 generally includes main cover 5262, coupling 5266, and inner cable 5275 extending through the coupling and the main cover. Inner cable 5275 includes a plurality of inner subcables 5277 for insertion into corresponding ports of inner adapter 4624 of supply side cable 4620A, 4620B, 4620C. Main cover 5262 includes internal threads for engagement with the external threads of clamp member 4622. Coupling 5266 includes coupling flange 5267 for receipt into a bore defined by main cover 5262. Main cover 5262 is threaded onto coupling 5267 until coupling flange 5267 abuts corresponding cover flange 5263 of the main cover. The threads of main cover 5262 engaging the threads of clamp member 4622 should have an opposite lead to the threads of the main cover engaging the threads of coupling flanges 5267 to avoid twisting of inner cable 5275 and prevent unthreading of the other thread of the main cover. For example, the threads engaging clamp member 4622 may have a right-hand lead while the threads engaging coupling flange 5267 may have a left-hand lead. Coupling 5266 includes tapered central bore 5268 such that as main cover 5262 is threaded onto coupling 5267, inner cable 5275 is compressed generally into alignment with inner adapter 4624 of the supply side cable 4620A, 4620B, 4620C. In addition to aligning inner cable 5275, this compression also operates to prevent twisting of the inner cable and to provide sealing off of the bore defined by main cover 5262.

Figure 61:
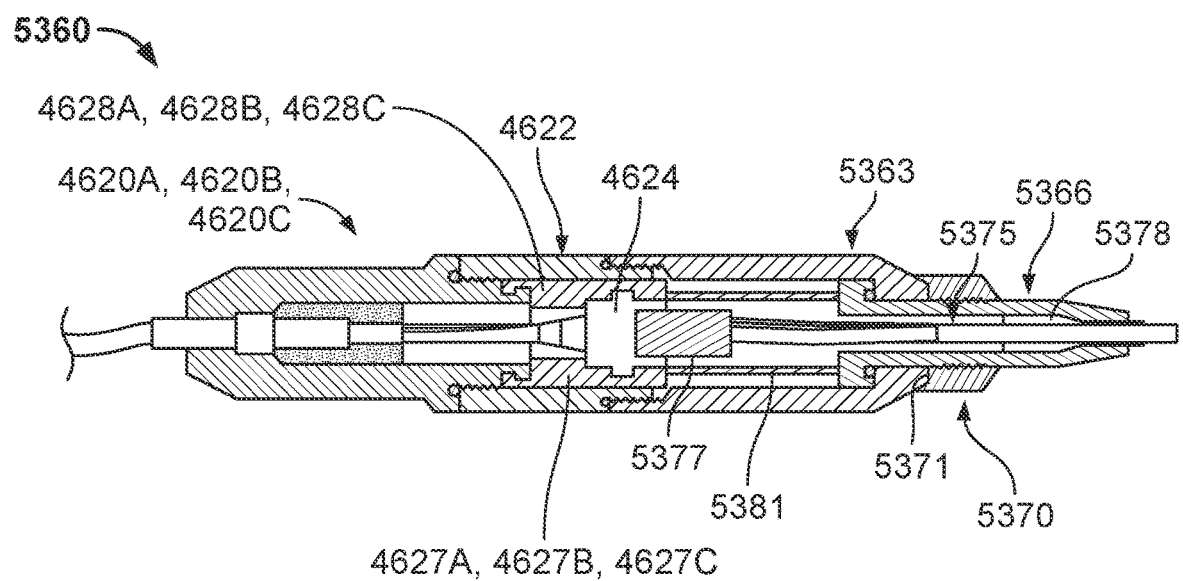

In an alternative arrangement as shown in FIG. 61, MPO cable 5360 generally includes main cover 5363, coupling 5366, compression nut 5370, inner cable 5375, and optionally alignment member 5381. Inner cable 5375 includes a plurality of inner subcables 5377 for insertion into corresponding ports of inner adapter 4624 of the supply side cable 4620A, 4620B, 4620C. The engagement of main cover 5363 with clamp member 4622 is the same or substantially the same as the engagement of main cover 5263 of MPO cable 5260 with the clamp member. The engagement of main cover 5363 with coupling 5366 and the engagement of the coupling with inner cable 5375 are substantially the same as such engagements within MPO cable 5260 with the exception that coupling 5366 and main cover 5363 do not include threads for engagement with each other. Instead, taper 5371 of compression nut 5370 is placed against a corresponding taper of main cover 5363 and the compression nut is threaded onto external threads of coupling 5366 such that the main cover is compressed, thereby compressing the coupling against inner cable 5375. As shown, inner cable 5375 includes a boot 5378 from which inner subcables 5377 extend in which the boot is configured to seal against an interior bore of coupling 5366 along corresponding tapers of the boot and the coupling. As further shown, optional alignment member 5381 is a tube extending between a flat face of coupling 5366 and an adapter holder formed by a combination of adapter holder parts 4627A-C, 4628A-C to aid in alignment of inner cable 5375 relative to adapter 4624 of supply side cable 4620A, 4620B, 4620C. In some alternative arrangements, clamp member 4622 of supply side cable 4620A, 4620B, 4620C and main cover 5363 may be integral such that they are inseparable without fracture of either one or both of these components.

Figure 62A:
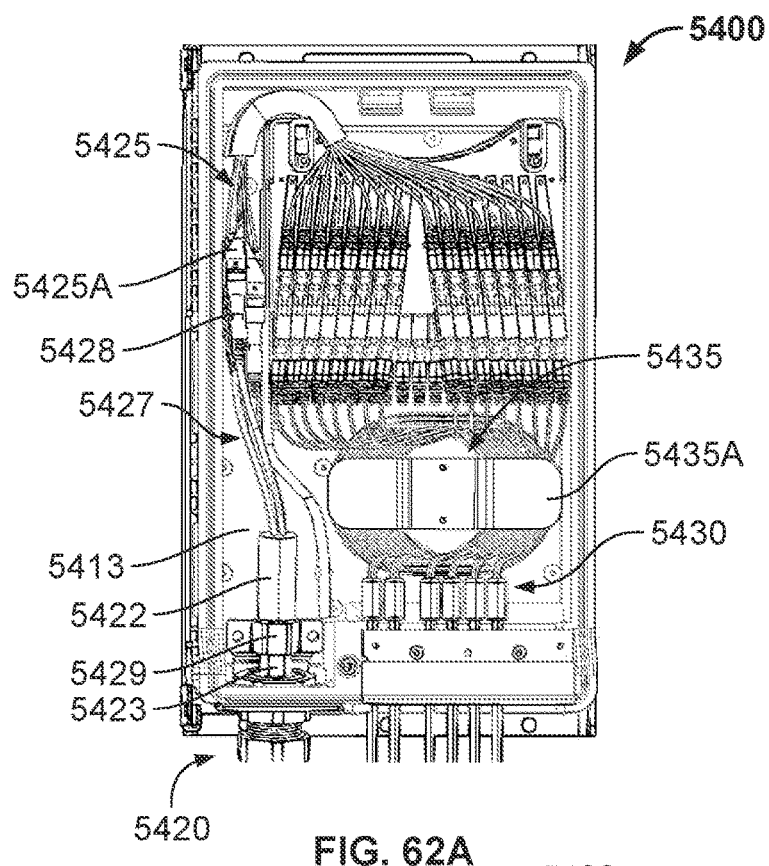
FIG. 62A is a plan view of a portion of a termination unit assembly in accordance with a further embodiment.
Figure 62B:
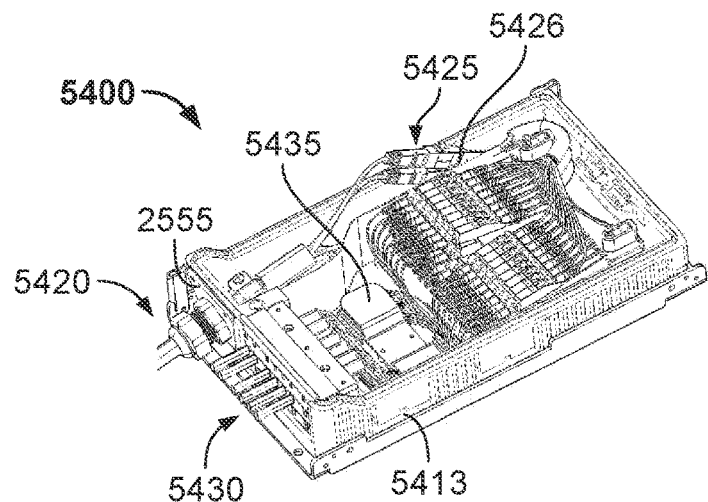
FIG. 62B is a perspective view of a portion of the termination unit assembly of FIG. 62A.

Referring now to FIGS. 62A and 62B, termination unit assembly 5400 is substantially the same as termination unit assembly 2500 with the notable exceptions that supply side cable 2520 is replaced by a combination of supply side cable 5420 that may be inserted through supply side insert 2555 and a plurality of multi-fiber extension cables 5425, demand side optical cables 1630 are replaced by demand side optical cables 5430, and the attachment of housing base 5413 and housing lid 5414 described further below is different from that of housing base 2413 and housing lid 2414. Each of the multi-fiber extension cables 5425 includes connector-adapters 5425A, which as shown are in the form of MPO connector-adapters, mounted on respective swivel arms 5426 and supply side optical fibers 5424 as best shown in FIG. 62B.

In the example shown, supply side cable 5420 includes a plurality of multi-fiber supply side inner cables 5427 extending from inner cover 5422 on the end of extender cable 5423 and having supply side connectors 5428 on ends of the supply side inner cables for interconnection with respective connector-adapters 5425A. As best shown in FIG. 62B, swivel arms 5426 rotate to point connector-adapters 5425A away from housing base 5413 to enable easy access to connector-adapters 5425A for connection with and disconnection from supply side connectors 5428. When the respective supply side connectors 5428 of supply side cable 5420 and the connector-adapters 5425A of extension cables 5425 are connected, respective optical fibers within supply side inner cables 5427 and optical fibers within extension cables 5425 may be in alignment for conveyance of optical signals between opposing optical fibers and thus optical communication between the optical fibers within supply side inner cables and demand side optical cables 5430.

Figure 63:
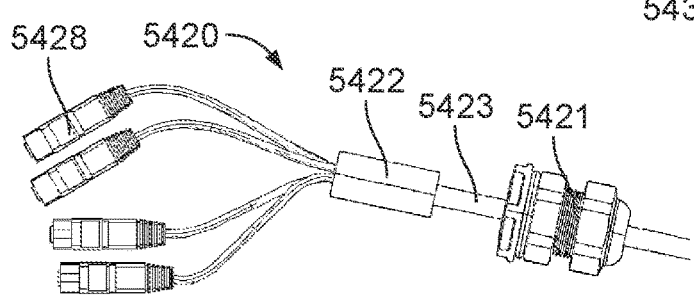
FIG. 63 is a perspective view of a supply side cable of the termination unit assembly of FIG. 62A.

As shown in FIG. 63, supply side cable 5420 further includes outer cover 5421 that may be threaded and include nuts about the threads of the outer cover for appropriate sealing and attachment onto supply side insert 2555. Cable bracket 5429 is placed over extender cable 5423 and fastened to housing base 5413 to aid in maintaining a relative position between supply side cable 5420 and supply side insert 2555 and to prevent bending of the supply side cable.

As further shown in FIGS. 62A and 62B, unlike demand side optical cables 1630, a plurality of jacketed optical fibers extend from a main outer cover of each of demand side optical cables 5430 allowing for greater flexibility of the optical fibers within housing base 5413 than the optical fibers within demand side optical cables 1630. To organize the optical fibers extending from demand side optical cables 5430, the optical fibers are wrapped around fiber bracket 5435 and covered by flanges 5435A of the fiber bracket, as shown.

Figure 64:
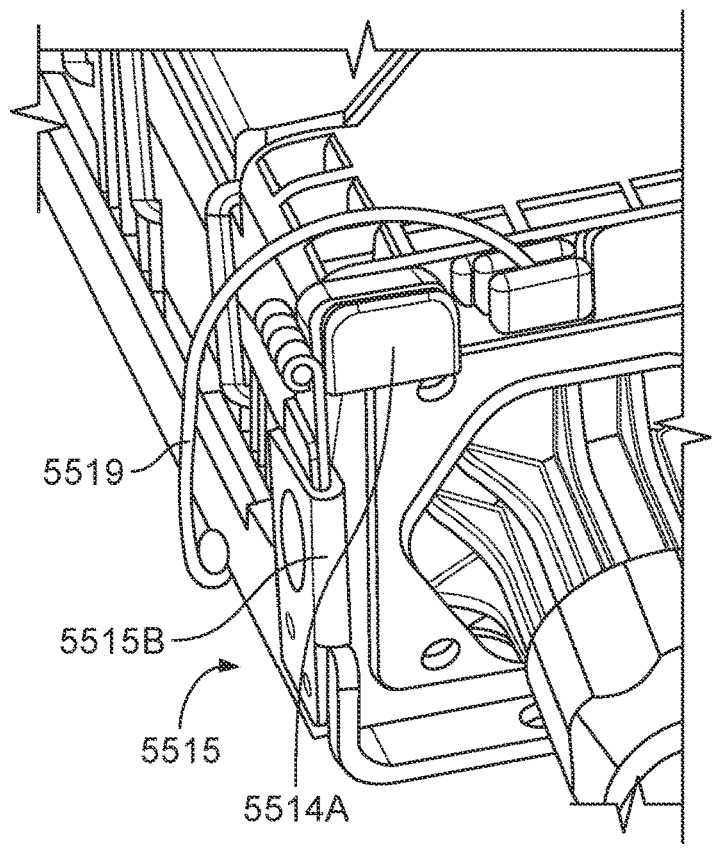
FIGS. 64 and 65 are perspective views of a termination unit assembly in closed and open positions, respectively, in accordance with a further embodiment.
Figure 65:
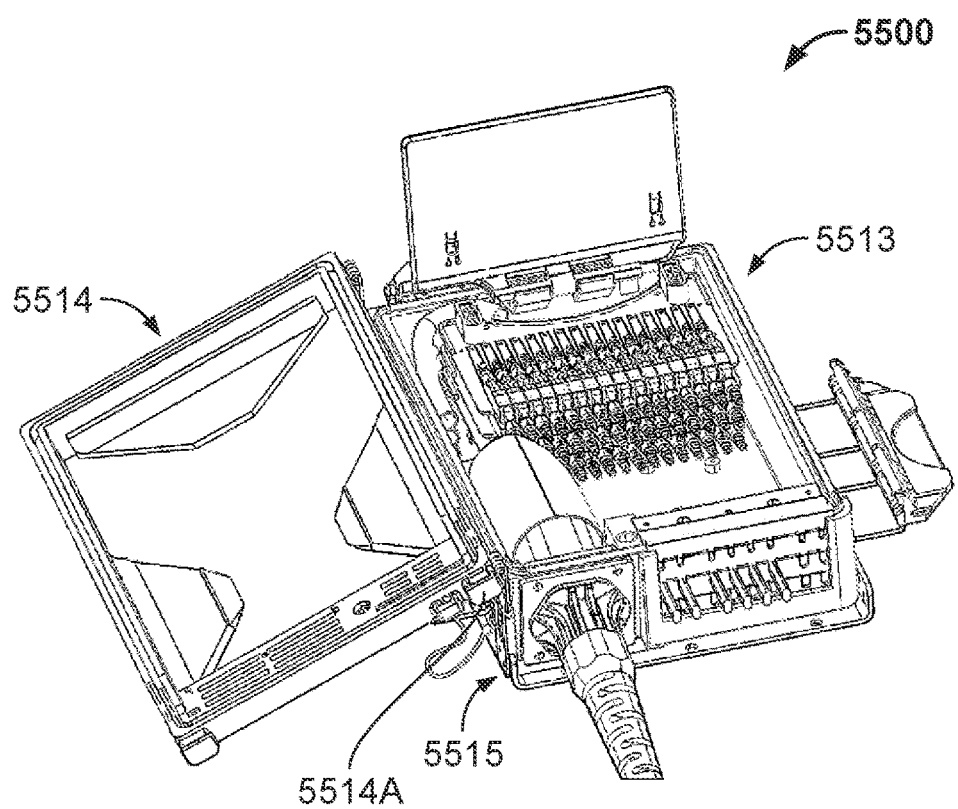

Referring now to FIGS. 64 and 65, termination unit assembly 5500 is substantially similar to termination unit assembly 5400. In the arrangement of termination unit assembly 5500, housing base 5513 is optionally attached to housing lid 5514 of termination unit assembly 5500 by lanyard 5519 such that the housing base is completely separable from the housing lid except for the connection via the lanyard. In this manner, housing lid 5514 may be placed aside by a technician for easier access to housing base 5513 while working on termination unit assembly 5500. Housing base 5513 is further optionally attached to housing lid 5514 by clip hinge 5515 such that the housing base may be rotatably attached to the housing lid via the clip hinge. As best shown by FIG. 64 and FIG. 66, clip hinge 5515 includes lower plate 5515A removably insertable into hinge bracket 5515B attached to housing base 5513. Lower plate 5515A includes engagement flange 5515C in which the engagement flange catches on hinge bracket 5515B when the lower plate is fully inserted into the hinge bracket to prevent removal of the lower plate from the hinge bracket. Lower plate 5515A is removable from hinge bracket 5515B upon depression of engagement flange 5515C. Clip hinge 5515 further includes hinge arm 5515D hingedly connected to lower plate 5515A via hinge shaft 5515E and flange clip 5515F attached to the hinge arm and having opposing hooks configured for clipping downwardly onto lid flange 5514A of housing lid 5514 to attach the clip hinge to the housing lid.

With further reference to FIG. 66, flange clip 5515F wraps around opposite sides of lid flange 5514A. In an alternative arrangement shown in FIG. 67A, clip hinge 5615 is the same as clip hinge 5515 with the exception that the hinge arm of clip hinge 5615 further includes angled flange 5615G for insertion into a cavity on an underside of lid flange 5514A to provide for a stronger engagement between the clip hinge and the lid flange. As shown in FIG. 67B, in yet another alternative arrangement, clip hinge 5715 is similar to clip hinge 5515 but the hinge arm of clip hinge 5715 excludes the opposing hooks such that the hinge arm configured for clipping sideways between housing base 5513 and housing lid 5514 and further includes rounded flange 5715G for insertion into a cavity on an underside of lid flange 5514A to provide for a stronger engagement between the clip hinge and the lid flange. As shown in FIG. 67C, in still another alternative arrangement, a clip hinge may be the same as clip hinge 5615 with the exception that hinge arm 5815D of such clip hinge may further include split arms. As further shown in FIG. 67C, lid flange 5814A includes opening 5814B such that when placing the clip hinge downwardly onto the lid flange, the split arms of hinge arm 5815D may be squeezed together to fit within the opening. Once the split arms pass fully through opening 5814B, the arms may be released such that they return to their normal position and clip underneath respective arms defining opening 5814B of lid flange 5814A to attach the clip hinge to the lid flange. In this manner, the hooks on such clip hinge may be larger than the hooks on clip hinges 5515, 5615 such that the clip hinge using hinge arm 5815D requires a stronger force to be removed from lid flange 5814A than clip hinges 5515, 5615 require to be removed from lid flange 5514A.

In some alternative arrangements, termination unit assemblies, such as those in the form of termination unit assemblies 1600, 2400, 2500, 2600, 2700, 5400, 5500 may be part of an intelligent optical fiber termination system such as that disclosed in U.S. patent application Ser. No. 16/659,248 to Takeuchi et al., filed Oct. 21, 2019.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. An optical fiber termination system, comprising:
a first panel including a first array of first connector assemblies; and
a second panel attached to and overlying the first panel, the second panel including a panel base and a second array of second connector assemblies fixed to the panel base, wherein each of the second connector assemblies is movable, while being fixed to the panel base, towards and away from an adjacent one of the second connector assemblies in directions transverse to longitudinal axes defined by the respective second connector assemblies to thereby expose one of the first connector assemblies.

2. The system of claim 1, wherein the second connector assemblies are arranged to lie within a first plane and are movable within the first plane to expose the one first connector assembly.

3. The system of claim 2, wherein the second connector assemblies are rotatable within the first plane.

4. The system of claim 3, wherein the second panel is moveable relative to the first panel.

5. The system of claim 2, wherein the first array of first connector assemblies are arranged to lie within a second plane parallel to the first plane.

6. The system of claim 1, wherein the first connector assemblies and the second connector assemblies have the same shape and dimensions.

7. The system of claim 1, wherein the first panel further includes a first panel base and the first array of the first connector assemblies extends from the first panel base, and wherein the second panel further includes a second panel base and the second array of the second connector assemblies extends from the second panel base.

8. The system of claim 1, wherein the first connector assemblies and the second connector assemblies each include a first connector and an adapter attachable to a second connector such that the first connector and the second connector are in optical communication.

9. The system of claim 1, further comprising an enclosure, the enclosure comprising:
a base;
a lid attachable to the base;
a flange hingedly attached to a bottom of the base or to a top of the lid, the flange being rotatable to a closed position wherein a portion of the flange extends over the top of the lid when the flange is attached to the bottom of the base and extends over the bottom of the base when the flange is attached to the top of the lid.

10. The system of claim 1, further comprising a housing including a housing base and housing walls extending from the housing base,
wherein the combination of the housing base and the housing walls define an inner surface of the housing, and
wherein the first panel and the second panel are coupled to the inner surface of the housing.

11. An optical fiber termination system, comprising:
a housing including a housing base, housing walls extending from the housing base, the combination of the housing base and the housing walls defining an inner surface of the housing; and
a plurality of stacked panels coupled to the inner surface of the housing,
wherein each of the panels defines a respective panel plane, includes an array of adapters, and is rotatable relative to an adjacent one of the panels such that ends of each of the adapters are movable in opposing first and second directions transverse to their respective panel planes, and
wherein the ends of each of the adapters are movable in opposing third and fourth directions towards and away from one or more adjacent ones of the adapters.

12. The system of claim 11, further comprising a plurality of first cables each including a first optical fiber, each of the first cables having ends receivable into or extending from a first port of a respective one of the plurality of adapters.

13. The system of claim 12, further comprising a plurality of second cables each including a second optical fiber and having ends receivable into second ports of the plurality of adapters such that the second cables, when received into the second ports, are moveable with the respective ends of the adapters into which the second cables are received, wherein an end of one of the second cables is aligned with an end of one of the first cables when the end of the one of the second cables is received in the second port of the respective one of the plurality of adapters and the end of the one of the first cables is received in or extends from respective one of the plurality of adapters.

14. The system of claim 11, wherein the ends of each of the adapters are moveable in the third and the fourth directions within a plane defined by the array of adapters.

15. The system of claim 11, wherein each of the panels includes a panel base to which each of the respective arrays of adapters of the panels is attached, and wherein the panel bases are moveable relative to each other.

16. The system of claim 15, wherein a first panel base of a first one of the panels is slidable relative to a second panel base of a second one of the panels to change a relative position of the first and the second panel bases.

17. The system of claim 15, wherein a first panel base of a first one of the panels is rotatable relative to a second panel base of a second one of the panels to change a relative position of the first and the second panel bases.

18. The system of claim 11, wherein the first and second directions are orthogonal to each of the third and the fourth directions.

19. The system of claim 11, further comprising a plurality of hinges attaching the first and the second panels to the housing.

\* \* \* \* \*